(12) United States Patent
Itabashi et al.

(10) Patent No.: US 11,858,393 B2
(45) Date of Patent: Jan. 2, 2024

(54) CUSHION MEMBER, CUSHION MEMBER MANUFACTURING METHOD, AND PASSENGER SEAT

(71) Applicant: Archem Inc., Tokyo (JP)

(72) Inventors: Taichi Itabashi, Tokyo (JP); Taisuke Yonezawa, Tokyo (JP); Yoshiyuki Takahashi, Tokyo (JP)

(73) Assignee: Archem Inc., Tokyo (JP)

( * ) Notice: Subject to any disclaimer, the term of this patent is extended or adjusted under 35 U.S.C. 154(b) by 379 days.

(21) Appl. No.: 17/297,456

(22) PCT Filed: Nov. 28, 2019

(86) PCT No.: PCT/JP2019/046670
§ 371 (c)(1),
(2) Date: May 27, 2021

(87) PCT Pub. No.: WO2020/116329
PCT Pub. Date: Jun. 11, 2020

(65) Prior Publication Data
US 2022/0041084 A1   Feb. 10, 2022

(30) Foreign Application Priority Data
Dec. 3, 2018 (JP) .................... 2018-226823

(51) Int. Cl.
*B60N 2/70* (2006.01)
*B33Y 80/00* (2015.01)

(52) U.S. Cl.
CPC ............ *B60N 2/7017* (2013.01); *B33Y 80/00* (2014.12); *B60N 2/7035* (2013.01)

(58) Field of Classification Search
CPC .... B60N 2/7017; B60N 2/7035; A47C 31/116
See application file for complete search history.

(56) References Cited

U.S. PATENT DOCUMENTS 3,162,487 A * 12/1964 Trotman ................ A47C 7/742
    297/452.45
5,279,876 A *  1/1994 Thum ................... B60N 2/7035
    428/542.2

(Continued)

FOREIGN PATENT DOCUMENTS

CN     1480085 A    3/2004
CN   102765548 A   11/2012
(Continued)

OTHER PUBLICATIONS

Jul. 19, 2022, search result of Office Action issued by the China National Intellectual Property Administration in the corresponding Chinese Patent Application No. 201980080053.X.

(Continued)

*Primary Examiner* — Rodney B White
(74) *Attorney, Agent, or Firm* — KENJA IP LAW PC

(57) ABSTRACT

A cushion member 301 is a cushion member made of flexible resin or rubber and used for a passenger seat 300, and includes a porous structural body 1, and a top skin 330 serving as at least a surface FS on a seated person side among surfaces of the passenger seat and integrated with the porous structural body.

10 Claims, 31 Drawing Sheets

(56) References Cited

U.S. PATENT DOCUMENTS

| | | | | |
|---|---|---|---|---|
| 5,551,673 A * | 9/1996 | Furusawa | ............... | B60R 19/02 |
| | | | | 267/165 |
| 6,726,285 B2 * | 4/2004 | Caruso | ................... | A47C 7/28 |
| | | | | 297/452.52 |
| 7,338,039 B2 * | 3/2008 | Pfau | ...................... | A47C 23/02 |
| | | | | 267/144 |
| 7,441,758 B2 * | 10/2008 | Coffield | .................. | B29D 7/01 |
| | | | | 267/142 |
| 7,455,365 B2 * | 11/2008 | Caruso | .................... | A47C 5/12 |
| | | | | 297/452.21 |
| 7,740,321 B2 * | 6/2010 | Brill | .......................... | A47C 7/28 |
| | | | | 297/452.49 X |
| 7,931,257 B2 * | 4/2011 | VanDeRiet | ............. | F16F 1/025 |
| | | | | 267/142 |
| 8,691,370 B2 * | 4/2014 | Brill | ...................... | A47C 7/144 |
| | | | | 428/218 |
| 9,533,457 B2 * | 1/2017 | Haimoff | ................. | F16F 1/376 |
| 9,737,152 B2 * | 8/2017 | Mason | ..................... | A47G 9/10 |
| 10,226,098 B2 * | 3/2019 | Guyan | ................... | A43B 13/14 |
| 10,231,511 B2 * | 3/2019 | Guyan | ................ | A43D 999/00 |
| 10,343,565 B2 | 7/2019 | Baek et al. | | |
| 10,744,914 B2 * | 8/2020 | Baek | ................... | B60N 2/7005 |
| 11,213,112 B2 * | 1/2022 | McDermott | ............ | A45F 3/26 |
| 11,324,323 B2 * | 5/2022 | Deevers | ................. | A47C 7/029 |
| 2018/0043805 A1 | 2/2018 | Baek et al. | | |
| 2018/0070736 A1 * | 3/2018 | Achten | ................ | A47C 23/002 |
| 2018/0071979 A1 | 3/2018 | Achten et al. | | |
| 2018/0084914 A1 * | 3/2018 | Deevers | ................. | A47C 7/027 |
| 2018/0264718 A1 | 9/2018 | Mccluskey | | |
| 2022/0240680 A1 * | 8/2022 | Deevers | .................. | A47C 7/16 |
| 2023/0150408 A1 * | 5/2023 | Taylor | .................. | B60N 2/7035 |
| | | | | 297/452.55 |
| 2023/0219474 A1 * | 7/2023 | Maloney | ............... | B60N 2/7017 |
| | | | | 297/452.26 |

FOREIGN PATENT DOCUMENTS

| | | | | |
|---|---|---|---|---|
| CN | 107263414 A | 10/2017 | | |
| CN | 107719197 A | 2/2018 | | |
| DE | 102020200637 A1 * | 7/2020 | ........... | A47C 31/126 |
| JP | 2009029064 A | 2/2009 | | |
| JP | 2016044292 A | 4/2016 | | |

OTHER PUBLICATIONS

Aug. 1, 2022, search result of the Extended European Search Report issued by the European Patent Office in the corresponding European Patent Application No. 19894053.8.

Feb. 18, 2020, International Search Report issued in the International Patent Application No. PCT/JP2019/046670.

Jun. 8, 2021, International Preliminary Report on Patentability issued in the International Patent Application No. PCT/JP2019/046670.

* cited by examiner

FIG. 9
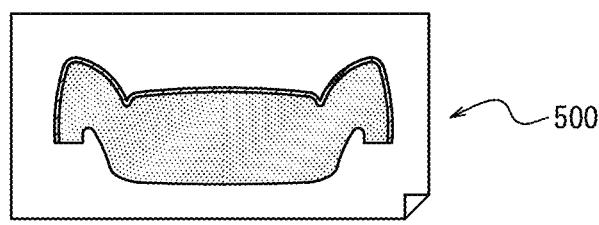
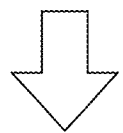
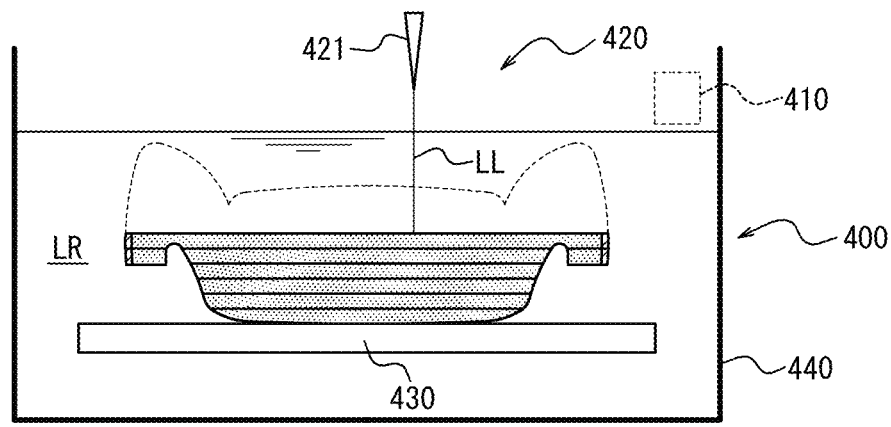
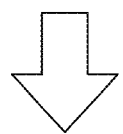
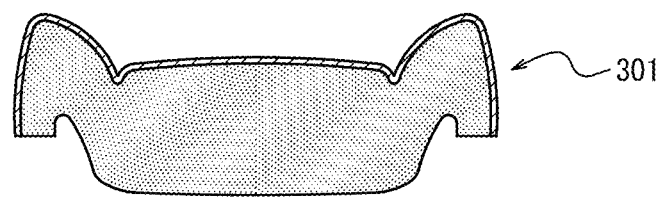

VIEW IN DIRECTION OF ARROW C

VIEW IN DIRECTION OF ARROW A

VIEW IN DIRECTION OF ARROW D

VIEW IN DIRECTION OF ARROW B

VIEW IN DIRECTION OF ARROW E

VIEW IN DIRECTION OF ARROW F

FIG. 31
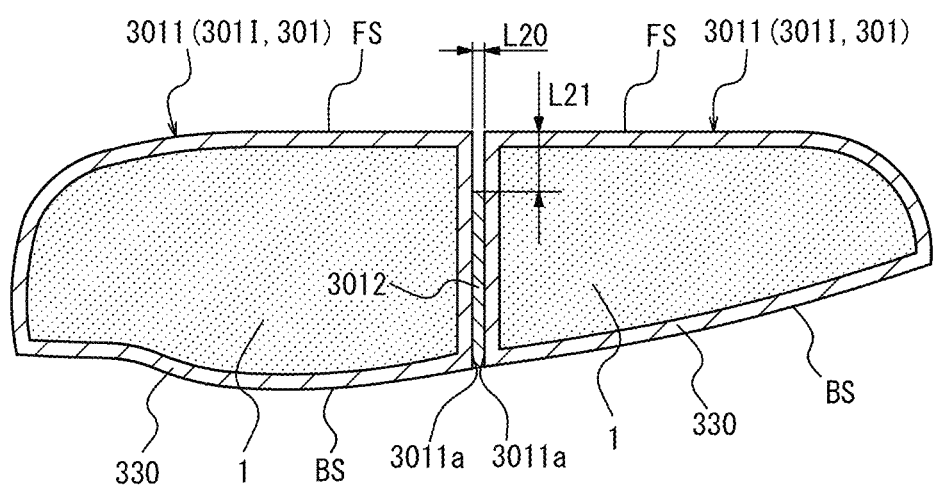
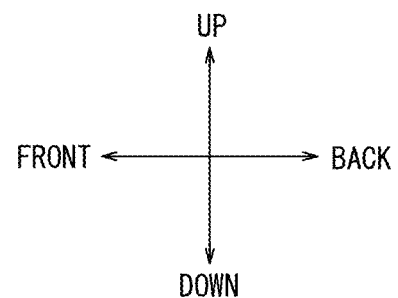

FIG. 32
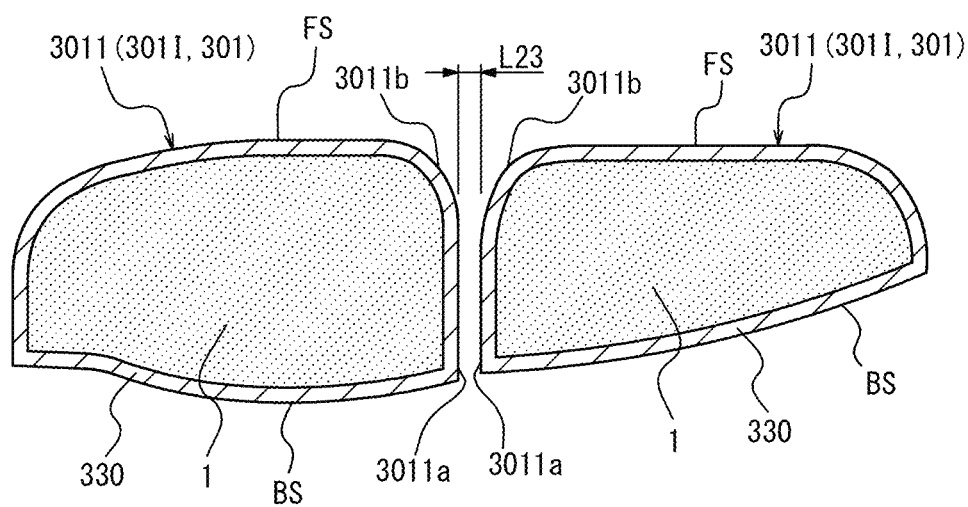
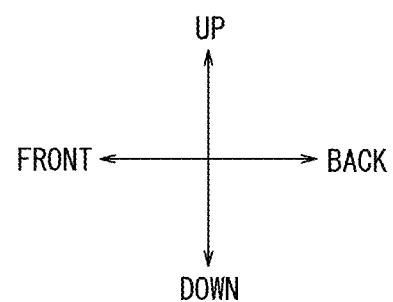

CUSHION MEMBER, CUSHION MEMBER MANUFACTURING METHOD, AND PASSENGER SEAT

TECHNICAL FIELD

The present disclosure relates to a cushion member used for a passenger seat, a cushion member manufacturing method, and a passenger seat.

The present application is based on and claims the benefit of priority from the prior Japanese Patent Application No. 2018-226823 filed on Dec. 3, 2018 in Japan; the entire contents of which are incorporated hereby by reference.

BACKGROUND

A conventional passenger seat (such as a car seat) typically includes a porous structural body (for example, urethane foam) having a cushioning characteristic, and a top skin covering the porous structural body. The porous structural body is typically manufactured through a process of foaming by chemical reaction in, for example, mold shaping or slab shaping (for example, PTL 1). In such passenger seat manufacturing, the porous structural body and the top skin are separately manufactured first, and thereafter, the porous structural body is covered with the top skin thereon.

CITATION LIST

Patent Literature

PTL 1: Japanese Patent Laid-Open No. 2016-44292

SUMMARY

Technical Problem

However, there has been room for improvement of productivity of the passenger seat such as one described above.

The present disclosure is intended to provide a cushion member, a cushion member manufacturing method, and a passenger seat that lead to improvement of passenger seat productivity.

Solution to Problem

A cushion member of the present disclosure is
a cushion member made of flexible resin or rubber and used for a passenger seat, the cushion member including:
a porous structural body; and
a top skin serving as at least a surface on a seated person side among surfaces of the passenger seat and integrated with the porous structural body.
A cushion member manufacturing method of the present disclosure
manufactures the above-described cushion member by using a 3D printer.
A passenger seat of the present disclosure
includes the above-described cushion member.

Advantageous Effect

According to the present disclosure, it is possible to provide a cushion member, a cushion member manufacturing method, and a passenger seat that lead to improvement of passenger seat productivity.

BRIEF DESCRIPTION OF THE DRAWINGS

In the accompanying drawings:

FIG. 9 is a drawing for description of a cushion member manufacturing method according to an embodiment of the present disclosure;

FIG. 31 is a drawing for description of the passenger seat in FIG. 30; and

FIG. 32 is a drawing for description of a fourth modification of the passenger seat that can include a cushion member according to an optional embodiment of the present disclosure.

DETAILED DESCRIPTION

Figure 1:
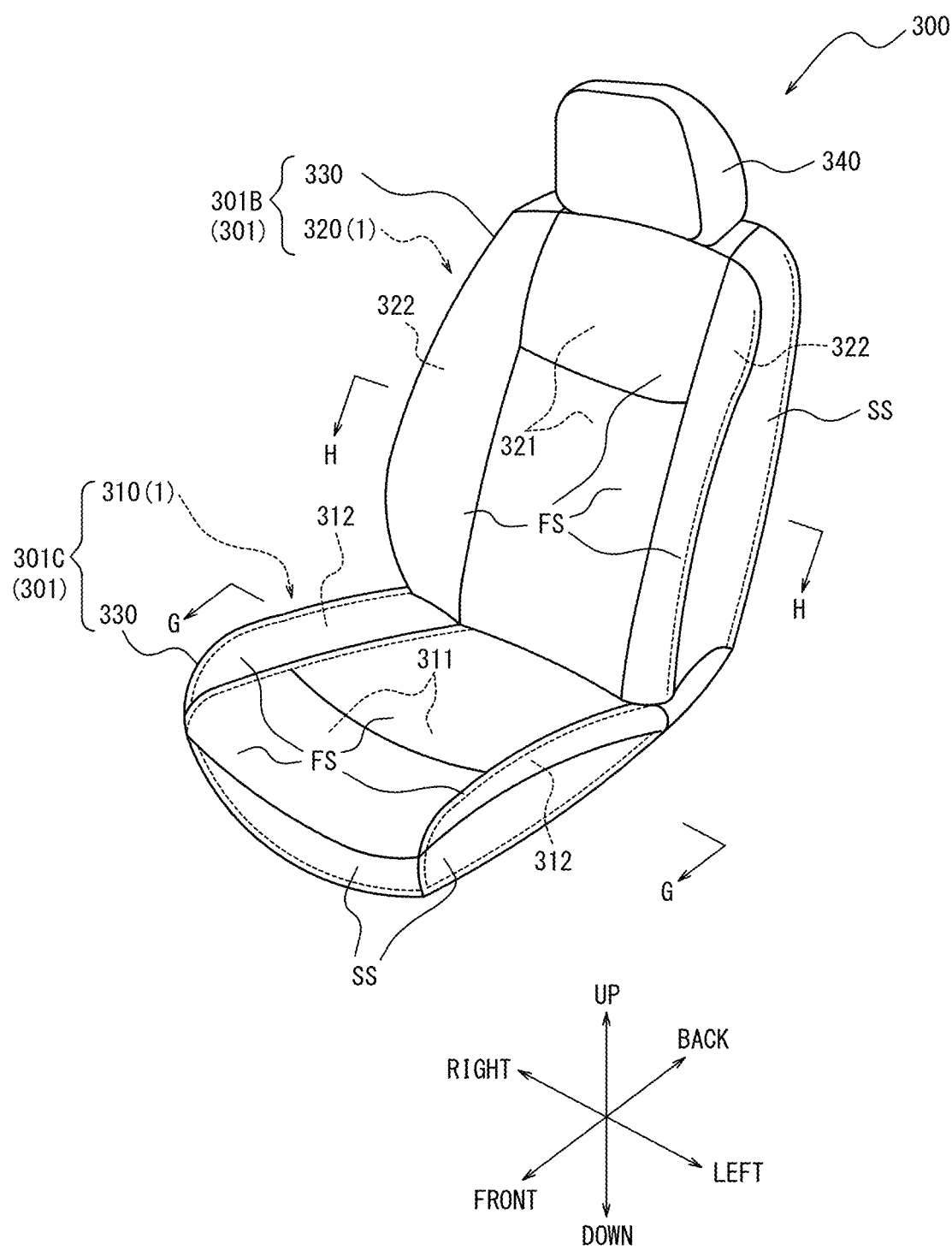
FIG. 1 is a perspective view schematically illustrating a passenger seat including a cushion member according to a first embodiment of the present disclosure.

A cushion member of the present disclosure, and a cushion member manufactured by using a cushion member manufacturing method of the present disclosure may be used for a passenger seat of an optional kind, and for example, is preferably used for a vehicle seat, more preferably used for a car seat.

Embodiments of a cushion member, a cushion member manufacturing method, and a passenger seat according to the present disclosure will be exemplarily described below with reference to the accompanying drawings.

Any common component in the drawings will be denoted by the same reference sign.

[Cushion Member and Passenger Seat]

FIGS. 1 to 5 are drawings for description of a cushion member according to a first embodiment of the present disclosure. FIG. 1 is a perspective view schematically illustrating a passenger seat 300 according to the first embodiment, which includes a cushion member 301 according to the first embodiment. The passenger seat 300 in FIG. 1 may be configured as a passenger seat of an optional kind, and for example, is preferably configured as a vehicle seat, more preferably configured as a car seat.

The passenger seat 300 includes a seat-cushion cushion member 301C on which a seated person sits, a frame (not illustrated) supporting the seat-cushion cushion member 301C from below, a seat-back cushion member 301B for supporting the back of the seated person, a frame (not illustrated) installed on the back side of the seat-back cushion member 301B, and a head rest 340 installed above the seat-back cushion member 301B and supporting the head of the seated person. The seat-cushion cushion member 301C and the seat-back cushion member 301B are each formed of the cushion member 301 of the present embodiment.

In the example illustrated in FIG. 1, the head rest 340 is separated from the seat-back cushion member 301B but may be integrated with the seat-back cushion member 301B.

Figure 2:
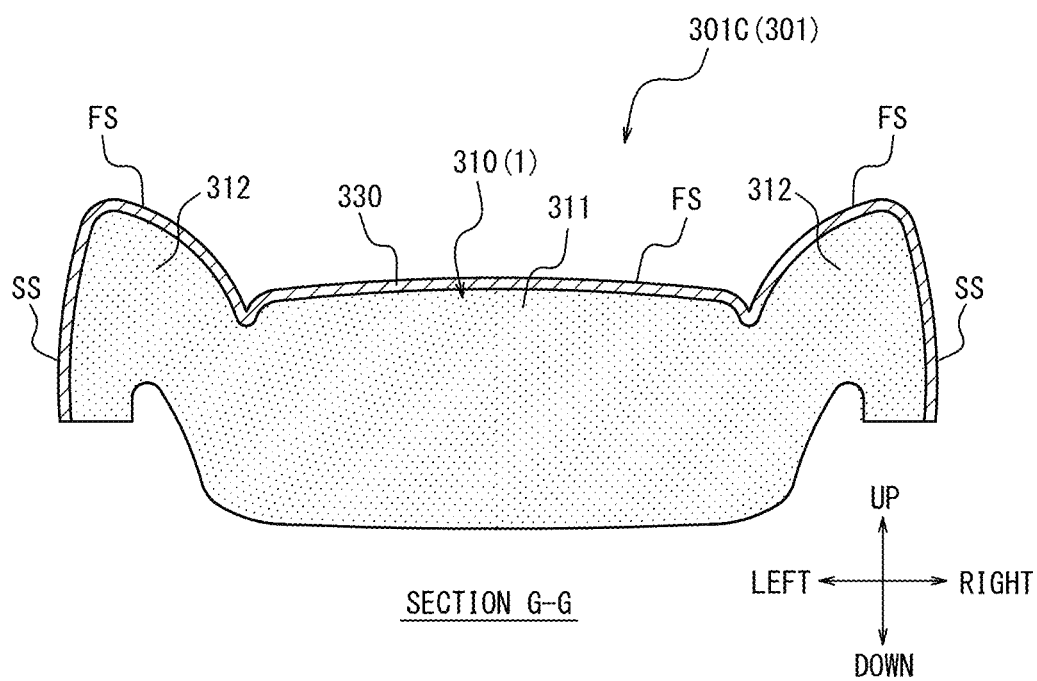
FIG. 2 is a cross-sectional view illustrating a seat-cushion cushion member in FIG. 1 at a section taken along a line G-G in FIG. 1.
Figure 3:
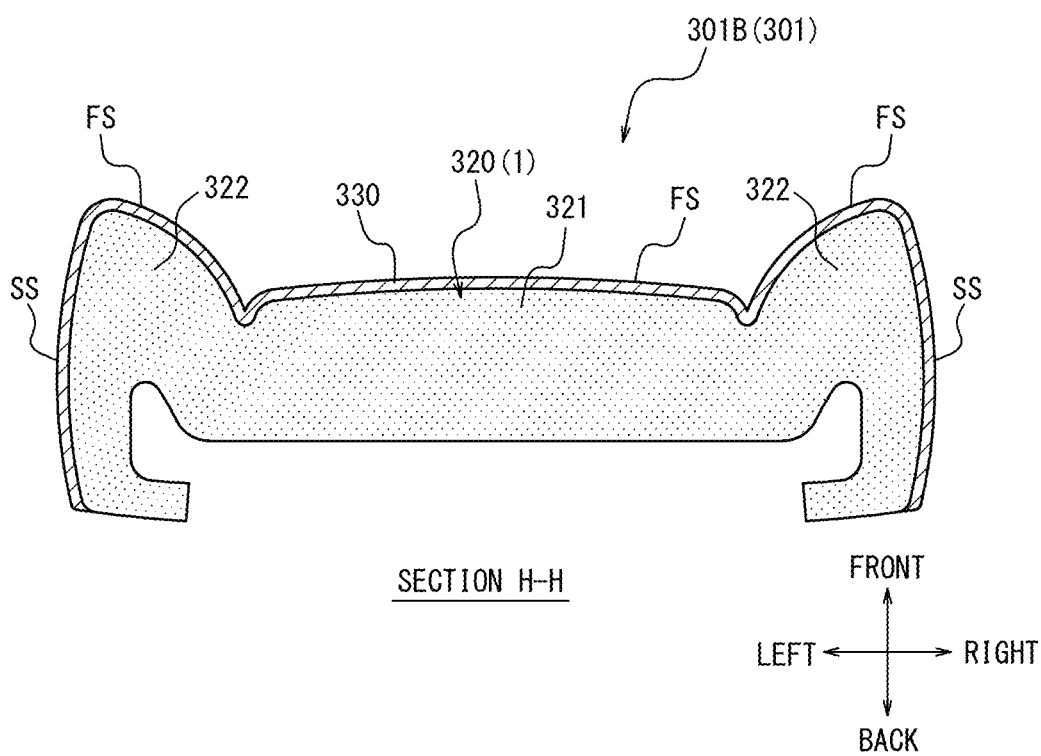
FIG. 3 is a cross-sectional view illustrating a seat-back cushion member in FIG. 1 at a section taken along a line H-H in FIG. 1.
Figure 4:
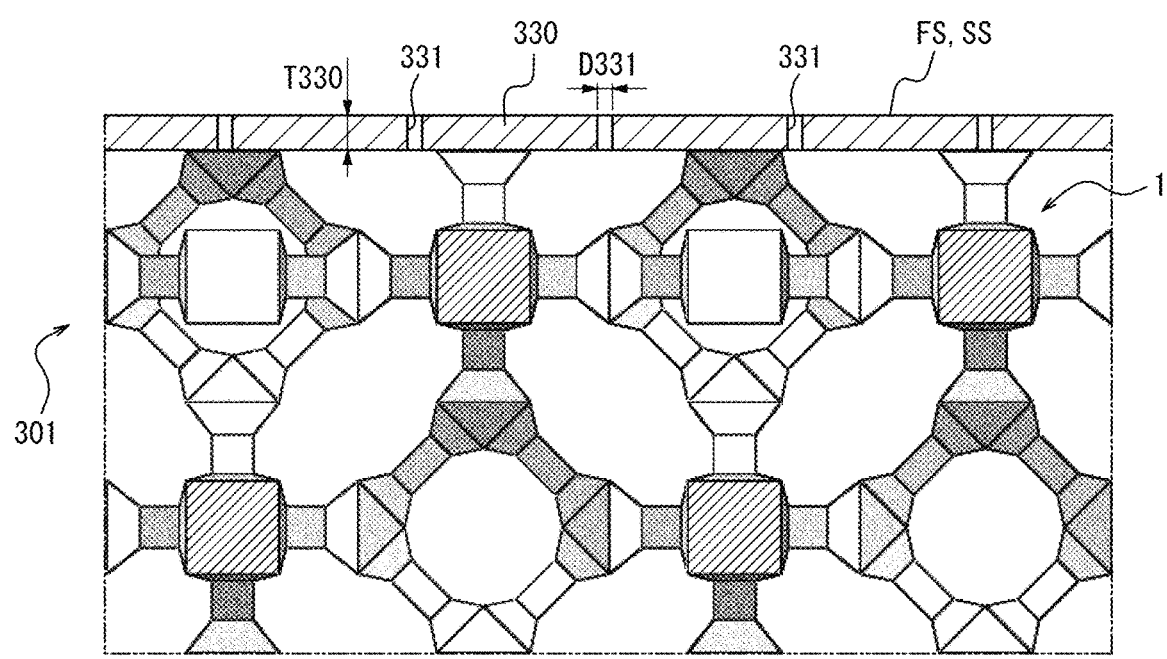
FIG. 4 is a cross-sectional view illustrating a partial section of the cushion member in FIG. 1.

FIG. 2 illustrates the seat-cushion cushion member 301C in FIG. 1 at a section taken along a line G-G in FIG. 1. FIG. 3 illustrates the seat-back cushion member 301B in FIG. 1 at a section taken along a line H-H in FIG. 1. FIG. 4 illustrates a partial section of the cushion member 301 of the present embodiment, from which the seat-cushion cushion member 301C and the seat-back cushion member 301B in FIG. 1 are each formed, in an enlarged manner.

In the present specification, as denoted in FIGS. 1 to 3, "up", "down", "left", "right", "front", and "back" directions when viewed from the seated person sitting on the passenger seat 300 are simply referred to as, for example, "up", "down", "left", "right", "front", and "back", respectively.

The cushion member 301 of the present embodiment is shaped by a 3D printer and entirely integrally formed. As illustrated in FIG. 4, the cushion member 301 includes a porous structural body 1 having a large number of cell holes, and a top skin 330 serving as at least a surface FS on the seated person side among the surfaces of the passenger seat 300 and integrated with the porous structural body 1. The top skin 330 is positioned outside the porous structural body 1 and covers at least a surface on the seated person side among the surfaces of the porous structural body 1. A surface of the top skin 330 on a side (outside) opposite to the porous structural body 1 serves as at least the surface FS on the seated person side among the surfaces of the passenger seat 300. In other words, the top skin 330 is positioned on the outermost side of the passenger seat 300 and covered with nothing thereon. In the example illustrated in FIG. 1, the top skin 330 serves as, among the surfaces of the passenger seat 300, the surface FS on the seated person side and any other surface (side surface) SS continuous with the surface FS.

More specifically, as illustrated in FIGS. 1 and 2, the seat-cushion cushion member 301C formed of the cushion member 301 includes a cushion pad 310 made of the porous structural body 1, and the top skin 330 covering at least a surface on the seated person side among surfaces of the cushion pad 310. The cushion pad 310 has functions of what is called a seat pad. The cushion pad 310 includes a main pad 311 formed to support the hip region and the femoral region of the seated person from below, and a pair of side pads 312 positioned on the right and left sides of the main pad 311 and protruding beyond the main pad 311 to support the seated person from the right and left sides. In the examples of FIGS. 1 and 2, the top skin 330 of the seat-cushion cushion member 301C covers, among the surfaces of the cushion pad 310, a surface (specifically, the upper surfaces of the main pad 311 and the side pads 312) on the seated person side, and any other surface (side surface; specifically, side surfaces of the main pad 311 and/or the side pads 312 on the front side, or side surfaces outside the pair of side pads 312 in the right-left direction) continuous with the surface on the seated person side. The surface of the top skin 330 on the side opposite to the porous structural body 1 serves as, among surfaces of the seat-cushion cushion member 301C of the passenger seat 300, the surface (upper surface) FS on the seated person side, and any other surface (side surface; specifically, side surface on the front side or side surface outside in the right-left direction) SS continuous with the surface FS on the seated person side.

As illustrated in FIGS. 1 and 3, the seat-back cushion member 301B formed of the cushion member 301 includes a back pad 320 made of the porous structural body 1, and the top skin 330 covering at least a surface on the seated person side among surfaces of the back pad 320. The back pad 320 has functions of what is called a seat pad. The back pad 320 includes a main pad 321 formed to support the back of the seated person from the back side, and a pair of side pads 322 positioned on the right and left sides of the main pad 321 and protruding on the front side of the main pad 321 to support the seated person from the right and left sides. In the example in FIGS. 1 and 3, the top skin 330 of the seat-back cushion member 301B covers, among the surfaces of the back pad 320, a surface on the seated person side (specifically, the front surfaces of the main pad 321 and the side pads 322), and any other surface (side surface; specifically, side surfaces of the main pad 321 and/or the side pads 322 on the upper side, or side surfaces outside the pair of side pads 322 in the right-left direction) continuous with the surface on the seated person side. The surface of the top skin 330 on the side opposite to the porous structural body 1 serves as, among surfaces of the seat-back cushion member 301B of the passenger seat 300, the surface (front surface) FS on the seated person side, and any other surface (side surface; specifically, side surface on the upper side or side surface outside in the right-left direction) SS continuous with the surface FS on the seated person side.

Note that, in the example illustrated in FIG. 1, the top skin 330 serves as the entire surface FS on the seated person side and the entire other surface (side surface) SS continuous with the surface FS among the surfaces of the passenger seat 300. However, the top skin 330 may serve as only part of the surface FS of the passenger seat 300 on the seated person side. In this case, the ratio of the area of the top skin 330 relative to the entire area of the surface FS of the seat-cushion cushion member 301C or the seat-back cushion member 301B of the passenger seat 300 on the seated person side is preferably, for example, 10 to 50%. Alternatively, the top skin 330 may serve as only part of the side surface SS of the passenger seat 300.

For example, the cushion member 301 of the passenger seat 300 is constituted by a filling body, and a body part separated from the filling body and including a concave part in which the filling body is housed, the filling body may serve as part of the surface FS of the passenger seat 300 on the seated person side and/or the side surface SS, and in this case, the top skin 330 may serve as the surface FS of the filling body on the seated person side and/or the side surface SS thereof. In this case, the ratio of the area of the top skin 330 relative to the entire area of the surface FS of the seat-cushion cushion member 301C or the seat-back cushion member 301B of the passenger seat 300 on the seated person side is preferably, for example, 10 to 50%.

The cushion member 301 is made of flexible resin or rubber.

The "flexible resin" is resin that can deform when external force is applied, and is preferably, for example, elastomer resin, more preferably polyurethane, further more preferably soft polyurethane. The rubber is, for example, natural rubber or synthetic rubber. The top skin 330 can freely deform in accordance with external force from the seated person since the cushion member 301 is made of flexible resin or rubber, and a cushioning characteristic can be obtained since the porous structural body 1 can perform compressing and restoring deformation in accordance with application and cancellation of external force from the seated person.

Note that, for the easiness of manufacturing by a 3D printer, the cushion member 301 is preferably made of flexible resin than rubber.

In addition, for the easiness of manufacturing by a 3D printer, the cushion member 301 is preferably entirely made of a material having the same composition. However, the cushion member 301 may be made of materials having different compositions at sites.

Note that, when the cushion member 301 is manufactured by using a 3D printer, resin, the raw material of which is photocurable polyurethane (in particular, ultraviolet curable polyurethane), may be used for a material to make the cushion member 301. For the photocurable polyurethane (in particular, ultraviolet curable polyurethane), resin of urethane acrylate or urethane methacrylate may be used as a raw material. Such resin is, for example, disclosed in U.S. Pat. No. 4,337,130.

The configuration of the porous structural body 1 will be described later in detail with reference to FIGS. 10 to 23.

Figure 5:
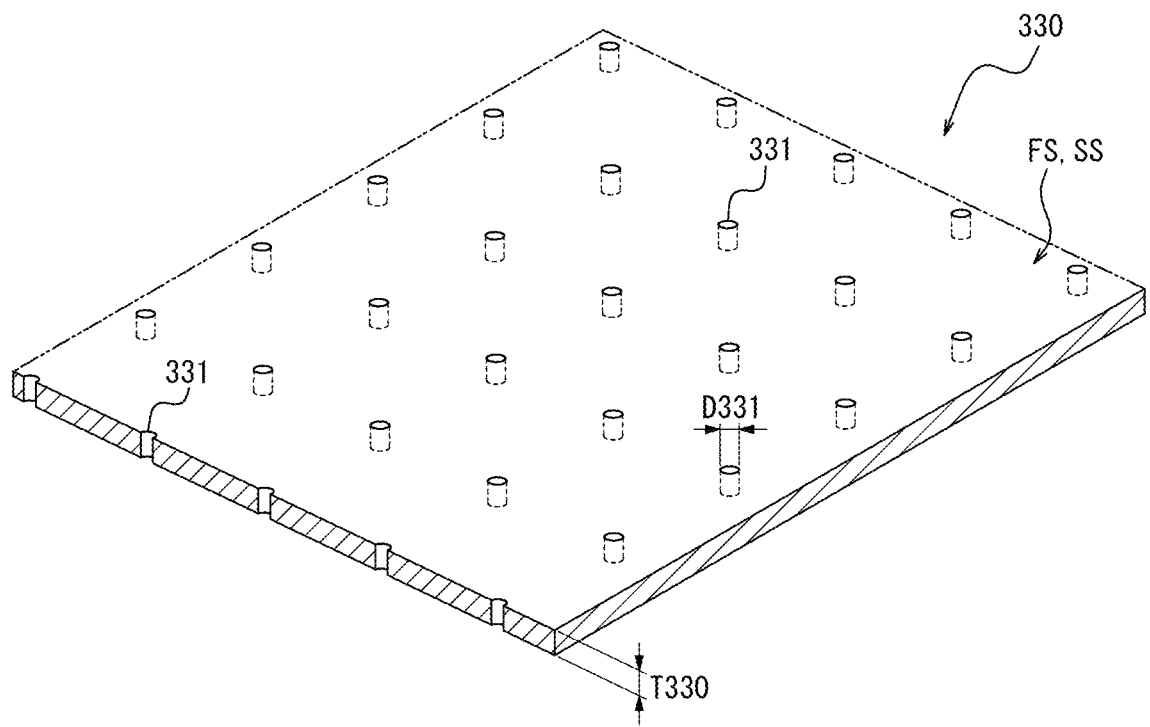
FIG. 5 is a perspective view illustrating part of a top skin of the cushion member in FIG. 1.

FIG. 5 is a perspective view illustrating part of the top skin 330 of the cushion member 301, from which the seat-cushion cushion member 301C and the seat-back cushion member 301B in FIG. 1 are formed. In the example illustrated in FIG. 5, the top skin 330 has a plurality of through holes 331.

In this manner, the cushion member 301 of the present embodiment is an integration of the porous structural body 1, and the top skin 330 serving as at least the surface FS on the seated person side among the surfaces of the passenger seat 300. The cushioning characteristic of the cushion member 301 is provided by the porous structural body 1. Since the cushion member 301 includes the top skin 330, the passenger seat 300 can have excellent appearance, the passenger seat 300 can have excellent surface touch, and discomfort when the seated person sits can be eliminated, unlike a case in which the cushion member 301 includes only the porous structural body 1 without the top skin 330. Although the porous structural body 1 is potentially damaged through interference with the seated person when the porous structural body 1 is externally exposed at a position that touches the seated person, the top skin 330 serves as at least the surface FS on the seated person side among the surfaces of the passenger seat 300 (in other words, covers at least the surface on the seated person side among the surfaces of the porous structural body 1) in the cushion member 301 of the present embodiment, and thus the porous structural body 1 can be prevented from directly interfering with the seated person, and accordingly, durability of the porous structural body 1 can be improved. Note that, although not illustrated, the same effect can be obtained to some different extent when the top skin 330 serves as only part of the surface FS of the passenger seat 300 on the seated person side (in other words, covers only part of the surface of the porous structural body 1 on the seated person side).

Since the porous structural body 1 and the top skin 330 are integrated in the cushion member 301 of the present embodiment, the process of covering a porous structural body (such as urethane foam) with a top skin thereon, which has been needed at manufacturing of a conventional passenger seat, is unnecessary. Accordingly, passenger seat productivity can be improved. In addition, since the porous structural body 1 and the top skin 330 are formed as one component in the cushion member 301 of the present embodiment, the number of components can be reduced as compared to a conventional passenger seat. Thus, productivity improvement and cost reduction can be achieved.

Since the porous structural body 1 and the top skin 330 are integrated, the top skin 330 is not potentially separated nor shifted from the surface of the porous structural body 1 when used, for example, unlike a case in which these components are separated, and thus the quality of the passenger seat 300 can be improved.

As described above, the cushion member 301 of the present embodiment is shaped by a 3D printer. Since the cushion member 301 is manufactured by using a 3D printer, the cushion member 301 including the porous structural body 1 and the top skin 330 can be easily manufactured through one process, and thus the productivity can be improved and a desired configuration can be obtained. In addition, it is expected that manufacturing by a 3D printer can be achieved at lower cost in a shorter time in the future due to upcoming progress of 3D printer technologies. Moreover, the configuration of the cushion member 301 corresponding to various required characteristics can be simply achieved as desired by manufacturing the cushion member 301 by using a 3D printer.

As described above, in the examples of FIGS. 1 to 3, the top skin 330 serves as, among the surfaces of the passenger seat 300, not only the surface FS on the seated person side but also the other surface (side surface) SS continuous with the surface FS on the seated person side. Accordingly, the passenger seat 300 can have further excellent appearance, the passenger seat 300 can have further excellent surface touch, discomfort when the seated person sits can be further eliminated, and the durability of the porous structural body 1 can be improved as compared to a case in which the top skin 330 serves as only the surface FS on the seated person side among the surfaces of the passenger seat 300 and the porous structural body 1 serves as the side surface SS of the passenger seat 300 (in other words, the porous structural body 1 is exposed on the side surface of the passenger seat 300).

However, the top skin 330 may serve as only the surface FS on the seated person side among the surfaces of the passenger seat 300.

To ensure the breathability of the cushion member 301, it is preferable that, as illustrated in FIGS. 2 and 3, the top skin 330 does not cover the porous structural body 1 on at least part (preferably all) of the back surface of the cushion member 301 (the lower surface of the seat-cushion cushion member 301C and the back surface of the seat-back cushion member 301B), in other words, the porous structural body 1 is exposed on at least part (preferably all) of the back surface of the cushion member 301.

As illustrated in FIGS. 4 and 5, in the present embodiment, the top skin 330 includes the plurality of through holes 331. Accordingly, the breathability of the cushion member 301 (the seat-cushion cushion member 301C and the seat-back cushion member 301B) can be improved. The breathability and vibration characteristics of the cushion member 301 can be adjusted by adjusting the number of the through holes 331 of the top skin 330, the diameter thereof, the area ratio thereof, and the like.

For example, to improve the breathability and manufacturability by a 3D printer, a diameter D331 of each through hole 331 is preferably equal to or larger than 0.5 mm, more preferably equal to or larger than 1 mm, further more preferably equal to or larger than 5 mm. To ensure favorable appearance of the passenger seat 300 and improve the durability of the porous structural body 1, the diameter D331 of each through hole 331 is preferably equal to or smaller than 30 mm, more preferably equal to or smaller than 10 mm.

To improve the durability of the porous structural body 1, the diameter D331 of each through hole 331 is preferably equal to or smaller than the average diameter of a cell hole C (FIG. 10) of the porous structural body 1 to be described later, more preferably smaller than the average diameter of the cell hole C of the porous structural body 1. For the same reason, the diameter D331 of each through hole 331 is preferably equal to or smaller than the diameter of a first cell hole C1 (FIG. 10) of the porous structural body 1 to be described later, more preferably smaller than the diameter of the first cell hole C1 of the porous structural body 1.

Note that, in the example illustrated in FIG. 5, the shape of each through hole 331 when the top skin 330 is seen in planar view is a circle, but the shape of each through hole 331 when the top skin 330 is seen in planar view may be an optional polygon such as a rectangle or a triangle or may be an optional shape such as an elliptical shape. When the shape of each through hole 331 when the top skin 330 is seen in planar view is non-circular, "the diameter D331" of the through holes 331 is the diameter of a circumscribed circle of each through hole 331 when the top skin 330 is seen in planar view.

As the area ratio of each through hole 331 when the top skin 330 is seen in planar view decreases, the breathability degrades and vibration damping performance degrades. As the area ratio of each through hole 331 when the top skin 330 is seen in planar view increases, the breathability improves and vibration damping performance improves. The area ratio of each through hole 331 when the top skin 330 is seen in planar view is preferably higher than 0%, more preferably equal to higher than 5%, further more preferably equal to higher than 25%. The area ratio of each through hole 331 when the top skin 330 is seen in planar view is preferably equal to or lower than 80%, more preferably equal to or lower than 55%. Note that "the area ratio of each through hole 331 when the top skin 330 is seen in planar view" is the ratio (A2×100/A1 [%]) of a total area A2 of all through holes 331 provided to the top skin 330 in planar view of the top skin 330 relative to an entire area A1 of the top skin 330 when the top skin 330 is spread on a plane. "The entire area A1 of the top skin 330 when the top skin 330 is spread on a plane" is the area of a part surrounded by the outer edge of the top skin 330 when the top skin 330 is spread on a plane, and the entire area A1 includes area occupied by the through holes 331.

In the example illustrated in FIG. 5, the plurality of through holes 331 are disposed in a regular disposition pattern in planar view of the top skin 330, but the plurality of through holes 331 may be disposed at random without regularity.

Note that the top skin 330 preferably entirely has the through holes 331, but only part of the top skin 330 may have a plurality of through holes 331. For example, the top skin 330 may have through holes 331 only at a part serving as the surface FS of the passenger seat 300 on the seated person side or only at a part covering the main pads 311 and 321.

Figure 6:
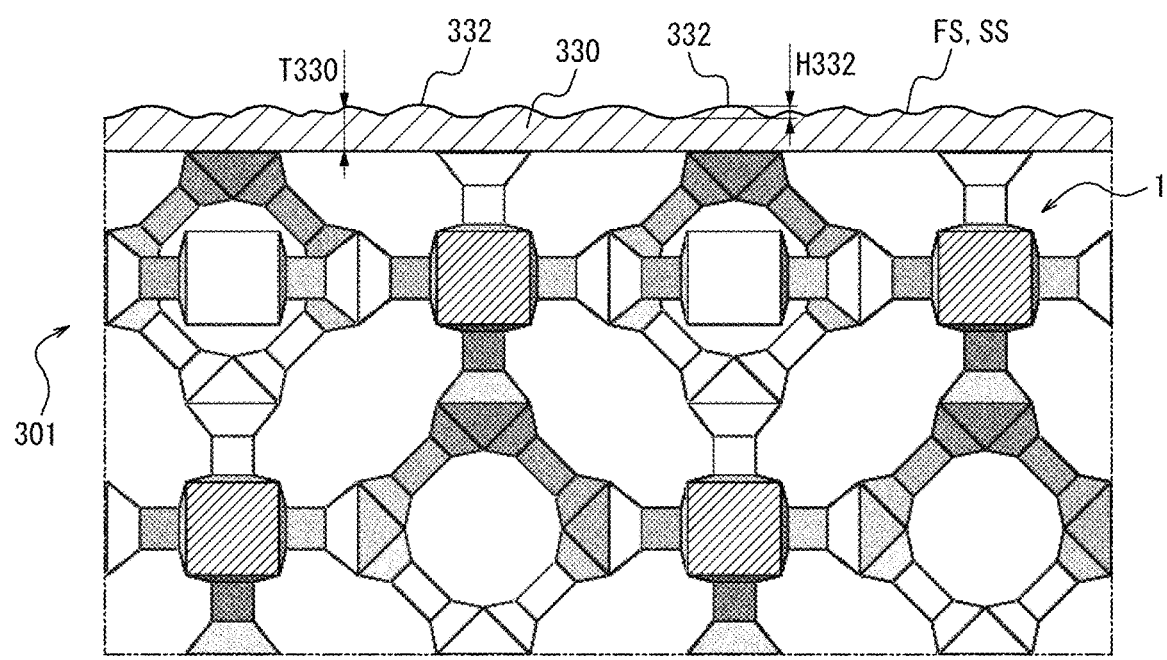
FIG. 6 is a cross-sectional view illustrating a partial section of a cushion member according to a second embodiment of the present disclosure.
Figure 7:
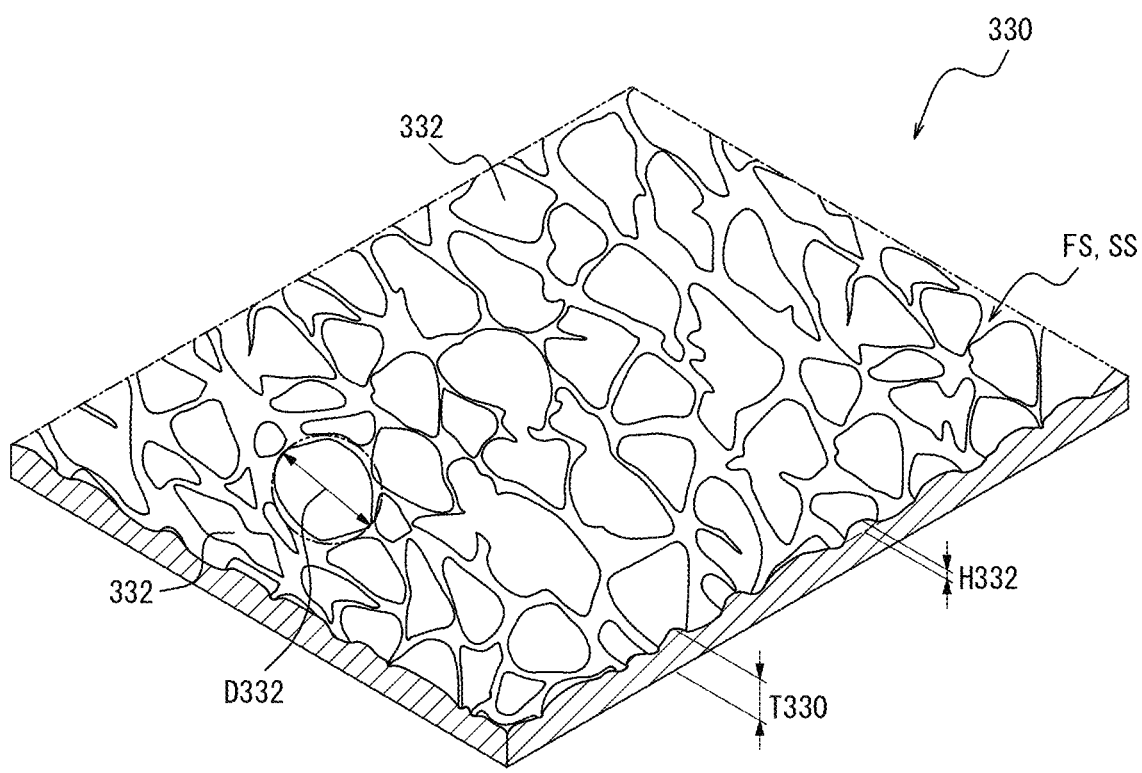
FIG. 7 is a perspective view illustrating part of a top skin of the cushion member in FIG. 6.

FIGS. 6 and 7 are drawings for description of the cushion member 301 according to a second embodiment and correspond to FIGS. 4 and 5, respectively. The cushion member 301 according to the second embodiment is different from that of the first embodiment illustrated in FIGS. 4 and 5 only in that the top skin 330 has an embossing pattern on the surface opposite to the porous structural body 1 instead of including the through holes 331.

The "embossing pattern" is an irregularity pattern formed on a surface of the top skin 330 by a plurality of protrusions 332 provided on the surface of the top skin 330.

The embossing pattern of the top skin 330 illustrated in FIGS. 6 and 7 is formed by disposing the protrusions 332 having various shapes and sizes.

However, the embossing pattern of the top skin 330 may be different from the example illustrated in FIG. 7, and the shapes and sizes of the protrusions 332 provided on the surface of the top skin 330 and the scheme of disposition thereof may be optional.

Figure 8:
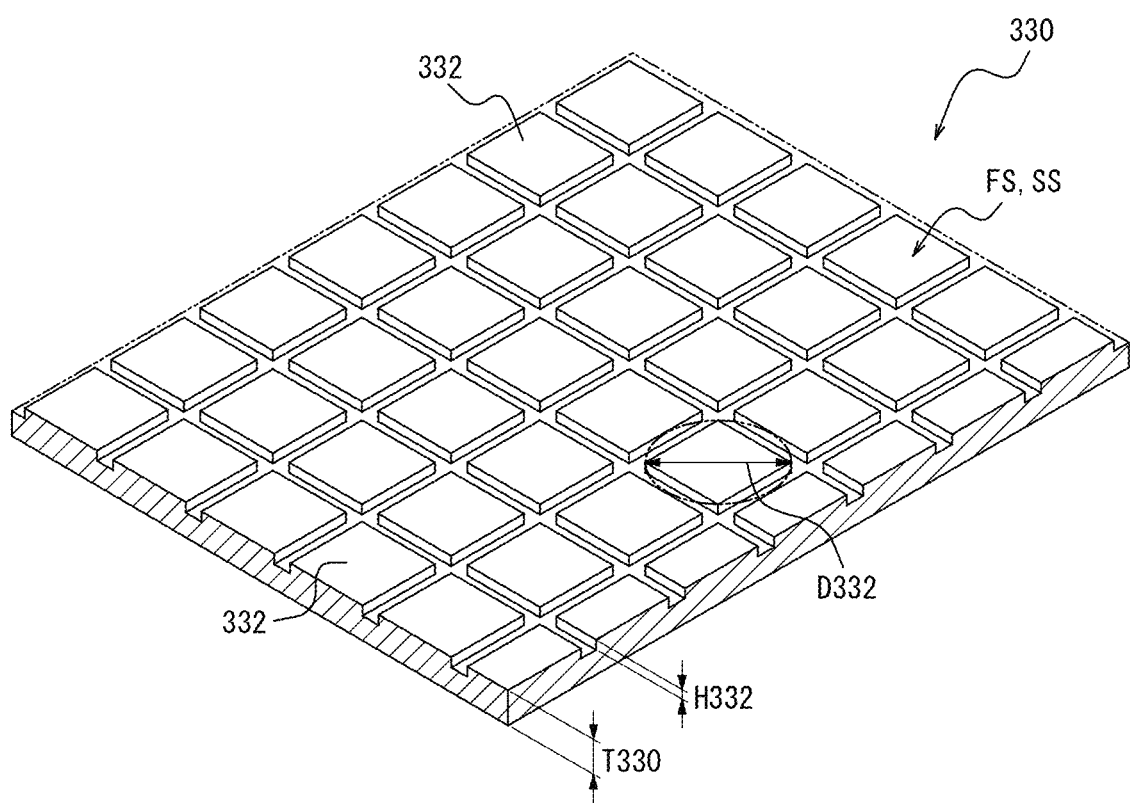
FIG. 8 is a perspective view illustrating part of a top skin of a cushion member according to a modification of the second embodiment of the present disclosure.

For example, as in a modification illustrated in FIG. 8, the embossing pattern of the top skin 330 may be formed by regularly disposing a plurality of protrusions 332 having the same shape and size. In the example illustrated in FIG. 8, the shape of each protrusion 332 is a rectangle in planar view of the top skin 330 but may be a polygon such as a triangle, or an optional shape such as a circular or an ellipse in planar view of the top skin 330. Although not illustrated, each protrusion 332 may be a protrusion longitudinally extending in one direction.

Since the surface of the top skin 330 has the embossing pattern, the top skin 330 can have the appearance and touch of a leather material. Accordingly, although manufactured by a 3D printer, the top skin 330 of the passenger seat 300 can have appearance and touch same as those of the top skin of a conventional typical passenger seat. Moreover, the top skin 330 can have reduced light reflectance and have reduced appearance of shine and dirt as compared to a case in which the surface thereof is smooth, and thus can provide a sense of luxury to the appearance of the passenger seat 300. Furthermore, the seated person can have excellent slipping touch when touching the top skin 330, and thus it is possible to improve touch and comfort and prevent abnormal noise when the seated person touches or sits.

To improve appearance and touch when the surface of the top skin 330 has the embossing pattern as in the examples in FIGS. 6 to 8, a height H332 of each protrusion 332 is preferably equal to or lower than 2 mm, more preferably equal to or lower than 1 mm. For the easiness of manufacturing by a 3D printer, the height H332 of each protrusion 332 is preferably equal to or higher than 0.1 mm.

To improve appearance and touch when the surface of the top skin 330 has the embossing pattern as in the examples of FIGS. 6 to 8, a diameter D332 of each protrusion 332 when the top skin 330 is seen in planar view is preferably equal to or smaller than 10 mm, more preferably equal to or smaller than 5 mm. For the easiness of manufacturing by a 3D printer, the diameter D332 of each protrusion 332 when the top skin 330 is seen in planar view is preferably equal to or larger than 0.1 mm.

Note that, when the shape of each protrusion 332 when the top skin 330 is seen in planar view is non-circular, "the diameter D332" of the protrusions 332 is the diameter of a circumscribed circle of the protrusions 332 when the top skin 330 is seen in planar view.

Note that the top skin 330 preferably entirely has an embossing pattern, but only part of the top skin 330 may have an embossing pattern. For example, the top skin 330 may have an embossing pattern only at a part serving as the surface FS of the passenger seat 300 on the seated person side.

The top skin 330 may have both the through holes 331 described in the first embodiment and the embossing pattern (in other words, the protrusions 332) described in the second embodiment.

The rigidity of the cushion member 301 can be adjusted by adjusting a thickness T330 of the top skin 330. The rigidity of the cushion member 301 increases as the thickness T330 of the top skin 330 increases. The rigidity of the cushion member 301 decreases as the thickness T330 of the top skin 330 decreases.

In each example described above, a maximum value (thickness at a position where the thickness T330 is maximum) of the thickness T330 of the top skin 330 is preferably 0.3 to 5 mm, more preferably 1 to 3 mm.

Accordingly, the easiness of manufacturing by a 3D printer is improved, and preferable characteristics as the cushion member 301 used for the passenger seat 300 (in particular, a car seat) are obtained. Moreover, it is possible to further improve the productivity of the passenger seat 300 and reduce the weight of the cushion member 301 while sufficiently maintaining the durability of the top skin 330.

Note that, in the example illustrated in FIG. 1, the cushion member 301 serve as the entire seat-cushion cushion member 301C and the entire seat-back cushion member 301B of the passenger seat 300.

However, the cushion member 301 may serve as only one of the seat-cushion cushion member 301C, the seat-back cushion member 301B, and the head rest 340 of the passenger seat 300.

Figure 30:
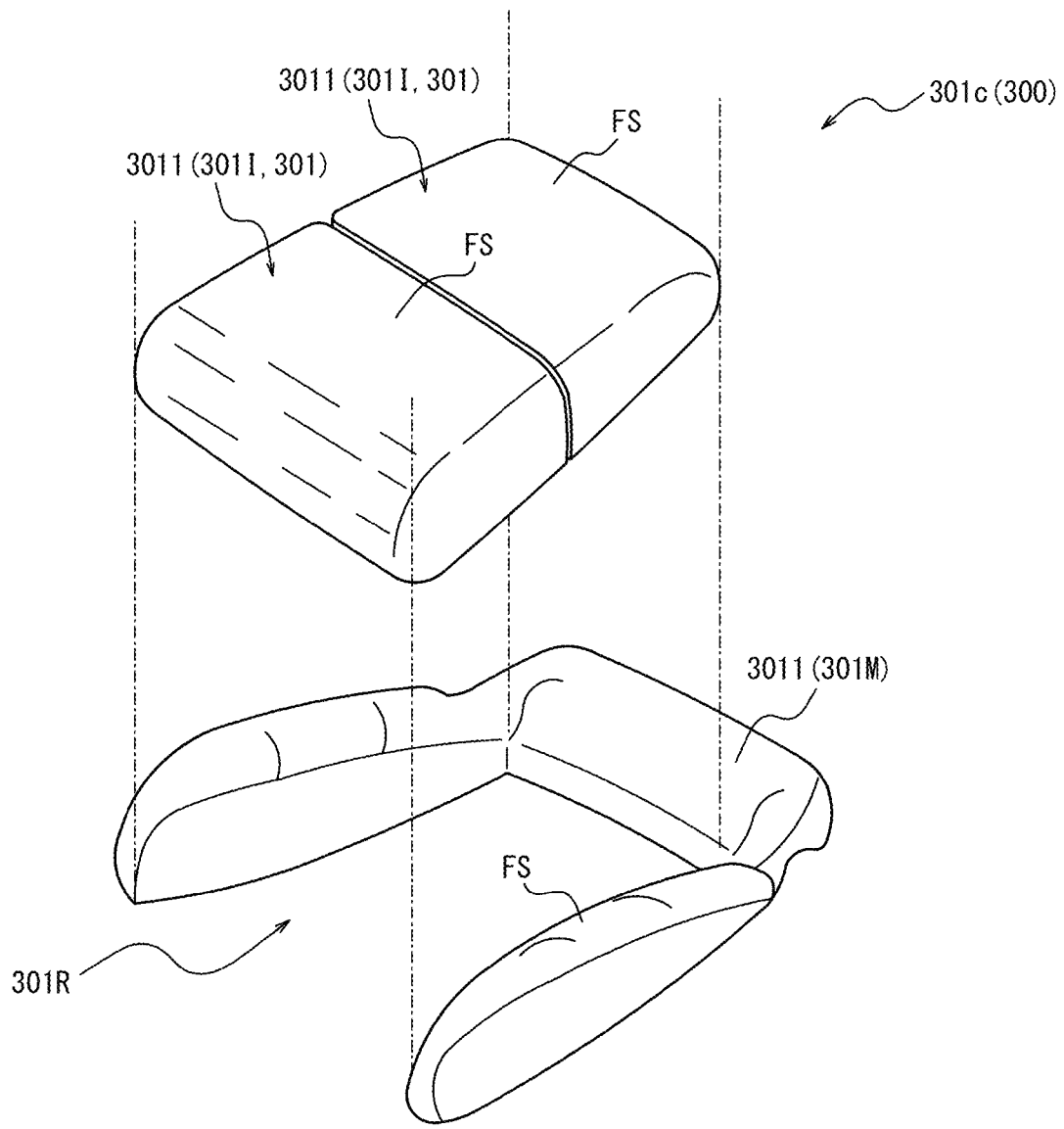
FIG. 30 is a drawing for description of a third modification of the passenger seat that can include a cushion member according to an optional embodiment of the present disclosure.

As in a modification illustrated in FIG. 30, the cushion member 301 may serve as only part of the seat-cushion cushion member 301C of the passenger seat 300, only part of the seat-back cushion member 301B, and/or only part of the head rest 340. Accordingly, the size of the cushion member 301 can be reduced so that the cushion member 301 can be manufactured by a relatively small-sized 3D printer. In this case, a part other than a part formed by the cushion member 301 among the seat-cushion cushion member 301C, the seat-back cushion member 301B, and the head rest 340 of the passenger seat 300 may be manufactured into a conventional typical configuration as described above through the process of foaming by chemical reaction in, for example, mold shaping or slab shaping. For example, as in the example of FIG. 30, the seat-cushion cushion member 301C, the seat-back cushion member 301B, and/or the head rest 340 of the passenger seat 300 may each include a plurality of cushion parts 3011 separated from each other, only some (one or a plurality) of the plurality of cushion parts 3011 may be formed of the cushion member 301, and the other cushion parts 3011 may have a conventional typical configuration as described above. More specifically, for example, as in the example of FIG. 30, the seat-cushion cushion member 301C, the seat-back cushion member 301B, and/or the head rest 340 of the passenger seat 300 may each include one or a plurality (in the example of FIG. 30, two) of filling bodies 3011 formed of the cushion member 301, and a body part 301M separated from the one or plurality of filling bodies 3011, including a concave part 301R in which the one or plurality of filling bodies 3011 is housed, and having a conventional typical configuration as described above. In this case, each filling body 3011 may serve as part of the surface FS of the passenger seat 300 on the seated person side and/or the side surface SS thereof, and in this case, the top skin 330 may serve as the surface FS of the filling body on the seated person side and/or the side surface SS thereof. In this case, the ratio of the area of the top skin 330 relative to the entire area of the surface FS of the seat-cushion cushion member 301C, the seat-back cushion member 301B, or the head rest 340 of the passenger seat 300 on the seated person side is preferably, for example, 10 to 50%.

Alternatively, the seat-cushion cushion member 301C, the seat-back cushion member 301B, and/or the head rest 340 of the passenger seat 300 may be constituted by the plurality of cushion parts 3011 separated from each other, and the plurality of cushion parts 3011 may be each formed of the cushion member 301. Accordingly, the size of the cushion member 301 can be reduced so that the cushion member 301 can manufactured by a relatively small-sized 3D printer.

In each example described in the present specification, when the seat-cushion cushion member 301C, the seat-back cushion member 301B, and/or the head rest 340 of the passenger seat 300 each include the plurality of cushion parts 3011 separated from each other and some (one or a plurality) of the plurality of cushion parts 3011 or all cushion parts 3011 are formed of the cushion member 301 as described above (and as in the example of FIG. 30), a pair of cushion parts 3011 adjacent to each other may be bonded to each other by adhesive 3012 as in the example of FIG. 31. In this case, the adhesive 3012 is preferably disposed not to be exposed on the surface FS of each cushion parts 3011 on the seated person side, in other words, is preferably separated on a back surface BS side from the surface FS of each cushion part 3011 on the seated person side. Accordingly, the seated person can be prevented from contacting the hardened adhesive 3012 when applying weight on the cushion parts 3011, and thus discomfort felt by the seated person through contact with the hardened adhesive 3012 can be prevented.

In this case, a distance L20 (FIG. 31) between a pair of facing surfaces 3011a facing each other (which is the thickness of the adhesive 3012) among surfaces of the above-described pair of cushion parts 3011 adjacent to each other is preferably 2 to 10 mm.

In this case, a distance L21 (FIG. 31) from the surface FS on the seated person side of each of the above-described pair of cushion parts 3011 adjacent to each other to the adhesive 3012 is preferably 2 to 20 mm. The distance L21 (FIG. 31) from the surface FS on the seated person side to the adhesive 3012 is measured perpendicularly to the surface FS on the seated person side.

In this case, it is preferable that one of the above-described pair of cushion parts 3011 adjacent to each other is formed of the cushion member 301 and the other of the above-described pair of cushion parts 3011 adjacent to each other is formed of the cushion member 301 or has a conventional typical configuration as described above.

Alternatively, in each example described in the present specification, when the seat-cushion cushion member 301C, the seat-back cushion member 301B, and/or the head rest 340 of the passenger seat 300 each include a plurality of cushion parts 3011 separated from each other and some (one or a plurality) of the plurality of cushion parts 3011 or all cushion parts 3011 are formed of the cushion member 301 as described above (as in the example of FIG. 30), the pair of cushion parts 3011 adjacent to each other may not be bonded to each other through the adhesive 3012 as in an example of FIG. 32. Accordingly, it is possible to prevent discomfort felt by the seated person contacting the hardened adhesive 3012 when applying weight to the cushion parts 3011.

In this case, the above-described pair of cushion parts 3011 adjacent to each other are preferably separated from each other. More specifically, a distance L23 (FIG. 32) between the pair of facing surfaces 3011a facing each other among the surfaces of the above-described pair of cushion parts 3011 adjacent to each other is preferably 5 to 20 mm. Accordingly, it is possible to prevent discomfort felt by the seated person when applying weight to the cushion parts 3011.

In this case, a corner 3011b between the surface FS on the seated person side and the facing surface 3011a on the surface of each of the above-described pair of cushion parts 3011 adjacent to each other preferably has a chamfered curve shape (in other words, is rounded) at a section of each cushion part 3011 in the thickness direction. Accordingly, it is possible to prevent discomfort felt by the seated person when applying weight to the cushion parts 3011.

In this case, it is preferable that one of the above-described pair of cushion parts 3011 adjacent to each other is formed of the cushion member 301 and the other of the above-described pair of cushion parts 3011 adjacent to each other is formed of the cushion member 301 or has a conventional typical configuration as described above.

[Cushion Member Manufacturing Method and 3D Shaping Data]

Subsequently, a cushion member manufacturing method according to an embodiment of the present disclosure will be described below with reference to FIG. 9. Specifically, the method exemplarily described below is a method of manufacturing the above-described cushion member 301 by a 3D printer.

First, three-dimensional shape data (for example, three-dimensional CAD data) representing the three-dimensional shape of the cushion member 301 is produced by using a computer in advance.

Subsequently, the above-described three-dimensional shape data is converted into 3D shaping data 500 by using a computer. The 3D shaping data 500 is read by a controller 410 of a 3D printer 400 when a shaping unit 420 of the 3D printer 400 performs shaping, and with 3D shaping data 500, the controller 410 causes the shaping unit 420 to shape the cushion member 301. The 3D shaping data 500 includes, for example, slice data representing the two-dimensional shape of each layer of the cushion member 301.

Subsequently, shaping of the cushion member 301 is performed by the 3D printer 400. The 3D printer 400 may perform the shaping by using an optional shaping scheme such as an optical shaping scheme, a powder sintering lamination scheme, a heat melting lamination scheme (FDM scheme), or an ink jet scheme. The optical shaping scheme is preferable to improve the productivity. FIG. 9 illustrates the shaping being performed by the optical shaping scheme.

The 3D printer 400 includes, for example, the controller 410 made of a CPU or the like, the shaping unit 420 configured to perform shaping in accordance with control by the controller 410, a supporting table 430 on which a shaping object (which is the cushion member 301) to be shaped is placed, and a housing body 440 in which liquid resin LR, the supporting table 430, and the shaping object are housed. The shaping unit 420 includes a laser emitter 421 configured to emit an ultraviolet laser beam LL when the optical shaping scheme is used as in the present example. The housing body 440 is filled with the liquid resin LR. The liquid resin LR is cured into flexible resin through irradiation of the ultraviolet laser beam LL emitted from the laser emitter 421.

In the 3D printer 400 thus configured, first, the controller 410 reads the 3D shaping data 500 and sequentially shapes each layer based on a three-dimensional shape included in the read 3D shaping data 500 while controlling the shaping unit 420 to emit the ultraviolet laser beam LL.

After the shaping by the 3D printer 400 is completed, the shaping object is taken out of the housing body 440. Accordingly, the cushion member 301 is finally obtained as the shaping object.

Since the cushion member 301 is manufactured by using the 3D printer, the cushion member 301 including the porous structural body 1 and the top skin 330 can be easily manufactured through one process and a desired configuration can be obtained.

Note that when the cushion member 301 is made of resin, the cushion member 301 as the shaping object may be heated in an oven after the shaping by the 3D printer 400 is completed. In this case, connection between layers included in the cushion member 301 can be reinforced to reduce anisotropy of the cushion member 301, and thus the cushioning characteristic of the cushion member 301 can be further improved.

When the cushion member 301 is made of rubber, the cushion member 301 as the shaping object may vulcanized after the shaping by the 3D printer 400 is completed.

[Porous Structural Body]

The porous structural body 1 of the cushion member 301 described above will be described below in detail with reference to FIGS. 10 to 23.

In FIGS. 10 to 19 and 21 to 23, the orientation of a XYZ orthogonal coordinate system fixed to the porous structural body 1 is indicated to facilitate understanding of the orientation of the porous structural body 1.

First, an example of the porous structural body 1 will be described below with reference to FIGS. 10 to 20.

Figure 10:
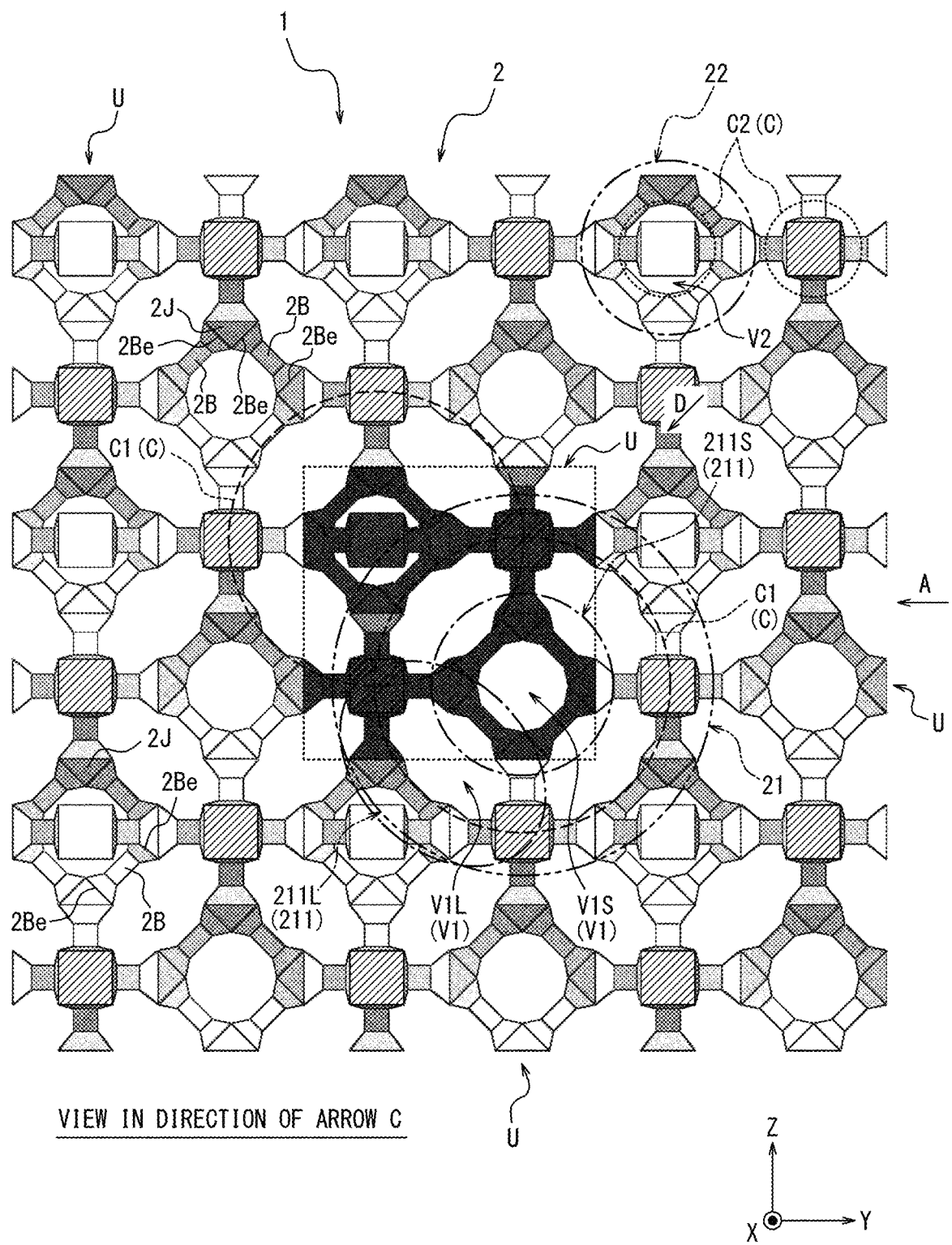
FIG. 10 is a planar view illustrating part of a porous structural body of the cushion member in FIG. 1 being viewed in the direction of arrow C in FIGS. 11 to 13.
Figure 11:
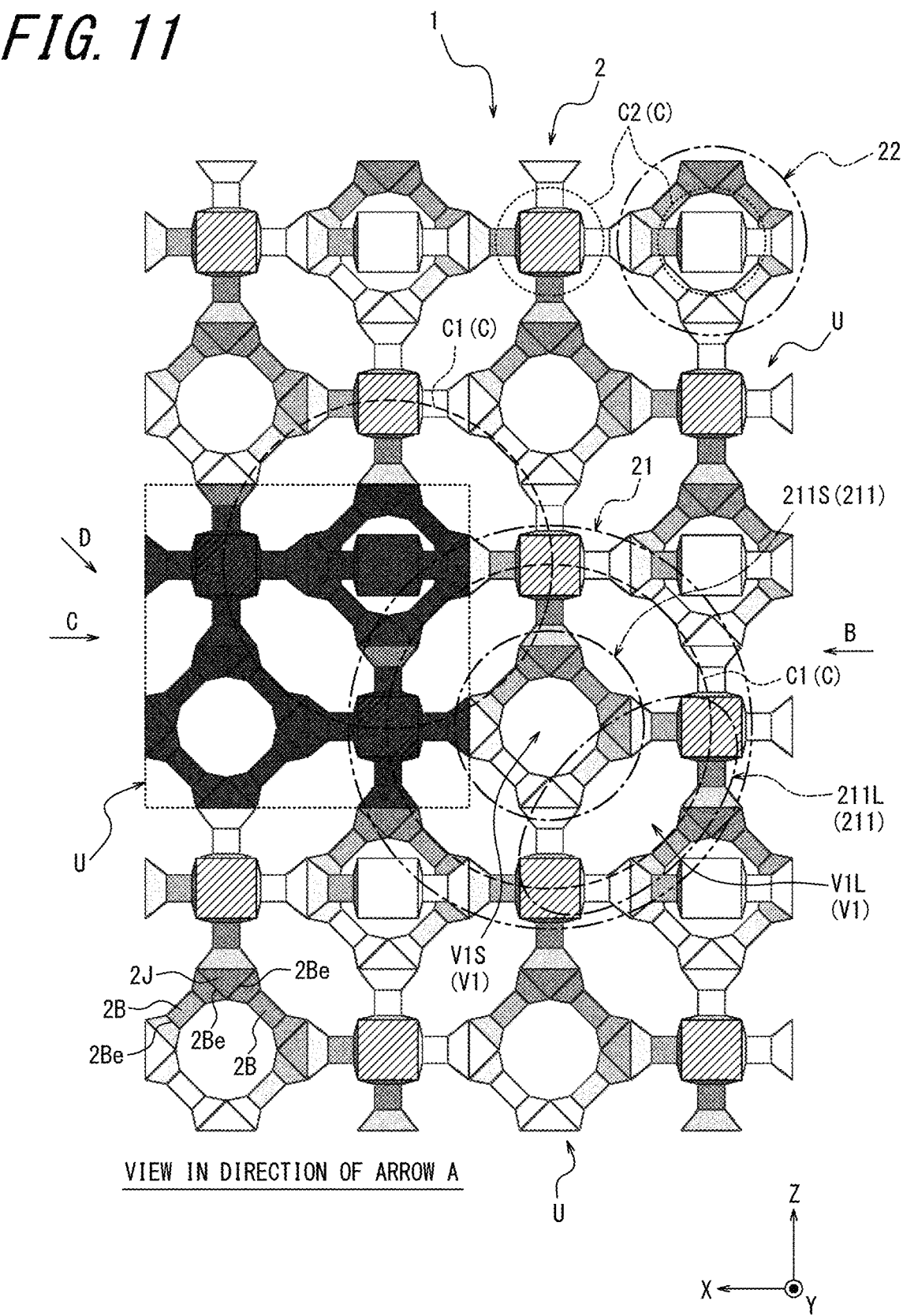
FIG. 11 is a side view illustrating the porous structural body in FIG. 10 being viewed in the direction of arrow A in FIGS. 10, 12, and 13.
Figure 12:
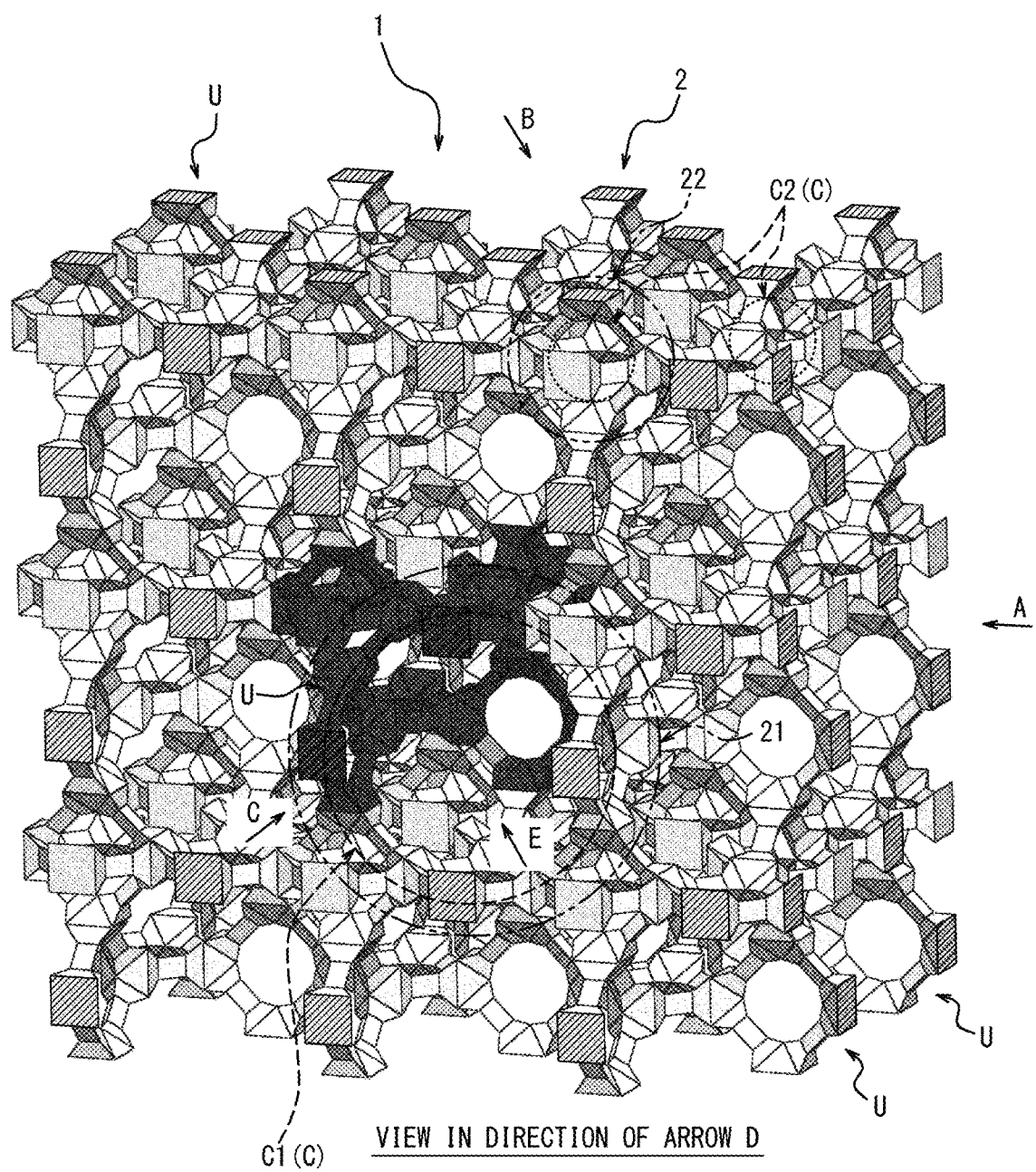
FIG. 12 is a perspective view illustrating the porous structural body in FIG. 10 being viewed in the direction of arrow D in FIGS. 10, 11, and 13.
Figure 13:
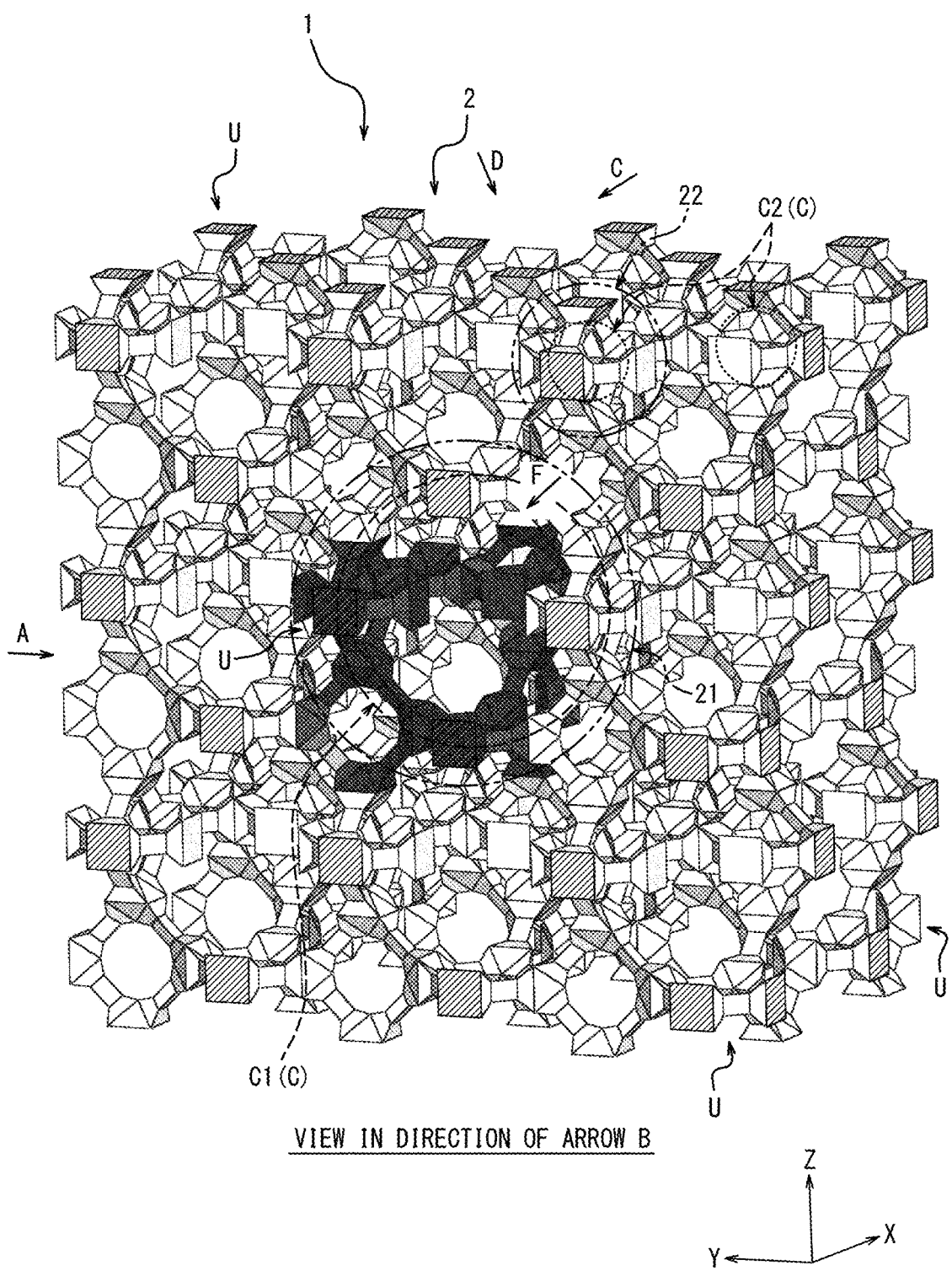
FIG. 13 is a perspective view illustrating the porous structural body in FIG. 10 being viewed in the direction of arrow B in FIGS. 11 and 12.

In FIGS. 10 to 13, a part cut into a rectangular parallelepiped in the porous structural body 1 according to the present example is viewed at different angles, respectively. In FIG. 10, one surface of the part of the porous structural body 1 is seen in planar view, in other words, the part of the porous structural body 1 is viewed in the direction of arrow C (−X direction) in FIGS. 11 to 13. In FIG. 11, a surface of the part of the porous structural body 1 on the right side in FIG. 10 is seen in planar view, in other words, the part of the porous structural body 1 is viewed in the direction of arrow A (−Y direction) in FIGS. 10, 12, and 13. In FIG. 12, a surface of the part of the porous structural body 1, which is same as that in FIG. 10 is obliquely viewed from above, in other words, the part of the porous structural body 1 is viewed in the direction of arrow D in FIGS. 10, 11, and 13. In FIG. 13, a surface of the part of the porous structural body 1 on a side opposite to that in FIGS. 10 and 12 is obliquely viewed from above, in other words, the part of the porous structural body 1 is viewed in the direction of arrow B in FIGS. 11 and 12.

As described above, the porous structural body 1 is made of flexible resin or rubber. More specifically, the porous structural body 1 includes a skeleton part 2 as a skeleton of the porous structural body 1, and a large number of cell holes C defined by the skeleton part 2. The skeleton part 2 exists in the entire porous structural body 1 and is made of flexible resin or rubber. In the present example, a part of the porous structural body 1 other than the skeleton part 2 is a void space.

The porous structural body 1, which is made of flexible resin or rubber, can perform compressing and restoring deformation in accordance with application and cancellation of external force and can have a cushioning characteristic.

The porous structural body 1 of the present example has a configuration in which a plurality of unit parts U having cube shapes are continuously integrated in X, Y, and Z directions. The part of the porous structural body 1 illustrated in FIGS. 10 to 13 is made of 18 unit parts U constituted by three unit parts arrayed in the Z direction, three unit parts arrayed in the Y direction, and two unit parts arrayed in the X direction. In the present example, the configuration, dimension, and orientation of each unit part U included in the porous structural body 1 are same. For convenience, one unit part U is colored in a gray color darker than those of the other unit parts U in FIGS. 10 to 13, and the outer edge of the unit parts U colored in the dark gray color is illustrated with a dotted line in FIGS. 10 and 11.

When the outer edge (outer outline) of each unit part U of the porous structural body 1 has a cube shape as in the present example, the same machine characteristics can be obtained in the X, Y, and Z directions.

Note that the outer edge (outer outline) of each unit part U may have a rectangular parallelepiped shape other than a cube shape, or another shape. The configurations and/or dimensions of the unit parts U included in the porous structural body 1 may not be completely identical but may be slightly different from one another. When the outer edge (outer outline) of each unit part U of the porous structural body 1 has a rectangular parallelepiped shape other than a cube shape, intentional anisotropy can be obtained as a function of the porous structural body 1. For example, when the porous structural body 1 is applied to a car passenger seat, the outer edge (outer outline) of each unit part U can have a rectangular parallelepiped shape other than a cube shape, thereby providing softness, for example, in the Z direction (the direction in which a person sits) to improve ride comfort.

Figure 14:
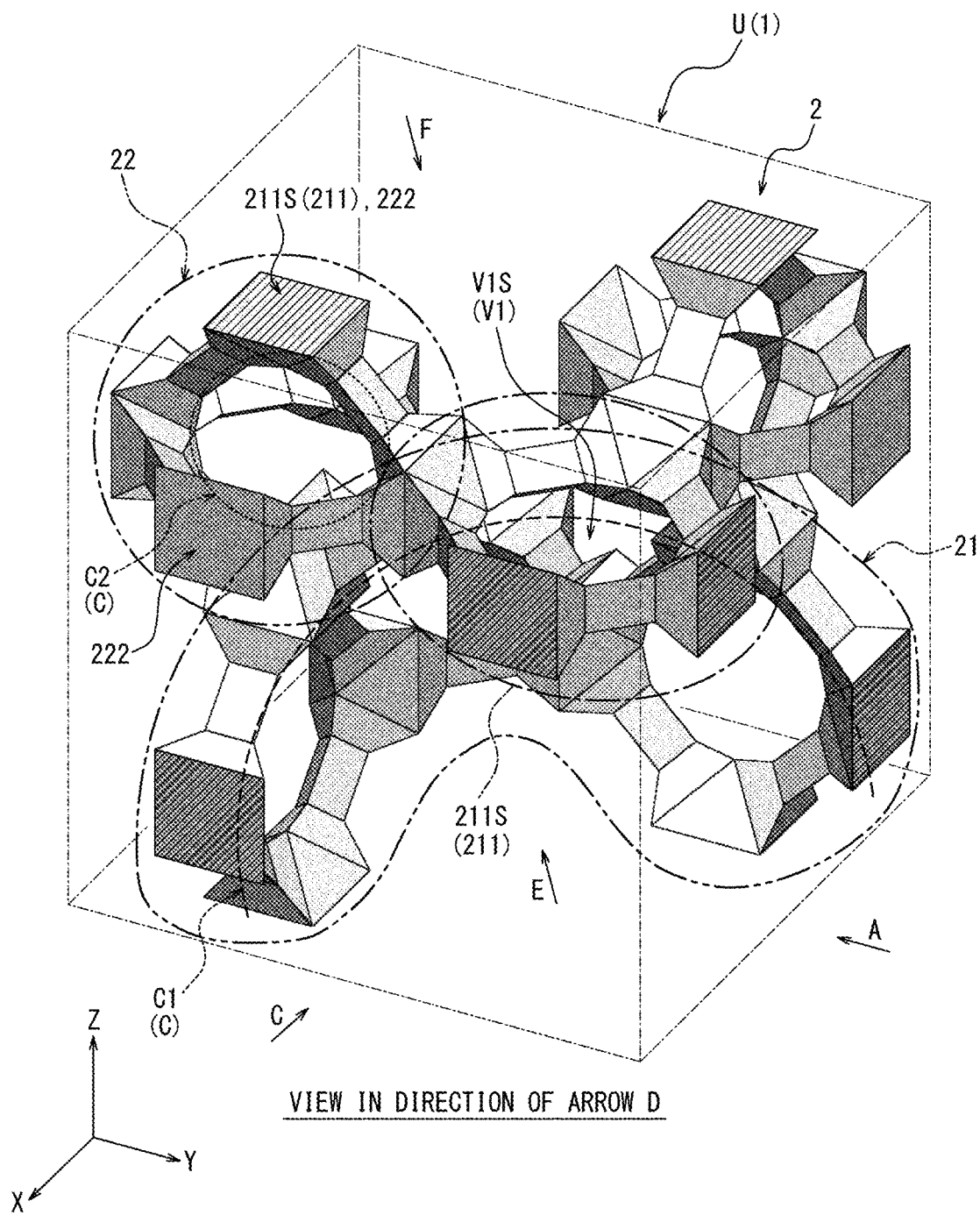
FIG. 14 is a perspective view illustrating a unit part of the porous structural body in FIG. 10 being viewed in the direction of arrow D in FIGS. 10, 11, and 13.
Figure 15:
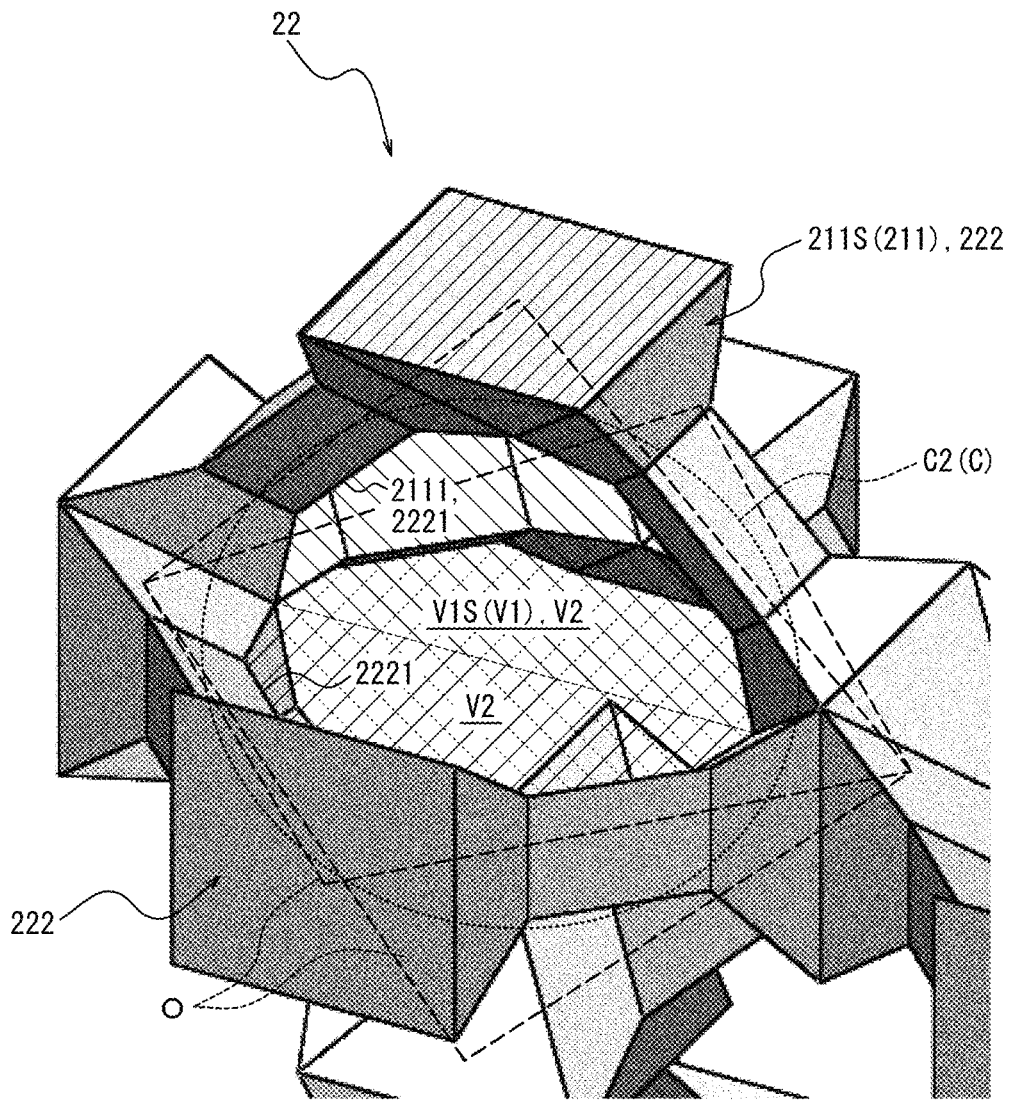
FIG. 15 is a perspective view illustrating part of the unit part of the porous structural body in FIG. 14 being viewed in an enlarged manner.
Figure 16:
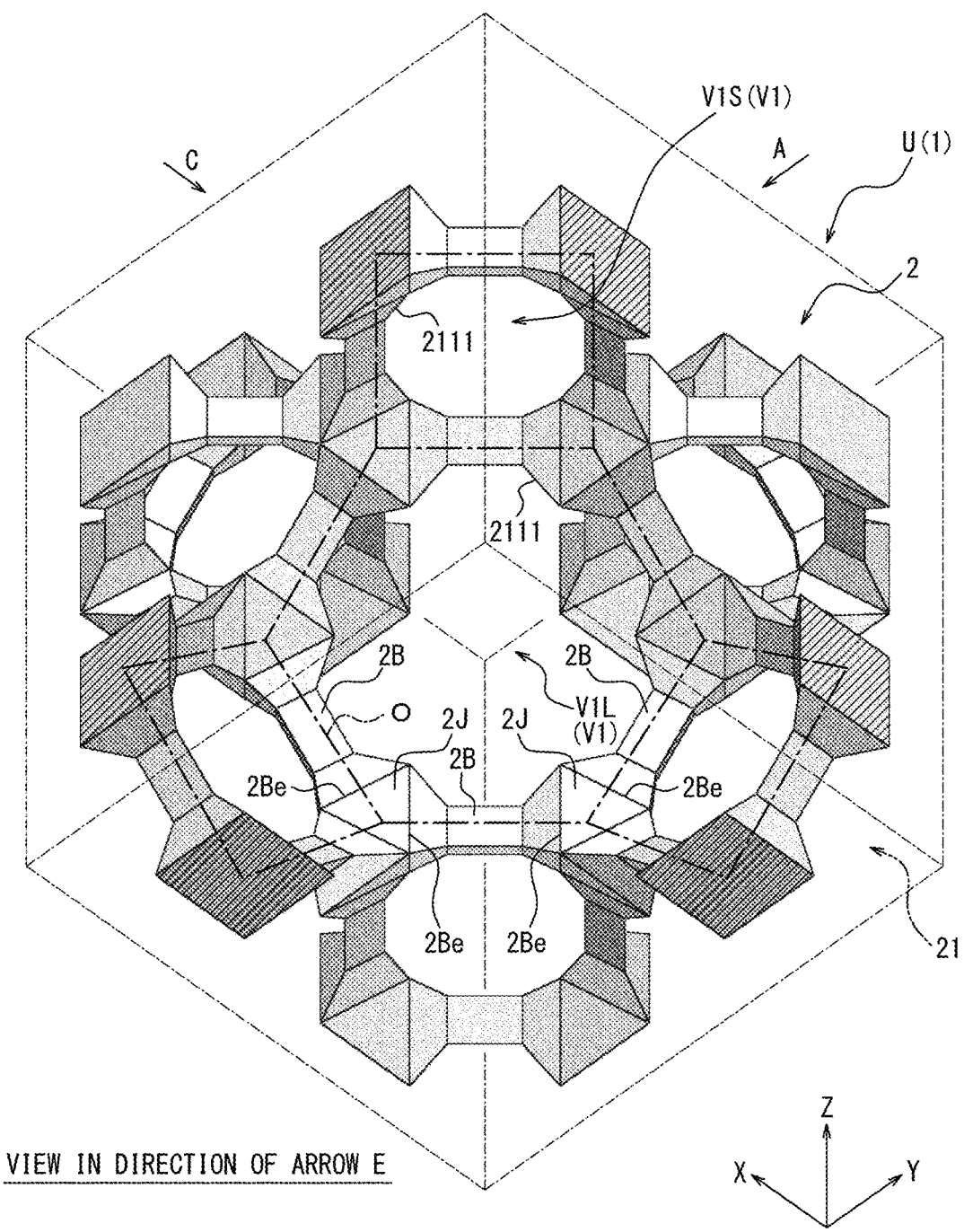
FIG. 16 is a perspective view illustrating the unit part of the porous structural body in FIG. 14 being viewed in the direction of arrow E in FIG. 14.
Figure 17:
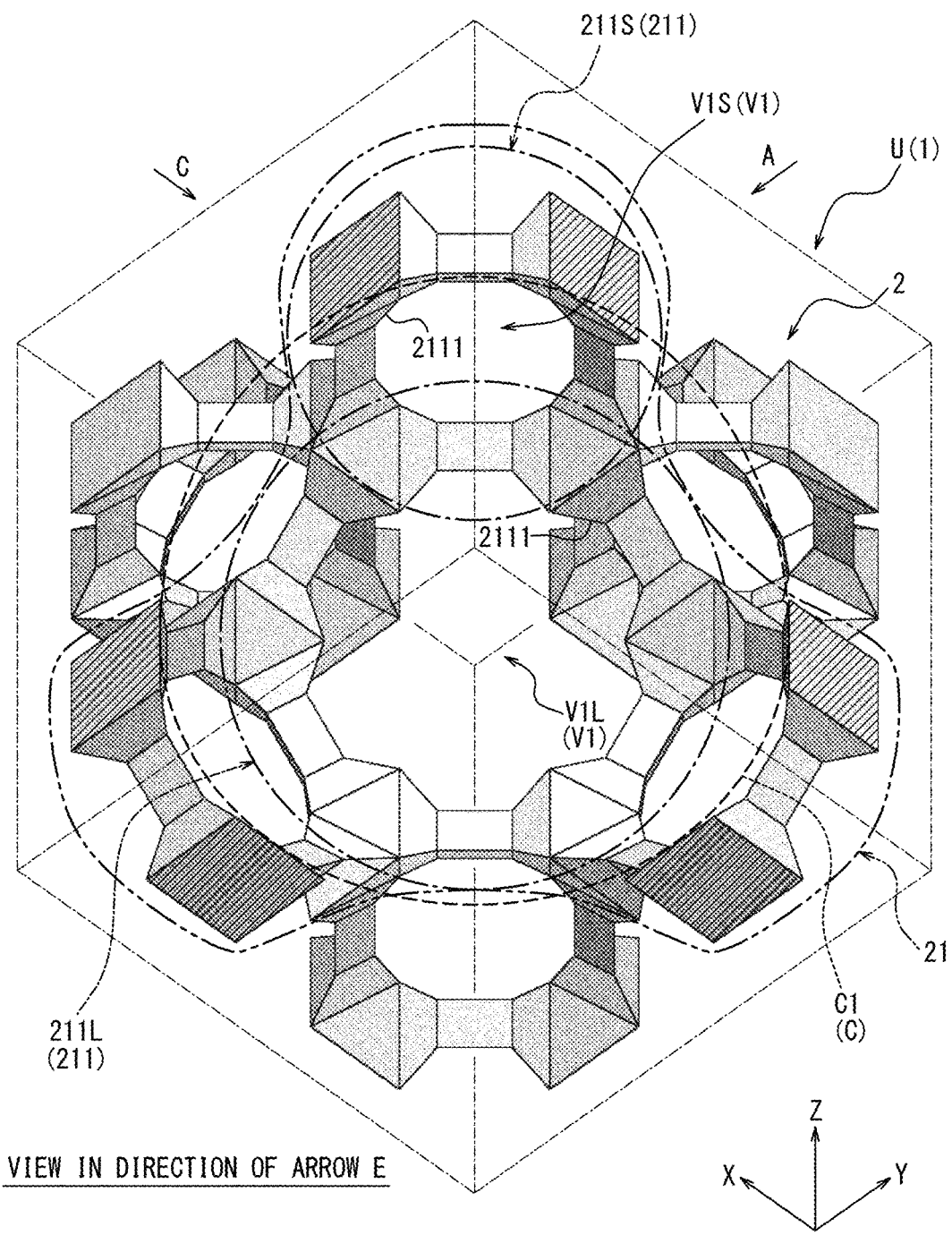
FIG. 17 is a drawing same as FIG. 16 with some reference signs, dashed lines, and dashed-dotted lines being different from those in FIG. 16.
Figure 18:
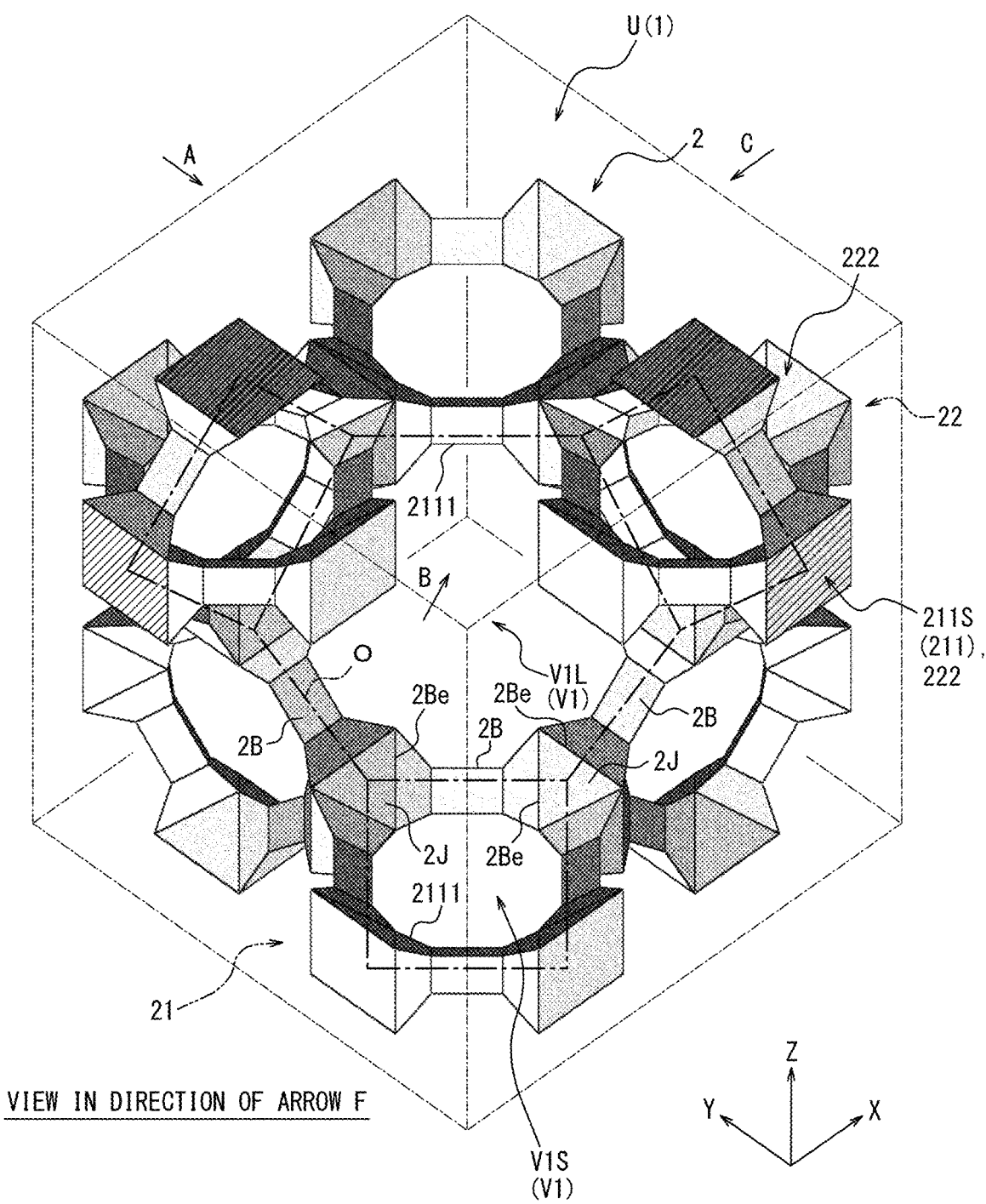
FIG. 18 is a perspective view illustrating the unit part of the porous structural body in FIG. 14 being viewed in the direction of arrow F in FIG. 14.
Figure 19:
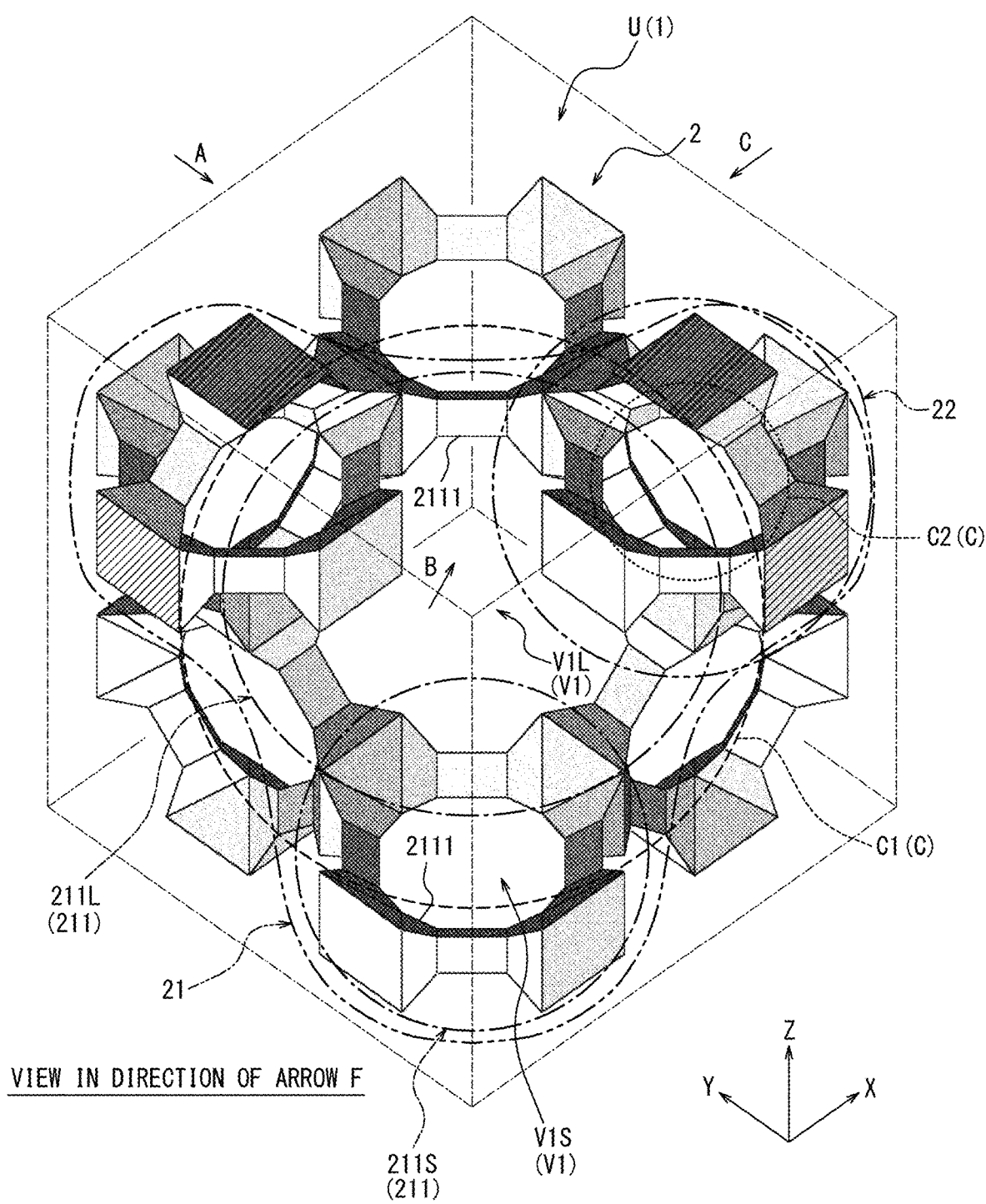
FIG. 19 is a drawing same as FIG. 18 with some reference signs, dashed lines, and dashed-dotted lines being different from those in FIG. 18.

FIGS. 14 to 19 illustrate one unit part U alone. In FIG. 14, the unit part U is viewed in a direction substantially same as that of FIG. 12, in other words, the unit parts U is viewed in the direction of arrow D in FIGS. 10, 11, and 13. In FIG. 15, part of FIG. 14 is viewed in an enlarged manner. In FIGS. 16 and 17, which are the same drawing, part of the unit part U on a side same as that of FIG. 14 is viewed from below, in other words, the unit part U is viewed in the direction of arrow E in FIGS. 12 and 14. Only difference between FIGS. 16 and 17 is that different dashed lines and dashed-dotted lines are illustrated for visibility of the drawings. In FIGS. 18 and 19, which are the same drawing, part of the unit part U on a side opposite to that of FIG. 14 is viewed from above, in other words, the unit part U is viewed in the direction of arrow F in FIGS. 13 and 14. Only difference between FIGS. 18 and 19 is that different dashed lines and dashed-dotted lines are illustrated for visibility of the drawings. For reference, arrows A, B, and C in FIGS. 10 to 13 are also illustrated in FIGS. 14 and 16 to 19.

As illustrated in FIGS. 10 to 19, the skeleton part 2 of the porous structural body 1 is constituted by a plurality of bone parts 2B and a plurality of connection parts 2J, and the entire skeleton part 2 is integrated. Each bone part 2B has a column shape in the present example and extends straight in the present example. Each connection part 2J connects end parts 2Be in extension directions of a plurality (in the illustrated example, two to six) of bone parts 2B extending in directions different from each other, at a place where the end parts 2Be are adjacent to each other.

In FIGS. 15, 16, and 18, a skeleton line O of the skeleton part 2 is illustrated at part of the porous structural body 1. The skeleton line O of the skeleton part 2 includes a skeleton line O of each bone part 2B and a skeleton line O of each connection part 2J. The skeleton line O of each bone part 2B is the central axis of the bone part 2B and constituted by the central axis of a bone constant part 2B1 and the central axis of a bone change part 2B2 to be described later. The skeleton line O of each connection part 2J is an extended line part obtained when the central axes of bone parts 2B connected with the connection part 2J smoothly extend into the connection part 2J and are coupled with each other. The central axis of each bone part 2B is a line obtained by connecting the barycenter point of the shape of the bone part 2B in a section orthogonal to the extension direction of the bone part 2B at each point in the extension direction of the bone part 2B.

The extension direction of each bone part 2B is the extension direction of the skeleton line O of the bone part 2B (a part corresponding to the bone part 2B in the skeleton line O; this is same in the following).

The porous structural body 1, which entirely includes the skeleton part 2, can perform compressing and restoring deformation in accordance with application and cancellation of external force while ensuring the breathability, and thus has excellent characteristics as a cushion member. Moreover, the porous structural body 1 has a simple structure and thus can be easily shaped by a 3D printer.

Note that some or all of the bone parts 2B included in the skeleton part 2 may extend in curved shapes. In this case, since some or all bone parts 2B are curved, it is possible to prevent abrupt shape change of the bone parts 2B and thus the porous structural body 1 and reduce local buckling at weight input.

Each edge part (side part where a pair of surfaces adjacent to each other face) of the skeleton part 2 is angulated in the drawings but may be smoothly curved.

In the present example, the bone parts 2B included in the skeleton part 2 have substantially same shapes and lengths. However, the present disclosure is not limited to the present example, but the shapes and/or lengths of the bone parts 2B included in the skeleton part 2 may not be same, and for example, the shapes and/or lengths of some bone parts 2B may be different from those of the other bone parts 2B. In this case, different machine characteristics can be intentionally obtained by differentiating the shape and/or length of a bone part 2B at a particular part of the skeleton part 2 from the other part. For example, when the porous structural body 1 is applied to the cushion pad 310 as in the examples of FIGS. 1 and 2 described above, part of the main pad 311 on the seating surface side (surface side) may be soft for improving ride comfort, and parts thereof serving as the side pads 312 may be hard for providing a sense of being held.

Figure 20A:
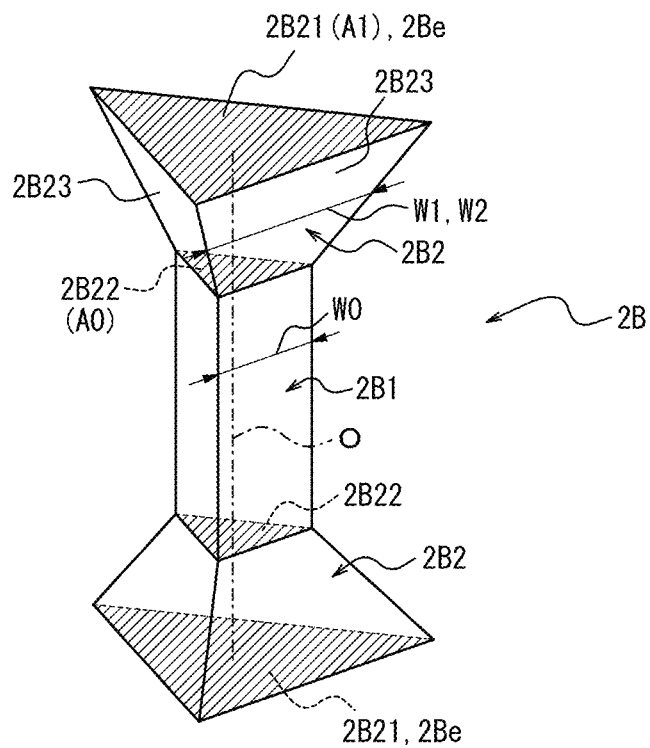
FIG. 20 (*a*) is a perspective view illustrating a bone part of the porous structural body in FIG. 10 in a state in which no external force is applied, and FIG. 20 (*b*) is a perspective view illustrating the bone part in FIG. 20 (*a*) in a state in which external force is applied.
Figure 20B:
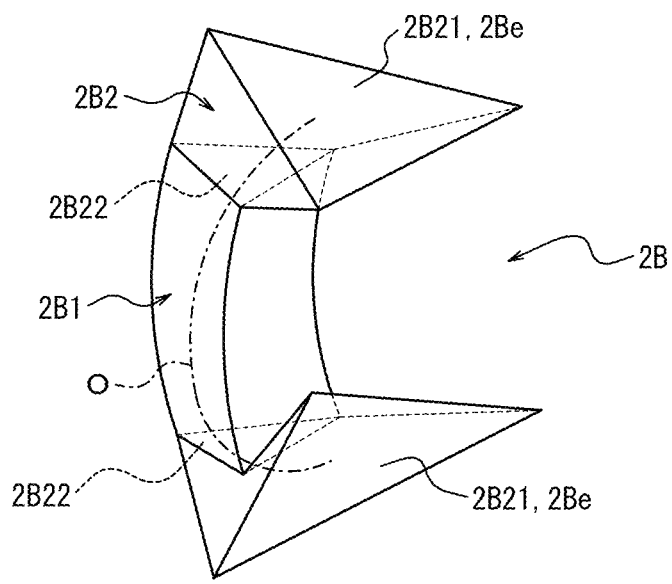

FIG. 20 illustrates each bone part 2B of the present example alone. FIG. 20 (a) illustrates a natural state in which no external force is applied to the bone part 2B, and FIG. 20 (b) illustrates a state in which external force is applied to the bone part 2B. In FIG. 20, the central axis (skeleton line O) of the bone part 2B is illustrated.

As illustrated in FIG. 20 (a), each bone part 2B is constituted by a bone constant part 2B1 extending while keeping cross-sectional area constant, and a pair of bone change parts 2B2 extending from the bone constant part 2B1 to the corresponding connection parts 2J while gradually changing cross-sectional area at both sides of the bone constant part 2B1 in the extension direction. In the present example, each bone change part 2B2 extends from the bone constant part 2B1 to the corresponding connection part 2J while gradually increasing cross-sectional area. Note that the present disclosure is not limited to the present example, but the same effect can be obtained when only some of the bone parts 2B included in the skeleton part 2 satisfy the above-described configuration. Some or all of the bone parts 2B included in the skeleton part 2 may each include a bone change part 2B2 only at an end part of the bone constant part 2B1 on one side whereas an end part of the bone constant part 2B1 on the other side may be directly connected with the corresponding connection part 2J, and in this case as well, the same effect can be obtained to some different extent.

The cross-sectional area of the bone constant part 2B1 and the cross-sectional area of the bone change part 2B2 are the cross-sectional area of a section of the bone constant part 2B1 and the cross-sectional area of a section of the bone change part 2B2, respectively, which are orthogonal to the skeleton line O. In the present specification, "gradually changing (increasing or decreasing)" means constantly smoothly changing (increasing or decreasing) without being constant halfway through the change.

In the present example, since each bone part 2B included in the porous structural body 1 is constituted by the bone constant part 2B1 and the bone change part 2B2 and the cross-sectional area of the bone change part 2B2 gradually increases as the position moves from the bone constant part 2B1 toward the corresponding connection part 2J, the bone part 2B has a constricted shape tapered toward the bone constant part 2B1 at a vicinity part of the boundary between the bone constant part 2B1 and the bone change part 2B2. Thus, when external force is applied, the bone part 2B is likely to perform buckling deformation at the constricted part and a middle part of the bone constant part 2B1, and accordingly, the porous structural body 1 is likely to perform compressed deformation. As a result, behavior and characteristics equivalent to those of typical poly urethane foam manufactured through the process of foaming by chemical reaction can be obtained. In addition, as a result, the surface of the porous structural body 1 provides softer touch. Thus, a softer feeling is provided to the seated person when sitting, particularly when starting sitting. Such a soft feeling is typically widely appreciated, and is appreciated by a seated person on a passenger seat of a luxury car (for example, a seated person on a backseat of a chauffeured car).

When at least part of the bone part 2B includes the bone constant part 2B1 as in the present example, a ratio A0/A1 of cross-sectional area A0 (FIG. 20 (a)) of the bone constant part 2B1 relative to cross-sectional area A1 (FIG. 20 (a)) of an edge 2B21 of the bone part 2B on any one side (preferably on both sides) preferably satisfies:

$$0.15 \leq A0/A1 \leq 2.0$$

Accordingly, the surface of the porous structural body 1 can provide touch of appropriate hardness, which is not too soft nor too hard, as characteristics of a cushion member for a passenger seat. Thus, a feeling of appropriate hardness is provided to a seated person when sitting, particularly when starting sitting. The surface of the porous structural body 1 provides softer touch as the ratio A0/A1 is smaller. When the ratio A0/A1 is smaller than 0.15, the surface of the porous structural body 1 potentially provides too soft touch, which is not preferable as characteristics of a cushion member. When the ratio A0/A1 is larger than 2.0, the surface of the porous structural body 1 potentially provides too hard touch, which is not preferable as characteristics of a cushion member.

Note that the ratio A0/A1 is more preferably equal to or larger than 0.5.

More specifically, in the present example, each bone part 2B includes the bone constant part 2B 1 and the pair of bone change parts 2B2 continuous with both sides of the bone constant part 2B1, each bone change part 2B2 extends from the bone constant part 2B1 to the corresponding connection part 2J while gradually increasing cross-sectional area, and the ratio A0/A1 is smaller than 1.0. Accordingly, the surface of the porous structural body 1 can provide relatively soft touch as characteristics of a cushion member for a passenger seat. Such a soft feeling is typically widely appreciated, and is appreciated by a seated person on a passenger seat of a luxury car (for example, a seated person on a backseat of a chauffeured car).

Note that each bone part 2B included in the skeleton part 2 may satisfy the above-described configuration, or only some bone parts 2B included in the skeleton part 2 may satisfy the above-described configuration, and in any case, the same effect can be obtained to some different extent.

Note that, unlike the present example, each bone change part 2B2 may extend from the bone constant part 2B1 to the corresponding connection part 2J while gradually decreasing cross-sectional area. In this case, the bone constant part 2B1 has a cross-sectional area larger than that of the bone change part 2B2 (is thicker than the bone change part 2B2). Accordingly, the bone constant part 2B1 is unlikely to deform when external force is applied, and instead, buckling is relatively likely to occur at the bone change part 2B2 (in particular, a part on the connection part 2J side), and thus the porous structural body 1 is unlikely to perform compressed deformation. Accordingly, the surface of the porous structural body 1 provides harder touch, and high hardness is obtained as machine characteristics. Thus, a harder feeling is provided to a seated person when sitting, particularly when starting sitting. Such a behavior is not easily obtained with typical poly urethane foam manufactured through the process of foaming by chemical reaction. With such a configuration, a user who prefers a harder feeling can be supported. Such a hard feeling is appreciated by, for example, a seated person on a passenger seat of a sports car that performs abrupt acceleration and deceleration and lane change.

The ratio A0/A1 is larger than 1.0 when the bone change part 2B2 extends from the bone constant part 2B1 to the corresponding connection part 2J while gradually decreasing cross-sectional area.

Note that each bone part 2B included in the skeleton part 2 may satisfy the above-described configuration, or only some bone parts 2B included in the skeleton part 2 may satisfy the above-described configuration, and in any case, the same effect can be obtained to some different extent.

Figure 21:
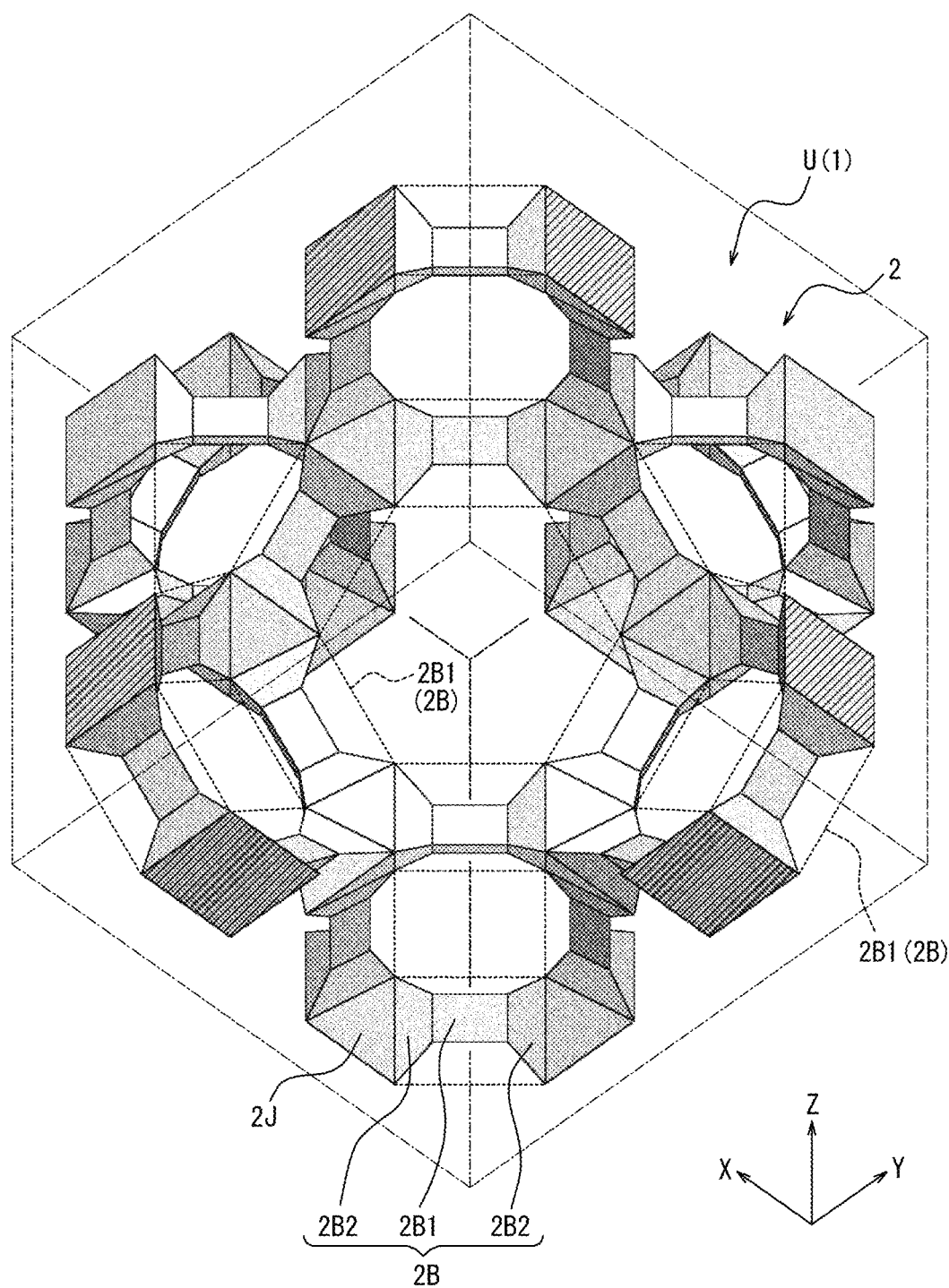
FIG. 21 is a drawing corresponding to FIG. 17, for description of a first modification of the porous structural body.

Alternatively, as in a first modification illustrated with a partially dotted line in FIG. 21, each bone part 2B may include only the bone constant part 2B1 with no bone change part 2B2. In this case, the cross-sectional area of the bone part 2B is constant over its entire length. When external force is applied, the surface of the porous structural body 1 provides touch of intermediate hardness. With such a configuration, a user who prefers a feeling of intermediate hardness can be supported. The configuration can be applied suitably to a passenger seat of any car type such as a luxury car or a sports car.

In this case, the ratio A0/A1 is 1.0.

Note that each bone part 2B included in the skeleton part 2 may satisfy the above-described configuration, or only some bone parts 2B included in the skeleton part 2 may satisfy the above-described configuration, and in any case, the same effect can be obtained to some different extent.

Returning to FIGS. 10 to 20, the cross-sectional area of the bone constant part 2B1 of each bone part 2B included in the skeleton part 2 is smaller than those of the bone change part 2B2 and the corresponding connection part 2J in the present example. More specifically, the cross-sectional area of the bone constant part 2B1 is smaller than the cross-sectional area of any part of each of the bone change part 2B2 and the connection part 2J (except for a boundary part between the bone constant part 2B1 and the bone change part 2B2). In other words, the bone constant part 2B1 is a part having a smallest cross-sectional area (narrowest) in the skeleton part 2. Accordingly, as described above, when external force is applied, the bone constant part 2B1 is likely to deform, and thus the porous structural body 1 is likely to perform compressed deformation. Accordingly, the surface of the porous structural body 1 provides softer touch.

Note that the cross-sectional area of each connection part 2J is the cross-sectional area of a section orthogonal to the skeleton line O of the connection part 2J.

Note that the present disclosure is not limited to the present example, but only some bone parts 2B included in the skeleton part 2 may satisfy the above-described configuration, and in this case as well, the same effect can be obtained to some different extent.

Similarly, in the present example, the width of the bone constant part 2B1 of each bone part 2B included in the skeleton part 2 is smaller than those of the bone change part 2B2 and the corresponding connection part 2J. More specifically, the width of the bone constant part 2B1 is smaller than the width of any part (except for the boundary part between the bone constant part 2B 1 and the bone change part 2B2) of each of the bone change part 2B2 and the connection part 2J. In other words, the bone constant part 2B1 is a part having a smallest width (narrowest) in the skeleton part 2. Accordingly, when external force is applied, the bone constant part 2B1 is likely to deform, and thus the surface of the porous structural body 1 provides softer touch.

Note that the widths of the bone constant part 2B1, the bone change part 2B2, and the connection part 2J are measured maximum widths of sections of the bone constant part 2B1, the bone change part 2B2, and the connection part 2J, respectively, which are orthogonal to the skeleton line O. The skeleton line O of the connection part 2J is part of the skeleton line O corresponding to the connection part 2J. In FIG. 20 (a), a width W0 of the bone constant part 2B1 and a width W1 of the bone change part 2B2 are indicated for reference.

Note that the present disclosure is not limited to the present example, but only some bone parts 2B included in the skeleton part 2 may satisfy the above-described configuration, and in this case as well, the same effect can be obtained to some different extent.

In each above-described example, for simplification of the structure of the porous structural body 1 and the easiness of manufacturing by a 3D printer, the width W0 (FIG. 20) of the bone constant part 2B1 is preferably equal to or larger than 0.05 mm, more preferably equal to or larger than 0.10 mm. Shaping can be performed at the resolution of a 3D printer of high performance when the width W0 is equal to or larger than 0.05 mm, and shaping can be performed not only at the resolution of a 3D printer of high performance but also at the resolution of a general-purpose 3D printer when the width W0 is equal to or larger than 0.10 mm.

However, to improve the accuracy of the outer edge (outer outline) shape of the porous structural body 1, reduce the gap (interval) between the cell holes C, and have excellent characteristics as a cushion member, the width W0 (FIG. 20) of the bone constant part 2B1 is preferably 0.05 mm to 2.0 mm inclusive.

Note that each bone part 2B included in the skeleton part 2 preferably satisfies the above-described configuration, but only some bone parts 2B included in the skeleton part 2 may satisfy the above-described configuration, and in this case as well, the same effect can be obtained to some different extent.

As illustrated in FIG. 20, in the present example, the bone change part 2B2 of each bone part 2B included in the skeleton part 2 has, as side surfaces, one or a plurality (in the present example, three) of tilted surfaces 2B23, each tilted surface 2B23 is tilted (at a tilt smaller than 90°) relative to the extension direction of the bone change part 2B2, and a width W2 gradually increases as the position moves from the bone constant part 2B1 toward the connection part 2J.

Accordingly, when external force is applied, the bone part 2B is likely to perform buckling deformation at the constricted part in the vicinity of the boundary between the bone constant part 2B1 and the bone change part 2B2, and thus the porous structural body 1 is likely to perform compressed deformation. Accordingly, the surface of the porous structural body 1 provides softer touch.

The extension direction of the bone change part 2B2 is the extension direction of the central axis (skeleton line O) of the bone change part 2B2. The width W2 of each tilted surfaces 2B23 of the bone change part 2B2 is the width of the tilted surfaces 2B23, which is measured along a section orthogonal to the skeleton line O of the bone change part 2B2.

Note that the present disclosure is not limited to the present example, but only some bone parts 2B included in the skeleton part 2 may satisfy the above-described configuration, and in this case as well, the same effect can be obtained to some different extent.

In each example described in the present specification, the cross-sectional shape of each bone part 2B (the bone constant part 2B 1 and/or the bone change part 2B2 when the bone part 2B includes the bone constant part 2B1 and the bone change part 2B2) among all or some (preferably, all) of the bone parts 2B included in the skeleton part 2 is preferably a polygon (preferably, a regular polygon) or a circle. In the present example, the cross-sectional shapes of the bone constant part 2B1 and the bone change part 2B2 in each bone part 2B included in the skeleton part 2 are regular triangles.

Accordingly, the porous structural body 1 has a simple structure and thus can be easily shaped by a 3D printer. Moreover, machine characteristics of typical poly urethane foam manufactured through the process of foaming by chemical reaction can be easily reproduced. Furthermore, since each bone part 2B has a column shape in this manner, the durability of the porous structural body 1 can be improved as compared to a case in which the bone part 2B is replaced with a thin film part.

Note that the cross-sectional shapes of the bone constant part 2B1 and the bone change part 2B2 are shape at a section orthogonal to the central axis (skeleton line O) of the bone constant part 2B1 and a section orthogonal to the central axis (skeleton line O) of the bone change part 2B2, respectively.

Note that the present disclosure is not limited to the present example, but only some bone parts 2B included in the skeleton part 2 may satisfy the above-described configuration, and in this case as well, the same effect can be obtained to some different extent.

In all or some bone parts 2B included in the skeleton part 2, the cross-sectional shapes of the bone constant part 2B1 and the bone change part 2B2 may be each a polygon (such as a triangle other than a regular triangle, or a rectangle) other than a regular triangle or may be a circle (such as an exact circle or an ellipse), and in this case as well, effects same as those of the present example can be obtained. The cross-sectional shapes of the bone constant part 2B1 and the bone change part 2B2 may be different from each other.

In each example described in the present specification, the ratio (VB×100/VS [%]) of volume VB of the skeleton part 2 relative to volume VS of the porous structural body 1 is preferably 3 to 10%. With the above-described configuration, reaction force that occurs to the porous structural body 1 when external force is applied to the porous structural body 1, in other words, the hardness of the porous structural body 1 is favorable as a cushion member for a passenger seat, particularly as a cushion member used for a car seat.

"The volume VS of the porous structural body 1" is the entire volume of an internal space surrounded by the outer edge (outer outline) of the porous structural body 1 (sum of the volume of the skeleton part 2, the volume of a film 3 to be described later when the film 3 is provided, and the volume of a void space).

When the material of the porous structural body 1 is constant, the porous structural body 1 is harder as the ratio of the volume VB of the skeleton part 2 relative to the volume VS of the porous structural body 1 is higher. The porous structural body 1 is softer as the ratio of the volume VB of the skeleton part 2 relative to the volume VS of the porous structural body 1 is lower.

The ratio of the volume VB of the skeleton part 2 relative to the volume VS of the porous structural body 1 is more preferably 4 to 8% to obtain reaction force that occurs to the porous structural body 1 when external force is applied to the porous structural body 1, in other words, the hardness of the porous structural body 1, which is favorable as a cushion member for a passenger seat.

Note that the ratio of the volume VB of the skeleton part 2 relative to the volume VS of the porous structural body 1 may be adjusted by using an optional method, for example, a method of adjusting the thicknesses (cross-sectional areas) of some or all bone parts 2B included in the skeleton part 2 and/or the sizes (cross-sectional areas) of some or all connection parts J included in the skeleton part 2 without changing the dimension of each unit part U of the porous structural body 1.

Figure 22:
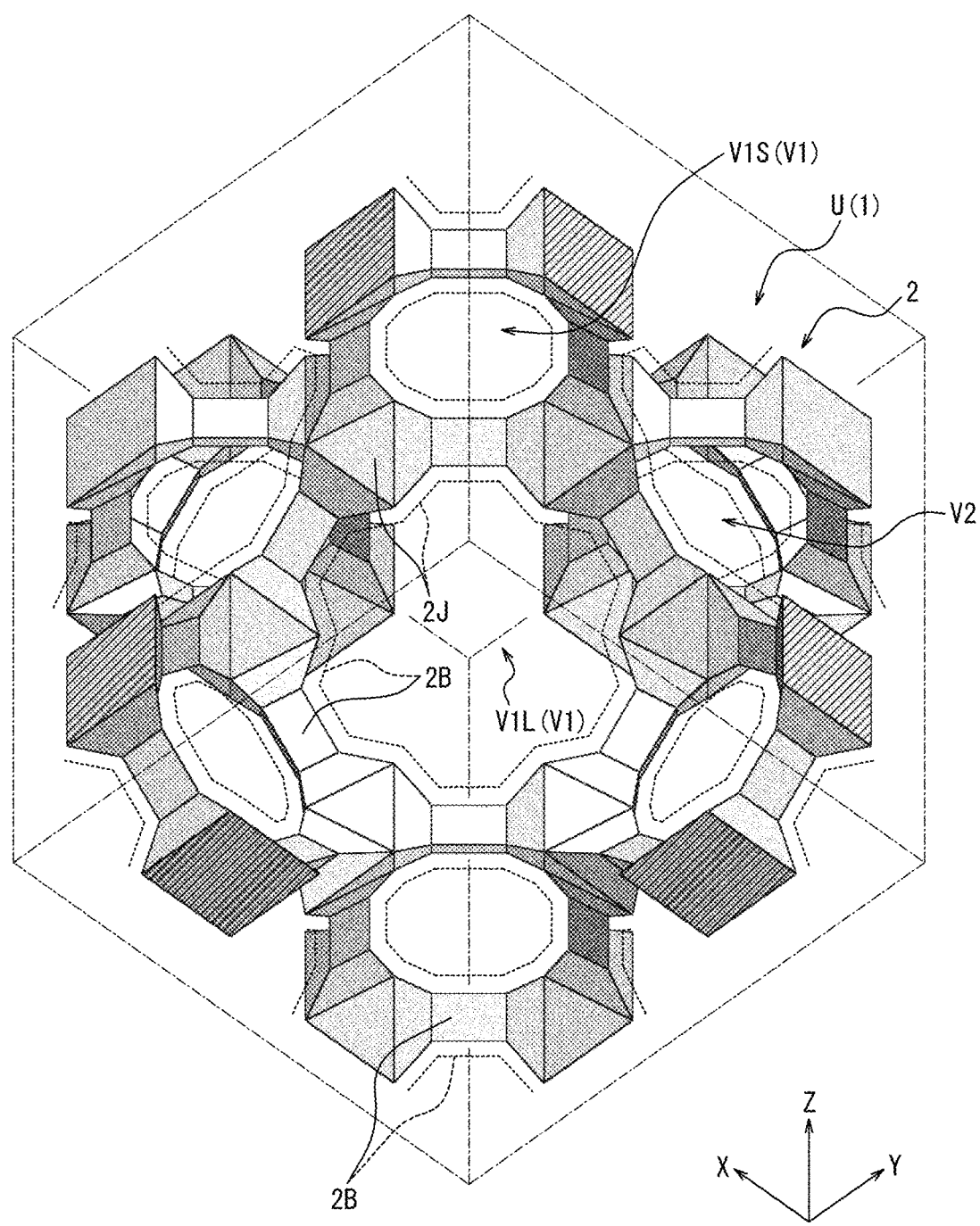
FIG. 22 is a drawing corresponding to FIG. 17, for description of a second modification of the porous structural body.

In a second modification illustrated in FIG. 22 as an exemplary method, the ratio of the volume VB of the skeleton part 2 relative to the volume VS of the porous structural body 1 is increased by increasing, as illustrated with dotted lines, the thickness (cross-sectional area) of each bone part 2B included in the skeleton part 2 and the size (cross-sectional area) of each connection part J included in the skeleton part 2 as compared to those of the porous structural body 1 (example of FIG. 17) illustrated with solid lines.

When the porous structural body 1 is used for a car seat, the 25% hardness of the porous structural body 1 is preferably 60 to 500 N, more preferably 100 to 450 N. The 25% hardness of the porous structural body 1 (N) is a measurement value obtained by measuring weight (N) taken for compressing the porous structural body by 25% at 23° C. and the relative humidity of 50% by using an instron compression testing machine.

As illustrated in FIGS. 10 to 13, in the present example, the porous structural body 1 has two kinds of cell holes C, namely, the first cell hole C1 and a second cell hole C2 having a diameter smaller than that of the first cell hole C1. In the present example, each cell hole C (the first cell hole C1 or the second cell hole C2) has a substantially polyhedral shape. More specifically, in the present example, the first cell hole C1 has a substantially Kelvin's tetradecahedral (truncated octahedral) shape. A Kelvin's tetradecahedron (truncated octahedron) is a polyhedron constituted by six square constituent faces and eight regular hexagonal constituent faces. In the present example, the second cell hole C2 has a substantially octahedral shape. However, in the illustrated example, since each bone part 2B includes not only the bone constant part 2B1 but also the bone change parts 2B2 on both sides thereof, the shapes of the first cell hole C1 and the second cell hole C2 are each not a mathematical (complete) Kelvin's tetradecahedron or octahedron. Schematically, the cell holes C included in the porous structural body 1 are regularly arrayed to spatially fill the internal space surrounded by the outer edge (outer outline) of the porous structural body 1 (to reduce each gap (interval) among the cell holes C). Each second cell hole C2 is disposed to fill a small gap (interval) among first cell holes C1. However, in the present example, as understood from FIGS. 13 and 18, in particular, part of each second cell hole C2 is positioned inside a first cell hole C1, in other words, the first cell hole C1 and the second cell hole C2 partially overlap with each other.

When some or all (in the present example, all) cell holes C of the porous structural body 1 have substantially polyhedral shapes as in the present example, each gap (interval) among cell holes C included in the porous structural body 1 is further reduced, and a larger number of cell holes C can be formed inside the porous structural body 1. With this configuration, the behavior of compressing and restoring deformation of the porous structural body 1 in accordance with application and cancellation of external force is more favorable as a cushion member for a passenger seat.

The polyhedron shape of each cell hole C is not limited to the present example but may be optional. For example, a configuration in which each first cell hole C1 has a substantially tetrahedral, substantially octahedral, or substantially dodecahedral shape is preferable to reduce each gap (interval) among cell holes C. Alternatively, the shapes of some or all cell holes C of the porous structural body 1 may be each a stereoscopic shape (for example, a sphere, an ellipsoid, or a cylinder) other than a substantially polyhedral shape. The porous structural body 1 may have only cell holes C of one kind (for example, only the first cell holes C1) or may include cell holes C of three or more kinds. Note that when the shape of each first cell hole C1 is substantially Kelvin's tetradecahedral (truncated octahedral) as in the present example, cushion-member characteristics equivalent to those of typical poly urethane foam manufactured through the process of foaming by chemical reaction can be most easily reproduced as compared to another shape.

In the present example, each first cell hole C1 is constituted by eight unit parts U, two being arrayed in each of the X, Y, and Z directions. Each unit part U serves as parts of a plurality of first cell holes C1. Two second cell holes C2 are disposed for each unit part U.

However, the present disclosure is not limited to the present example, but each cell hole C of the porous structural body 1 may be constituted by an optional number of unit parts U, and each unit part U may be included in an optional number of cell holes C.

As illustrated in FIGS. 10 to 13, in the present example, the skeleton part 2 includes a plurality of first cell defining parts 21 that each define the corresponding first cell hole C1 inside (in the number of first cell holes C1).

As illustrated in FIGS. 10, 11, 14, and 16 to 19, each first cell defining part 21 includes a plurality (in the present example, 14) first annular parts 211. Each first annular part 211 has an annular shape, and an annular inner periphery side edge part 2111 thereof defines a first virtual surface V1 that is flat. The first virtual surface V1 is a virtual plane (in other words, a virtual closed plane) defined by the inner periphery side edge part 2111 of the first annular part 211. The plurality of first annular parts 211 included in each first cell defining part 21 are coupled with each other so that the first virtual surfaces V1 defined by the respective inner periphery side edge parts 2111 thereof do not intersect with each other.

Each first cell hole C1 is defined by the plurality of first annular parts 211 included in the first cell defining part 21, and the plurality of first virtual surfaces V1 defined by the plurality of respective first annular parts 211. Schematically, each first annular part 211 is a part that defines a side of the stereoscopic shape of the first cell hole C1, and each first virtual surface V1 is a part that defines a constituent face of the stereoscopic shape of the first cell hole C1.

Each first annular part 211 is constituted by a plurality of bone parts 2B and a plurality of connection parts 2J connecting the end parts 2Be of the plurality of bone parts 2B.

A coupling portion of each pair of first annular parts 211 coupled with each other is constituted by one bone part 2B and a pair of connection parts 2J at both sides thereof, which are shared by the pair of first annular parts 211.

In the example of each drawing, each first annular part 211 is shared by a pair of first cell defining parts 21 adjacent to the first annular part 211 (in other words, a pair of first cell defining parts 21 sandwiching the first annular part 211 therebetween). In other words, each first annular part 211 serves as parts of a pair of first cell defining parts 21 adjacent to the first annular part 211.

Accordingly, each gap (interval) among first cell holes C1 (that is, a material part of the skeleton part 2 between the first cell holes C1) can be reduced as compared to a case in which each first annular part 211 is not shared by a pair of first cell defining parts 21 adjacent to the first annular part 211 (in other words, a pair of first cell defining parts 21 sandwiching the first annular part 211 therebetween), in other words, the pair of first cell defining parts 21 are formed independently from each other and the first annular parts 211 are formed adjacent to each other or separately from each other or a case in which a rib or the like is interposed between the first annular parts 211, and thus characteristics of the porous structural body 1 as a cushion member (particularly, a seat pad, and more particularly, a car seat pad) can be improved. Accordingly, the porous structural body 1 having a cushioning characteristic can be easily manufactured by a 3D printer.

Note that each first annular part 211 included in the skeleton part 2 preferably satisfies the above-described configuration, but only some first annular parts 211 included in the skeleton part 2 may satisfy the above-described configuration, and in this case as well, the same effect can be obtained to some different extent.

For the same reason, in each example described in the present specification, the skeleton lines O of each pair of first cell defining parts 21 adjacent to each other preferably match each other in a first annular part 211 shared by the pair of first cell defining parts 21.

In the example of each drawing, a surface of each first virtual surface V1 (front surface of the first virtual surface V1) on one side defines part of a first cell hole C1, and a surface of the first virtual surface V1 (back surface of the first virtual surface V1) on the other side defines part of another first cell hole C1. In other words, the front and back surfaces of each first virtual surface V1 define parts of first cell holes C1 different from each other. In other words, each first virtual surface V1 is shared by a pair of first cell holes C1 adjacent to the first virtual surface V1 (in other words, a pair of first cell holes C1 sandwiching the first virtual surface V1 therebetween).

Accordingly, each gap (interval) among first cell holes C1 can be reduced as compared to a case in which each first virtual surface V1 is not shared by a pair of first cell holes C1 adjacent to the first virtual surface V1 (in other words, a pair of first cell holes C1 sandwiching the first virtual surface V1 therebetween), in other words, the first virtual surfaces V1 of the pair of first cell holes C1 are separated from each other, and thus the cushion-member characteristics of the porous structural body 1 can be improved.

Note that each first virtual surface V1 included in the skeleton part 2 preferably satisfies the above-described configuration, but only some first virtual surfaces V1 included in the skeleton part 2 may satisfy the above-described configuration, and in this case as well, the same effect can be obtained to some different extent.

In each example described in the present specification, as in the example of each drawing, the skeleton line O of each first annular part 211 shared by a pair of first cell defining parts 21 adjacent to each other is preferably continuous with the skeleton lines O of the pair of first cell defining parts 21 at parts adjacent to the shared first annular part 211.

With this configuration, the cushion-member characteristics of the porous structural body are more favorable.

For the same reason, in each example described in the present specification, as in the example of each drawing, the skeleton lines O of each pair of first cell defining parts 21 adjacent to each other are preferably match each other in a first annular part 211 shared by the pair of first cell defining parts 21.

In addition, for the same reason, in each example described in the present specification, as in the example of each drawing, the cross-sectional area (for example, the cross-sectional area of the bone constant part 2B1) of each bone part 2B included in a first annular part 211 shared by each pair of first cell defining parts 21 adjacent to each other is preferably same as the cross-sectional area (for example, the cross-sectional area of the bone constant part 2B1) of each bone part 2B included in part of each first cell defining part 21, which is adjacent to the shared first annular part 211.

Note that all first annular parts 211 each shared by a pair of first cell defining parts 21 adjacent to each other in the skeleton part 2 preferably satisfy the above-described configuration, but only some first annular parts 211 each shared by a pair of first cell defining parts 21 adjacent to each other in the skeleton part 2 may satisfy the above-described configuration, and in this case as well, the same effect can be obtained to some different extent.

In each example described in the present specification, as in the example of each drawing, the skeleton line O of the coupling portion of each pair of first annular parts 211 coupled with each other is preferably continuous with the skeleton line O of part of each first annular part 211, which is adjacent to the coupling portion.

With this configuration, the cushion-member characteristics of the porous structural body 1 are more favorable.

For the same reason, in each example described in the present specification, as in the example of each drawing, the skeleton lines O of each pair of first annular parts 211 coupled with each other are preferably match each other in the coupling portion of the pair of first annular parts 211.

In addition, for the same reason, in each example described in the present specification, as in the example of each drawing, the cross-sectional area (for example, the cross-sectional area of the bone constant part 2B1) of each bone part 2B included in the coupling portion of each pair of first annular parts 211 coupled with each other is preferably same as the cross-sectional area (for example, the cross-sectional area of the bone constant part 2B1) of each bone part 2B included in part of each first annular part 211, which is adjacent to the coupling portion.

Note that the coupling portions of all pairs of first annular parts 211 coupled with each other in the skeleton part 2 preferably satisfy the above-described configuration, but only the coupling portions of some pairs of first annular parts 211 coupled with each other in the skeleton part 2 may satisfy the above-described configuration, and in this case as well, the same effect can be obtained to some different extent.

In the present example, each first virtual surface V1 is not covered with a film but is opened, in other words, has an opening. Thus, cell holes C are communicated with each other through the first virtual surface V1 to allow ventilation between the cell holes C. Accordingly, the breathability of the porous structural body 1 is improved, and compressing and restoring deformation of the porous structural body 1 in accordance with application and cancellation of external force can be easily performed.

As illustrated in FIGS. 10, 11, 14, and 16 to 19, in the present example, the plurality (in the present example, 14) first annular parts 211 included in each first cell defining part 21 each include one or a plurality (in the present example, six) of first small annular parts 211S and one or a plurality (in the present example, eight) of first large annular parts 211L. The annular inner periphery side edge part 2111 of each first small annular part 211S defines a first small virtual surface V1S that is flat. The annular inner periphery side edge part 2111 of each first large annular part 211L defines a first large virtual surface V1L that is flat and has an area larger than that of the first small virtual surface V1S. The first small virtual surface V1S and the first large virtual surface V1L are each a virtual plane (in other words, a virtual closed plane).

FIGS. 16 and 18 illustrate the skeleton line O of part of each unit part U, which serves as a first cell defining part 21. As understood from FIGS. 16 and 18, in the present example, the skeleton line O of each first large annular part 211L has a regular hexagonal shape, and accordingly, the corresponding first large virtual surface V1L substantially has a regular hexagonal shape. In the present example, the skeleton line O of each first small annular part 211S has a square shape, and accordingly, the corresponding first small virtual surface V1S substantially has a square shape. In this manner, in the present example, the first small virtual surface V1S and the first large virtual surface V1L are different from each other not only in area but also in shape.

Each first large annular part 211L is constituted by a plurality (in the present example, six) of bone parts 2B and a plurality (in the present example, six) of connection parts 2J connecting the end parts 2Be of the plurality of bone parts 2B. Each first small annular part 211S is constituted by a plurality (in the present example, four) of bone parts 2B and a plurality (in the present example, four) of connection parts 2J connecting the end parts 2Be of the plurality of bone parts 2B.

In the example of each drawing, the skeleton lines O of the plurality of first cell defining parts 21 included in the skeleton part 2 each have a Kelvin's tetradecahedral (truncated octahedral) shape. As described above, a Kelvin's tetradecahedron (truncated octahedron) is a polyhedron constituted by six square constituent faces and eight regular hexagonal constituent faces. Accordingly, the first cell hole C1 defined by each first cell defining part 21 substantially has a Kelvin's tetradecahedral shape. In each illustrated example, since each bone part 2B includes not only the bone constant part 2B1 but also the bone change parts 2B2 at both sides thereof, the shape of the first cell hole C1 is not a mathematical (complete) Kelvin's tetradecahedral shape. The skeleton lines O of the plurality of first cell defining parts 21 included in the skeleton part 2 are continuous with each other to achieve spatial filling. In other words, there is no gap between the skeleton lines O of the plurality of first cell defining parts 21.

In this manner, in the example of each drawing, since the skeleton lines O of the plurality of first cell defining parts 21 included in the skeleton part 2 each have a polyhedral shape (in each illustrated example, a Kelvin's tetradecahedral shape), and accordingly, each first cell hole C1 has a substantially polyhedral shape (in each illustrated example, a substantially Kelvin's tetradecahedral shape), each gap (interval) among cell holes C included in the porous structural body 1 can be further reduced, and a larger number of cell holes C can be formed inside the porous structural body 1. Moreover, with this configuration, the behavior of compressing and restoring deformation of the porous structural body 1 in accordance with application and cancellation of external force is more favorable as a cushion member, particularly as a seating cushion member. Note that each gap (interval) among cell holes C corresponds to a material part (bone part 2B or connection part 2J) of the skeleton part 2 that defines the cell holes C.

In the example of each drawing, since the skeleton lines O of the plurality of first cell defining parts 21 included in the skeleton part 2 are continuous with each other to achieve spatial filling, each gap (interval) among first cell holes C1 included in the porous structural body 1 can be further reduced. Thus, the cushion-member characteristics of the porous structural body can be improved.

The polyhedral shape of the skeleton line O of each first cell defining part 21 (that is, the substantially polyhedral shape of each first cell hole C1) is not limited to the example of each drawing but may be optional.

For example, the polyhedral shape of each of the skeleton lines O of the plurality of first cell defining parts 21 included in the skeleton part 2 (that is, the substantially polyhedral shape of each first cell hole C1) preferably allows spatial filling (disposition without gaps). Accordingly, the skeleton lines O of the plurality of first cell defining parts 21 included in the skeleton part 2 can be continuous with each other to achieve spatial filling, and thus the cushion-member characteristics of the porous structural body can be improved. In this case, the polyhedral shape of each of the skeleton lines O of the plurality of first cell defining parts 21 included in the skeleton part 2 (that is, the substantially polyhedral shape of each first cell hole C1) may include only a polyhedral shape of one kind as in the example of each drawing or may include polyhedral shapes of a plurality of kinds. The "kind" of a polyhedral shape is a shape (the number and shapes of constituent faces), and specifically, two polyhedral shapes having different shapes (the number and shapes of constituent faces) are treated as polyhedral shapes of two kinds, and two polyhedral shapes having the same shape but having different dimensions are treated as polyhedral shapes of the same kind. Examples of the polyhedral shape of each of the skeleton lines O of the plurality of first cell defining parts 21 included in the skeleton part 2, which allows spatial filling and has only a polyhedral shape of one kind include a Kelvin's tetradecahedron as well as a regular triangular prism, a regular hexagonal prism, a cube, a rectangular parallelepiped, and a rhombic dodecahedron. Note that, when the shape of the skeleton line O of each first cell defining part 21 is a Kelvin's tetradecahedral (truncated octahedral) shape as in the example of each drawing, cushion-member characteristics equivalent to those of typical poly urethane foam manufactured through the process of foaming by chemical reaction can be most easily reproduced as compared to any other shape. In addition, when the shape of the skeleton line O of each first cell defining part 21 is a Kelvin's tetradecahedral (truncated octahedral) shape, the same machine characteristics can be obtained in the X, Y, and Z directions. Examples of the polyhedral shape of each of the skeleton lines O of the plurality of first cell defining parts 21 included in the skeleton part 2, which allows spatial filling and includes polyhedral shapes of a plurality of kinds include a combination of a regular tetrahedron and a regular octahedron, a combination of a regular tetrahedron and a truncated tetrahedron, and a combination of a regular octahedron and a truncated hexahedron. Note that these are exemplary combinations of polyhedral shapes of two kinds but combinations of polyhedral shapes of three or more kinds are possible as well.

The polyhedral shape of each of the skeleton lines O of the plurality of first cell defining parts 21 included in the skeleton part 2 (that is, the substantially polyhedral shape of each first cell hole C1) may be, for example, an optional regular polyhedron (convex polyhedron in which all surfaces are congruent regular polygons and the number of contacting surfaces is equal at all apexes), a semiregular polyhedron (convex polyhedron in which all surfaces are regular polygons and all apex shapes are congruent (the kinds and order of regular polygons are same at all apexes) except for a regular polyhedron), a prism, or a polygonal pyramid.

The skeleton lines O of some or all of the plurality of first cell defining parts 21 included in the skeleton part 2 may each have a stereoscopic shape (for example, a sphere, an ellipsoid, or a cylinder) other than a polyhedral shape. Thus, some or all of the plurality of first cell holes C1 included in the skeleton part 2 may each have a substantially stereoscopic shape (for example, a substantial sphere, a substantial ellipsoid, or a substantial cylinder) other than a substantially polyhedral shape.

Since the plurality of first annular parts 211 included in the first cell defining part 21 include the first small annular part 211S and the first large annular part 211L having different sizes, each gap (interval) among first cell holes C1 included in the porous structural body 1 can be further reduced. Moreover, when the shapes of the first small annular part 211S and the first large annular part 211L are different from each other as in the present example, each gap (interval) among first cell holes C1 included in the porous structural body 1 can be further reduced.

However, the plurality of first annular parts 211 included in the first cell defining part 21 may have the same size and/or shape. When the first annular parts 211 included in each first cell defining part 21 have the same size and shape, the same machine characteristics can be obtained in the X, Y, and Z directions.

When some or all (in the present example, all) first virtual surfaces V1 included in the first cell defining part 21 have substantially polygonal shapes as in the present example, the interval among cell holes C included in the porous structural body 1 can be further reduced. Moreover, the behavior of compressing and restoring deformation of the porous structural body 1 in accordance with application and cancellation of external force is more favorable as a cushion member for a passenger seat. Furthermore, since the shape of each first virtual surface V1 is simple, manufacturability and characteristic adjustment easiness can be improved. Note that the same effect can be obtained to some different extent when at least one first virtual surface V1 included in the porous structural body 1 satisfies the above-described configuration.

Note that at least one first virtual surface V1 included in the porous structural body 1 may have an optional substantially polygonal shape other than a substantially regular hexagonal shape and a substantially square shape as in the present example or have a planar shape (for example, a circle (such as an exact circle or an ellipse)) other than a substantially polygonal shape. When the shape of each first virtual surface V1 is a circle (such as an exact circle, or an ellipse), the shape of each first virtual surface V1 is simple and thus manufacturability and characteristic adjustment easiness can be improved, and more homogenous machine characteristics can be obtained. For example, when the shape of each first virtual surface V1 is an ellipse (horizontally long ellipse) that is long in a direction substantially orthogonal to the direction of weight application, the first annular part 211 that defines the first virtual surface V1, that is, the porous structural body 1 easily deforms (is soft) in response to weight input as compared to a case in which the shape of the first virtual surface V1 is an ellipse (vertically long ellipse) that is long in a direction substantially parallel to the direction of weight application.

In each example described in the present specification, as in the example of each drawing, at least one (in each illustrated example, three) bone part 2B of the first large annular part 211L of each first cell defining part 21 is preferably shared by the first small annular part 211S of another first cell defining part 21 adjacent to the first cell defining part 21. With this configuration, the cushion-member characteristics of the porous structural body 1 can be improved.

As illustrated in FIGS. 10 to 13, in the present example, the skeleton part 2 includes a plurality of second cell defining parts 22 (in the number of second cell holes C2) that each define a second cell hole C2 inside.

As illustrated in FIGS. 10 and 11 and 14 to 19 (FIG. 15, in particular), each second cell defining part 22 includes a plurality (in the present example, two) of second annular parts 222. Each second annular part 222 has an annular shape, and an annular inner periphery side edge part 2221 thereof defines a second virtual surface V2 that is flat. The second virtual surface V2 is a virtual plane (in other words, a virtual closed plane) defined by the inner periphery side edge part 2221 of the second annular part 222. The second annular parts 222 included in the second cell defining part 22 are coupled with each other so that the second virtual surfaces V2 defined by the respective inner periphery side edge parts 2221 intersect with (in the present example, are orthogonal to) each other.

Each second cell hole C2 is defined by the inner periphery side edge parts 2221 of the respective second annular parts included in the corresponding second cell defining part 22 and by virtual surfaces coupling the inner periphery side edge parts 2221.

FIG. 15 illustrates the skeleton line O of part of each unit part U, which serves as a second cell defining part 22. As understood from FIG. 15, in the present example, the skeleton line O of each second annular part 222 included in the second cell defining part 22 has a square shape, and accordingly, the corresponding second virtual surface V2 has a substantially square shape.

In the example of each drawing, the skeleton lines O of the plurality of second cell defining parts 22 included in the skeleton part 2 each have a regular octahedral shape. A regular octahedron is a polyhedron constituted by eight regular triangular constituent faces. However, in these examples, the skeleton line O of each second cell defining part 22 has only some sides of the polyhedral (regular octahedral) shape of the skeleton line O. Accordingly, the second cell hole C2 defined by each second cell defining part 22 has a substantially regular octahedral shape. In each illustrated example, since each bone part 2B includes not only the bone constant part 2B1 but also the bone change parts 2B2 at both sides thereof, the shape of the second cell hole C2 is not a mathematical (complete) regular octahedral shape.

In the example of each drawing, part of each second cell hole C2 is positioned inside a pair of first cell holes C1 adjacent to the second cell hole C2 (in other words, sandwiching the second cell hole C2 therebetween), in other words, the second cell hole C2 partially overlaps with the pair of first cell holes C1. Accordingly, the total number of cell holes C included in the porous structural body 1 can be increased as compared to a case in which each first cell hole C1 and the second cell hole C2 do not overlap with each other, and thus the cushion-member characteristics of the porous structural body 1 can be improved. However, each first cell hole C1 and the second cell hole C2 may be disposed not to overlap with each other.

In the present example, each second annular part 222 is constituted by a plurality (in the present example, four) of bone parts 2B, and a plurality (in the present example, four) of connection parts 2J connecting the end parts 2Be of the plurality of bone parts 2B.

In the present example, each coupling portion of second annular parts 222 included in each second cell defining part 22 is constituted by two connection parts J shared by the second annular parts 222.

In the present example, the second virtual surfaces V2 included in each second cell defining part 22 have the same shape and area.

When the porous structural body 1 includes the second cell defining part 22 as in the example of each drawing, the diameter of the second cell hole C2 is preferably smaller than the diameter of the first cell hole C1. Accordingly, cushion-member characteristics equivalent to those of typical poly urethane foam manufactured through the process of foaming by chemical reaction can be easily reproduced.

However, the diameter of the second cell hole C2 may be equal to or larger than the diameter of the first cell hole C1.

When the porous structural body 1 includes the second cell defining part 22 as in the example of each drawing, the polyhedral shape of the skeleton line O of the second cell defining part 22 (that is, the substantially polyhedral shape of the second cell hole C2) is not limited to the example of each drawing but may be optional.

For example, the polyhedron shape of each of the skeleton lines O of the plurality of second cell defining parts 22 included in the skeleton part 2 is preferably different from the polyhedral shape of each of the skeleton lines O of the plurality of first cell defining parts 21 included in the skeleton part 2. For example, when the skeleton lines O of the plurality of first cell defining parts 21 included in the skeleton part 2 each have a Kelvin's tetradecahedral shape as in the example of each drawing, the skeleton lines O of the plurality of second cell defining parts 22 included in the skeleton part 2 each preferably have a polyhedron shape (in each illustrated example, a regular octahedral shape) other than a Kelvin's tetradecahedral shape.

The polyhedron shape of each of the skeleton lines O of the plurality of second cell defining parts 22 included in the skeleton part 2 (that is, the substantially polyhedral shape of each second cell hole C2) maybe, for example, an optional regular polyhedron (regular polygon in which all surfaces are congruent and convex polyhedron the number of contacting surfaces is equal at all apexes), semiregular polyhedron (convex polyhedron in which all surfaces are regular polygons and all apex shapes are congruent (the kinds and order of regular polygons are same at all apexes) except for a regular polyhedron), a prism, or a polygonal pyramid.

The skeleton lines O of some or all of the plurality of second cell defining parts 22 included in the skeleton part 2 may each have a stereoscopic shape (for example, a sphere, an ellipsoid, or a cylinder) other than a polyhedral shape. Accordingly, some or all of the plurality of second cell holes C2 included in the skeleton part 2 may each have a substantially stereoscopic shape (for example, a substantial sphere, a substantial ellipsoid, or a substantial cylinder) other than a substantially polyhedral shape.

Note that the shape of each second virtual surface V2 included in each second cell defining part 22 is not limited to the present example but may be an optional substantially polygonal shape other than a substantial square or have a planar shape (for example, a circle (such as an exact circle, or an ellipse)) other than a substantially polygonal shape. When the shape of each second virtual surface V2 is a substantially polygonal shape or a circle (such as an exact circle, or an ellipse), the shape of the second virtual surface V2 is simple, and thus manufacturability and characteristic adjustment easiness can be improved. For example, when the shape of each second virtual surface V2 is an ellipse (horizontally long ellipse) that is long in a direction substantially orthogonal to the direction of weight application, the second annular part 222 that defines the second virtual surface V2, that is, the porous structural body 1 easily deforms (is soft) in response to weight input as compared to a case in which the shape of the second virtual surface V2 is an ellipse (vertically long ellipse) that is long in a direction substantially parallel to the direction of weight application.

As illustrated in FIGS. 15 and 18, in the present example, one of the two second annular parts 222 included in each second cell defining part 22 also serves as a first annular part 211 (more specifically, first small annular part 211S). However, in these examples, only some of the plurality of first small annular parts 211S included in each first cell defining part 21 also serve as a second annular part 222.

In the present example, each second virtual surface V2 is not covered with a film but is opened, in other words, has an opening. Thus, cell holes C (in particular, a first cell hole C1 and a second cell hole C2) are communicated with each other through the second virtual surface V2 to allow ventilation between the cell holes C. Accordingly, the breathability of the porous structural body 1 can be improved, and compressing and restoring deformation of the porous structural body 1 in accordance with application and cancellation of external force can be easily performed.

However, the porous structural body 1 may include only a first cell defining part 21 but no second cell defining part 22.

In the present example, the porous structural body 1 preferably has at least one cell hole C having a diameter of 5 mm or larger. Accordingly, the porous structural body 1 can be easily manufactured by using a 3D printer. When the diameter of each cell hole C of the porous structural body 1 is smaller than 5 mm, the structure of the porous structural body 1 is potentially too complicated so that it is difficult to generate, on a computer, three-dimensional shape data (such as CAD data) representing the three-dimensional shape of the porous structural body 1 or 3D shaping data generated based on the three-dimensional shape data.

Note that since a conventional porous structural body having a cushioning characteristic is manufactured through the process of foaming by chemical reaction as described above, it has been not easy to form a cell hole C having a diameter of 5 mm or larger. However, cushion-member characteristics equivalent to conventional characteristics can be obtained even when a porous structural body includes a cell hole C having a diameter of 5 mm or larger. Since the porous structural body includes a cell hole C having a diameter of 5 mm or larger, the porous structural body can be easily manufactured by a 3D printer.

In addition, since the porous structural body 1 includes a cell hole C having a diameter of 5 mm or larger, the breathability of the porous structural body 1 and deformation easiness can be easily improved.

As the diameter of each cell hole C increases, the porous structural body 1 can be more easily manufactured by using a 3D printer and the breathability and deformation easiness can be more easily improved. For this reason, the diameter of at least one cell hole C in the porous structural body 1 is preferably 8 mm or larger, more preferably 10 mm or larger.

However, when each cell hole C in the porous structural body 1 is too large, it is difficult to cleanly (smoothly) form the outer edge (outer outline) shape of the porous structural body 1, which potentially leads to decreased shaping accuracy and degraded appearance. In addition, the cushion-member characteristics are potentially not sufficiently favorable. Thus, to improve the appearance and cushion-member characteristics, the diameter of each cell hole C in the porous structural body 1 is preferably 30 mm or smaller, more preferably 25 mm or smaller, further more preferably 20 mm or smaller.

Note that each above-described effect is more likely to be obtained as the porous structural body 1 includes a larger number of cell holes C satisfying any above-described diameter numerical range. For this reason, at least the diameter of each first cell hole C1 among the plurality of cell holes C included in the porous structural body 1 preferably satisfies at least one above-described numerical range. The diameter of each cell hole C (first cell hole C1 or second cell hole C2) included in the porous structural body 1 more preferably satisfies at least one above-described numerical range. Similarly, the average diameter of each cell hole C (first cell hole C1 or second cell hole C2) included in the porous structural body 1 more preferably satisfies at least one above-described numerical range.

Note that the diameter of each cell hole C is the diameter of a circumscribed sphere of the cell hole C when the cell hole C has a shape different from a rigorous spherical shape as in the present example.

When each cell hole C in the porous structural body 1 is too small, it is difficult to manufacture the porous structural body 1 by using a 3D printer. To facilitate manufacturing of the porous structural body 1 by using a 3D printer, the diameter of a cell hole C (in the present example, second cell hole C2) included in the porous structural body 1 and having a minimum diameter is preferably 0.05 mm or larger, more preferably 0.10 mm or larger. Shaping can be performed at the resolution of a 3D printer of high performance when the diameter of a cell hole C (in the present example, second cell hole C2) having a minimum diameter is 0.05 mm or larger, and shaping can be performed not only at the resolution of a 3D printer of high performance but also at the resolution of a general-purpose 3D printer when the diameter is 0.10 mm or larger.

Figure 23:
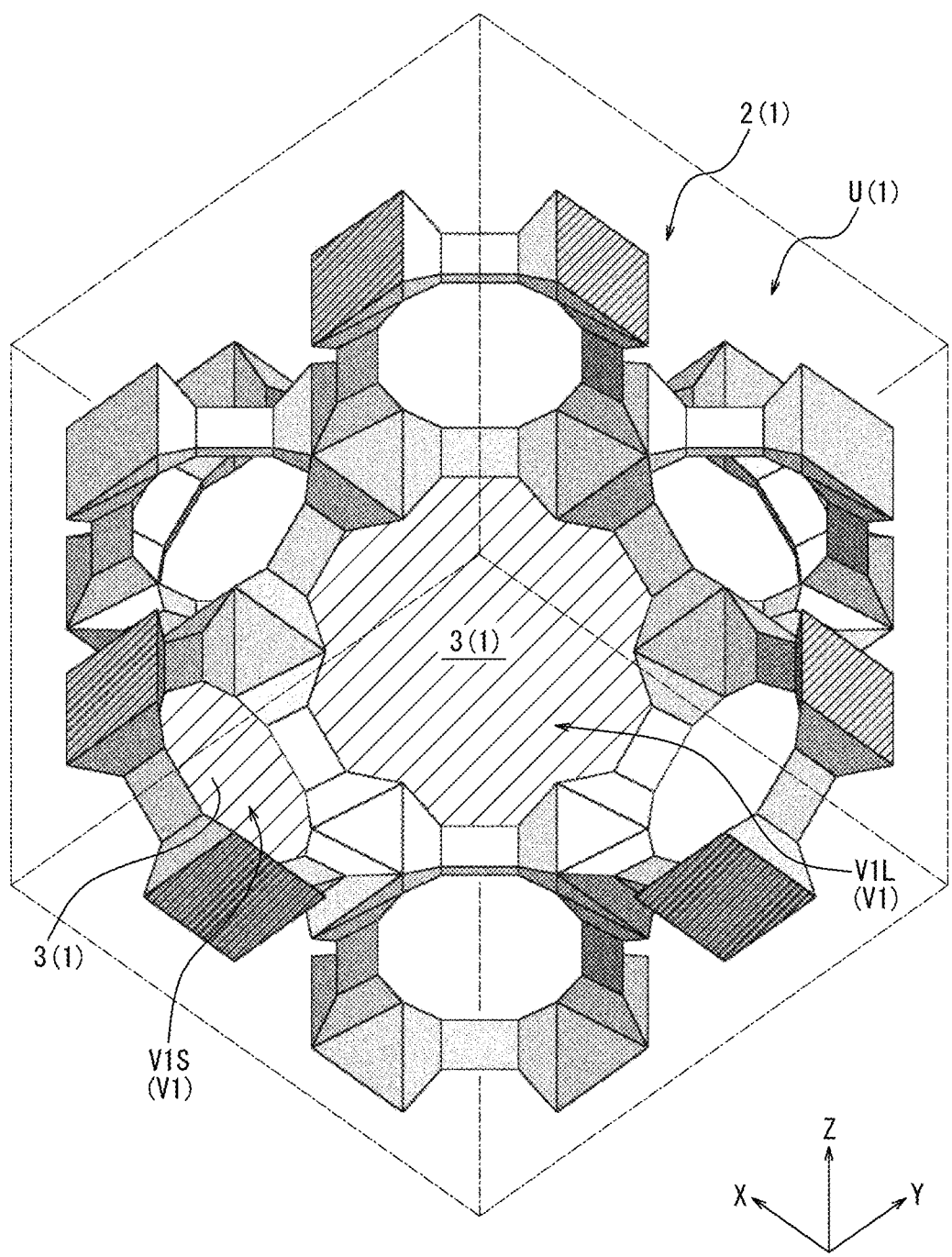
FIG. 23 is a drawing corresponding to FIG. 17, for description of a third modification of the porous structural body.

As in a third modification illustrated in FIG. 23, at least one first virtual surface V1 included in the porous structural body 1 may be covered with the film 3. The film 3 is made of a material same as that of the skeleton part 2 and integrated with the skeleton part 2. The film 3 prevents communication between two first cell holes C1 sandwiching the first virtual surface V1 therebetween, and accordingly, the breathability of the porous structural body 1 as a whole degrades. The breathability of the porous structural body 1 as a whole can be adjusted by adjusting the number of first virtual surfaces V1 included in the porous structural body 1 and covered with the film 3, and various breathability levels can be achieved in accordance with a request. For example, when the porous structural body 1 is used for a car seat, the performance of an in-vehicle air conditioner, anti-stuffiness, and ride comfort can be increased by adjusting the breathability of the porous structural body 1. To increase the performance of an in-vehicle air conditioner, anti-stuffiness, and ride comfort when the porous structural body 1 is used for a car seat, it is not preferable that all first virtual surfaces V1 included in the porous structural body 1 are covered with the film 3, in other words, it is preferable that at least one first virtual surface V1 included in the porous structural body 1 is not covered with the film 3 but is opened.

To increase the performance of an in-vehicle air conditioner, anti-stuffiness, and ride comfort when the porous structural body 1 is used for a car seat, the breathability of the porous structural body 1 is preferably 100 to 700 cc/cm$^2$/sec, more preferably 150 to 650 cc/cm$^2$/sec, further more preferably 200 to 600 cc/cm$^2$/sec. The breathability (cc/cm$^2$/sec) of the porous structural body 1 is measured in accordance with JIS K 6400-7. When the porous structural body 1 is used for a car seat, the resonance magnification of the porous structural body 1 is preferably equal to or larger than three and smaller than eight, more preferably equal three to five inclusive.

Note that since a conventional porous structural body has been manufactured through the process of foaming by chemical reaction as described above, it has been difficult to form, at desired positions, a desired number of films for communication holes through which cells are communicated. When the porous structural body 1 is manufactured by a 3D printer as in the present example, information of the film 3 is included in advance in 3D shaping data to be read by the 3D printer, and thus a desired number of films 3 can be reliably formed at desired positions.

For the same reason, at least one first small virtual surface V1S included in the porous structural body 1 may be covered with the film 3. In addition or alternatively, at least one first large virtual surface V1L included in the porous structural body 1 may be covered with the film 3.

[Modification of Passenger Seat]

Subsequently, a modification of the passenger seat 300 that can include the cushion member 301 according to an optional embodiment of the present disclosure will be described below with reference to FIG. 24. The passenger seat 300 in FIG. 24 may be configured as a passenger seat of an optional kind, and for example, is preferably configured as a vehicle seat, more preferably configured as a car seat.

Figure 24:
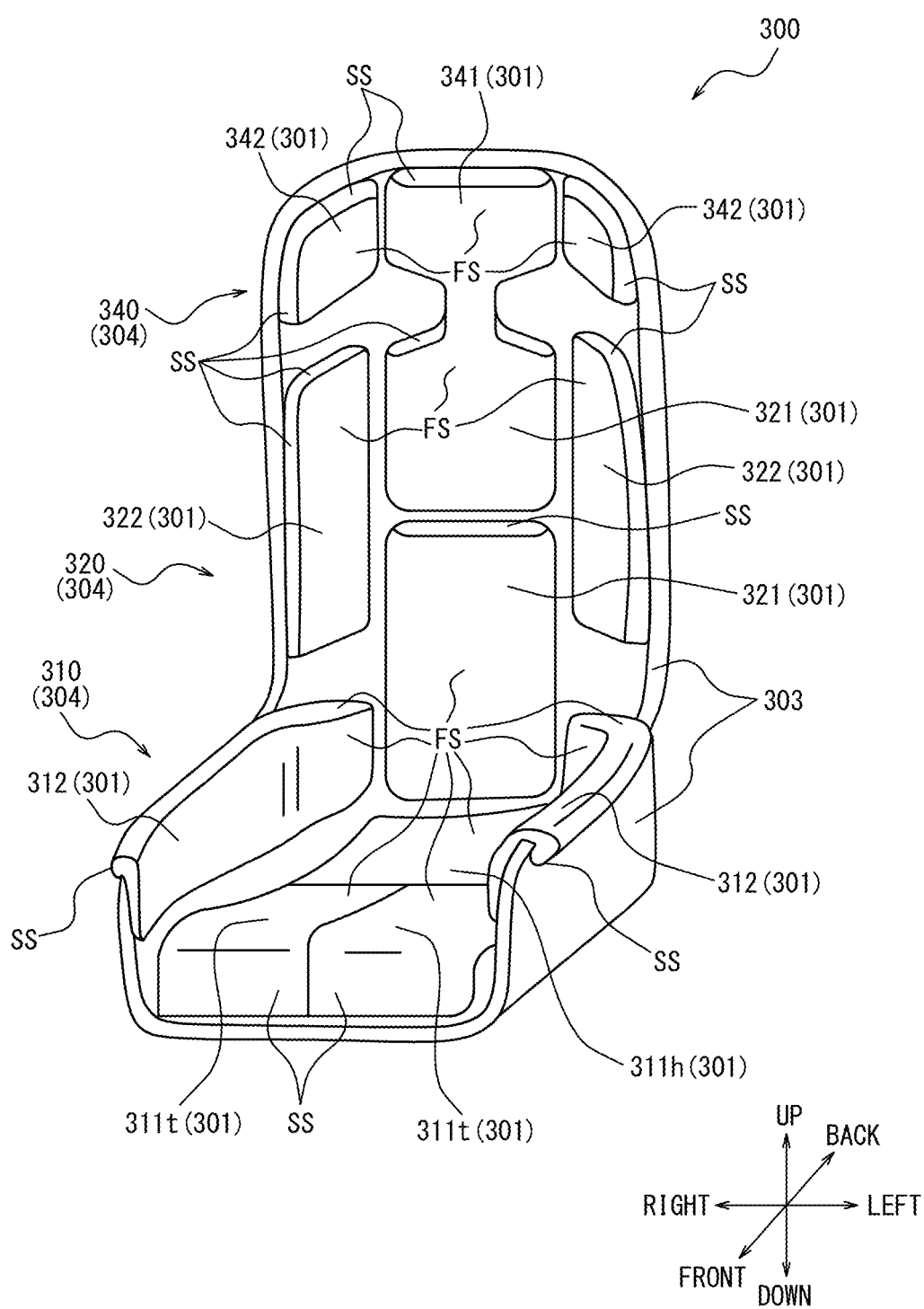
FIG. 24 is a perspective view schematically illustrating a first modification of a passenger seat that can include a cushion member according to an optional embodiment of the present disclosure.

In an example of FIG. 24, the passenger seat 300 includes a frame 303 and a seat pad 304 attached to the frame 303. The frame 303 is preferably made of, for example, metal or resin. The seat pad 304 includes the cushion pad 310 on which a seated person sits, the back pad 320 for supporting the back of the seated person, and the head rest 340 for supporting the head of the seated person. In the present example, the cushion pad 310 is the above-described seat-cushion cushion member 301C. In the present example, the back pad 320 is the above-described seat-back cushion member 301B.

The cushion pad 310 includes the main pad 311 formed to support the hip region and the femoral region of the seated person from below, and the pair of side pads 312 positioned on the right and left sides of the main pad 311 and formed to support the hip region and the femoral region of the seated person from the right and left sides. The main pad 311 includes an under-hip portion 311$h$ formed to support the hip region of the seated person from below, and a femoral region-placed part 311$t$ formed to support the femoral region of the seated person from below. In the example of FIG. 24, the main pad 311 and each side pad 312 are separated from each other and each formed of a different cushion member 301. However, an optional part or whole of the main pad 311 and an optional part or whole of each side pad 312 may be integrated with each other. In the example of FIG. 24, the under-hip portion 311$h$ and the femoral region-placed part 311$t$ are separated from each other and each formed of a different (separate) cushion member 301. However, a part or whole of the under-hip portion 311$h$ and a part or whole of the femoral region-placed part 311$t$ may be integrated with each other. In the example of FIG. 24, the femoral region-placed part 311$t$ is divided into two in the right-left direction, in other words, provided as a pair of right and left femoral region-placed parts 311$t$, and the pair of femoral region-placed parts 311$t$ are each formed of a different cushion member 301. However, the femoral region-placed part 311$t$ may be entirely integrally formed.

The back pad 320 includes the main pad 321 formed to support the back of the seated person from the back side, and the pair of side pads 322 positioned on the right and left sides of the main pad 321 and formed to support the back of the seated person from the right and left sides. In the example of FIG. 24, the main pad 321 and each side pad 322 are separated from each other and each formed of a different cushion member 301. However, an optional part or whole of the main pad 321 and an optional part or whole of each side pad 322 may be integrated with each other. In the example of FIG. 24, the main pad 321 is divided into two in the up-down direction, in other words, provided as a pair of upper and lower main pads 321, and the pair of main pads 321 are each formed of a different cushion member 301. However, the main pad 321 may be entirely integrally formed. The back pad 320 is separated from the cushion pad 310 in the example of FIG. 24, but an optional part or all of the back pad 320 may be integrated with an optional part or whole of the cushion pad 310.

The head rest 340 includes a main pad 341 formed to support the head of the seated person from the back side, and a pair of side pads 342 positioned on the right and left sides of the main pad 341 and formed to support the head of the seated person from the right and left sides. In the example of FIG. 24, the main pad 341 and each side pad 342 are separated from each other, and specifically, each formed of a different cushion member 301. However, an optional part or whole of the main pad 341 and an optional part or whole of each side pad 342 may be integrated with each other. The head rest 340 may include no side pads 342. In the example of FIG. 24, the main pad 341 of the head rest 340 is integrated with part of the main pad 321 of the back pad 320

(specifically, the upper main pad 321 among the pair of upper and lower main pads 321). However, an optional part or all of the head rest 340 may be integrated with an optional part or whole of the back pad 320 or may be separated from the back pad 320. The seat pad 304 may include no head rest 340.

As described above, the seat pad 304 in FIG. 24 is constituted by a plurality of components separated from one another, and each component is formed of a different cushion member 301. However, the seat pad 304 may be entirely integrally formed and constituted by one component, and thus may be entirely formed of one cushion member 301.

Note that, for convenience of description, a component included in the seat pad 304 is simply referred to as "the seat pad 304" in some cases below.

In the example of FIG. 24, the cushion member 301 includes the surface FS on the seated person side, which receives weight from the user (seated person), the side surface SS continuous with the surface FS on the seated person side, and the back surface BS continuous with the side surface SS and facing a side opposite to the surface FS on the seated person side. When the cushion member 301 is used for the seat pad (in particular, car seat pad) 304 as in the example of FIG. 24, the surface FS on the seated person side, the side surface SS, and the back surface BS of the cushion member 301 serve as the surface FS on the seated person side, the side surface SS, and the back surface BS of the seat pad 304, respectively.

In the example of FIG. 24, the back surface BS of the seat pad 304 (that is, the cushion member 301) is fixed to the frame 303.

The back surface BS of the seat pad 304 (that is, the cushion member 301) may be detachably fixed to the frame 303 through a hook-and-loop fastener or the like.

Alternatively, the back surface BS of the seat pad 304 (that is, the cushion member 301) may be undetachably fixed to the frame 303 through adhesive or the like.

Figure 29:
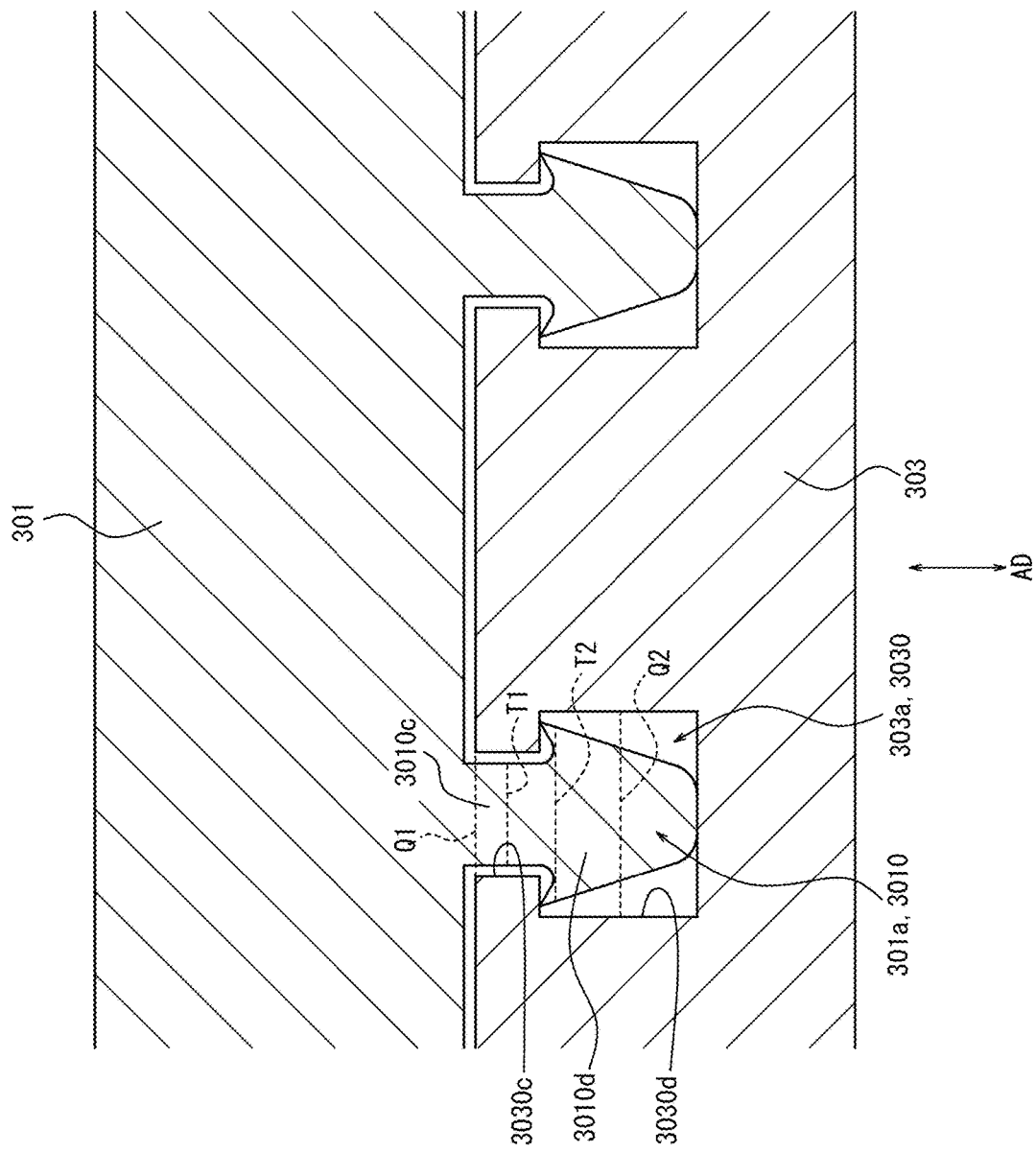
FIG. 29 is a drawing for description of a second modification of the passenger seat that can include a cushion member according to an optional embodiment of the present disclosure.

Alternatively, when the back surface BS side of the cushion member 301 (that is, the seat pad 304) is fixed to the frame 303 as in the example of FIG. 24, the frame 303 may include an filling part 303a and the cushion member 301 may include an filling part 301a configured to fit the filling part 303a of the frame 303 as in an example illustrated in FIG. 29. In this case, in the passenger seat 300, the cushion member 301 is preferably fixed to the frame 303 through filling of the filling part 303a of the frame 303 and the filling part 301a of the cushion member 301. Accordingly, the accuracy of the fixation position of the cushion member 301 can be improved, and the cushion member 301 can be fixed only by pushing the filling part 301a of the cushion member 301 into the filling part 303a of the frame 303, which can reduce fixation work.

In this case, for example, the filling part 303a of the frame 303 may be a concave part 3030 and the filling part 301a of the cushion member 301 may be a convex part 3010 as in the example of FIG. 29, or the filling part 303a of the frame 303 may be the convex part 3010 and the filling part 301a of the cushion member 301 may be the concave part 3030. The concave part 3030 may be a bottomed concave part (in other words, recessed part) as in the example of FIG. 29, or may be a bottomless concave part (in other words, through-hole).

The filling part 303a of the frame 303 and the filling part 301a of the cushion member 301 are preferably wedged to each other. The "wedging" of the filling part 303a of the frame 303 and the filling part 301a of the cushion member 301 means that, once fitted, the filling part 303a of the frame 303 and the filling part 301a of the cushion member 301 are each unlikely to be removed from the other. For this reason, as in the example of FIG. 29, the convex part 3010 preferably includes a narrow part 3010c, and a thick part 3010d positioned further on the leading end side of the convex part 3010 than the narrow part 3010c and having a cross-sectional area T2 larger than a cross-sectional area T1 of the narrow part 3010c. The concave part 3030 preferably includes a narrow part 3030c, and a thick part 3030d positioned further on the back side of the concave part 3030 than the narrow part 3030c and having a cross-sectional area Q2 larger than a cross-sectional area Q1 of the narrow part 3030c. The thick part 3010d of the convex part 3010 can enter inside the thick part 3010d of the concave part 3030, and the cross-sectional area T2 of the thick part 3010d of the convex part 3010 is preferably larger than the cross-sectional area Q1 of the narrow part 3030c of the concave part 3030 and smaller than the cross-sectional area Q2 of the thick part 3030d of the concave part 3030. With this configuration, during insertion into the concave part 3030, the convex part 3010 passes through the narrow part 3030c of the concave part 3030 while being compressed, and then restores after inserted into the thick part 3030d of the concave part 3030 and engages with the thick part 3030d, and accordingly, the convex part 3010 becomes unlikely to be removed from the concave part 3030. In this manner, the wedging is achieved. Note that the cross-sectional area T1 of the narrow part 3010c of the convex part 3010 is preferably smaller than the cross-sectional area Q1 of the narrow part 3030c of the concave part 3030.

"The cross-sectional area (T1, Q1) of the narrow part (3010c, 3030c)" is the cross-sectional area at part of the narrow part (3010c, 3030c) where the cross-sectional area is minimum. "The cross-sectional area (T2, Q2) of the thick part (3010d, 3030d)" is the cross-sectional area at part of the thick part (3010d, 3030d) where the cross-sectional area is maximum. As for the convex part (3010), "the cross-sectional area (T1) of the narrow part (3010c)" and "the cross-sectional area (T2) of the thick part (3010d)" are each cross-sectional area on a plane orthogonal to a direction (axial direction) AD parallel to the central axis of the convex part (3010). As for the concave part (3030), "the cross-sectional area (Q1) of the narrow part (3030c)" and "the cross-sectional area (Q2) of the thick part (3030d)" are each cross-sectional area on a plane orthogonal to a direction (axial direction) AD parallel to the central axis of the concave part (3030). To improve the accuracy of the fixation position of the cushion member 301, the number of filling parts 301a of the cushion member 301 is preferably two or larger, more preferably four or larger. To reduce fixation work of the cushion member 301, the number of filling parts 301a of the cushion member 301 is preferably 20 or smaller, more preferably 10 or smaller.

In the example of FIG. 24, the passenger seat 300 includes no top skin covering the seat pad 304 (that is, the cushion member 301). Thus, the surface FS on the seated person side and the side surface SS of the seat pad 304 (that is, the cushion member 301) are externally exposed, in other words, serve as the surface of the passenger seat 300 (specifically, the surface FS on the seated person side and the side surface SS). Since the cushion member 301 includes the top skin 330 (FIG. 25), the cushion member 301 does not need to be covered with a separately provided top skin.

The top skin 330 serves as at least the surface FS on the seated person side (preferably, the surface FS on the seated person side and the side surface SS) among the surfaces of the passenger seat 300.

Note that, in the example of FIG. 24, each of a plurality of components included in the seat pad 304 is entirely formed of the cushion member 301.

However, only an optional part of each of one or a plurality of components included in the seat pad 304 may be formed of the cushion member 301. In this case, the remaining part of the component included in the seat pad 304 may be manufactured through the process of foaming by chemical reaction in mold shaping or the like.

Only some of the plurality of components included in the seat pad 304 may be each made of the porous structural body 1 at a part or whole thereof. In this case, the remaining components of the plurality of components included in the seat pad 304 may be manufactured through the process of foaming by chemical reaction in mold shaping or the like.

The cushion member 301 used for the passenger seat 300 in the example of FIG. 24 may be the cushion member 301 of an optional embodiment described in the present specification.

[Third Embodiment of Cushion Member]

Subsequently, the cushion member 301 according to a third embodiment of the present disclosure will be described below with reference to FIGS. 25 to 27.

Figure 25:
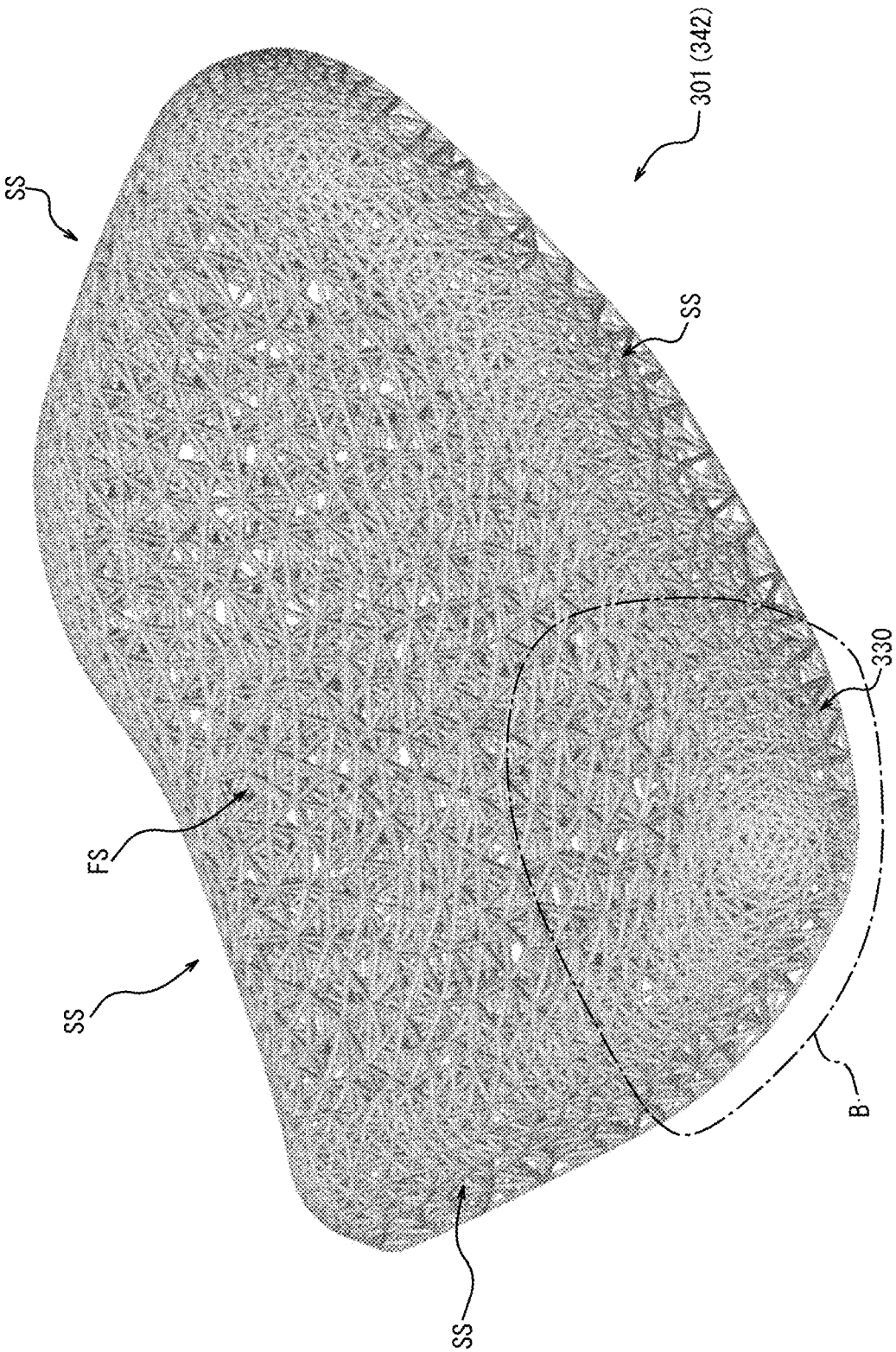
FIG. 25 is a perspective view illustrating a cushion member according to a third embodiment of the present disclosure, which can be included in the cushion member in FIG. 24.
Figure 26:
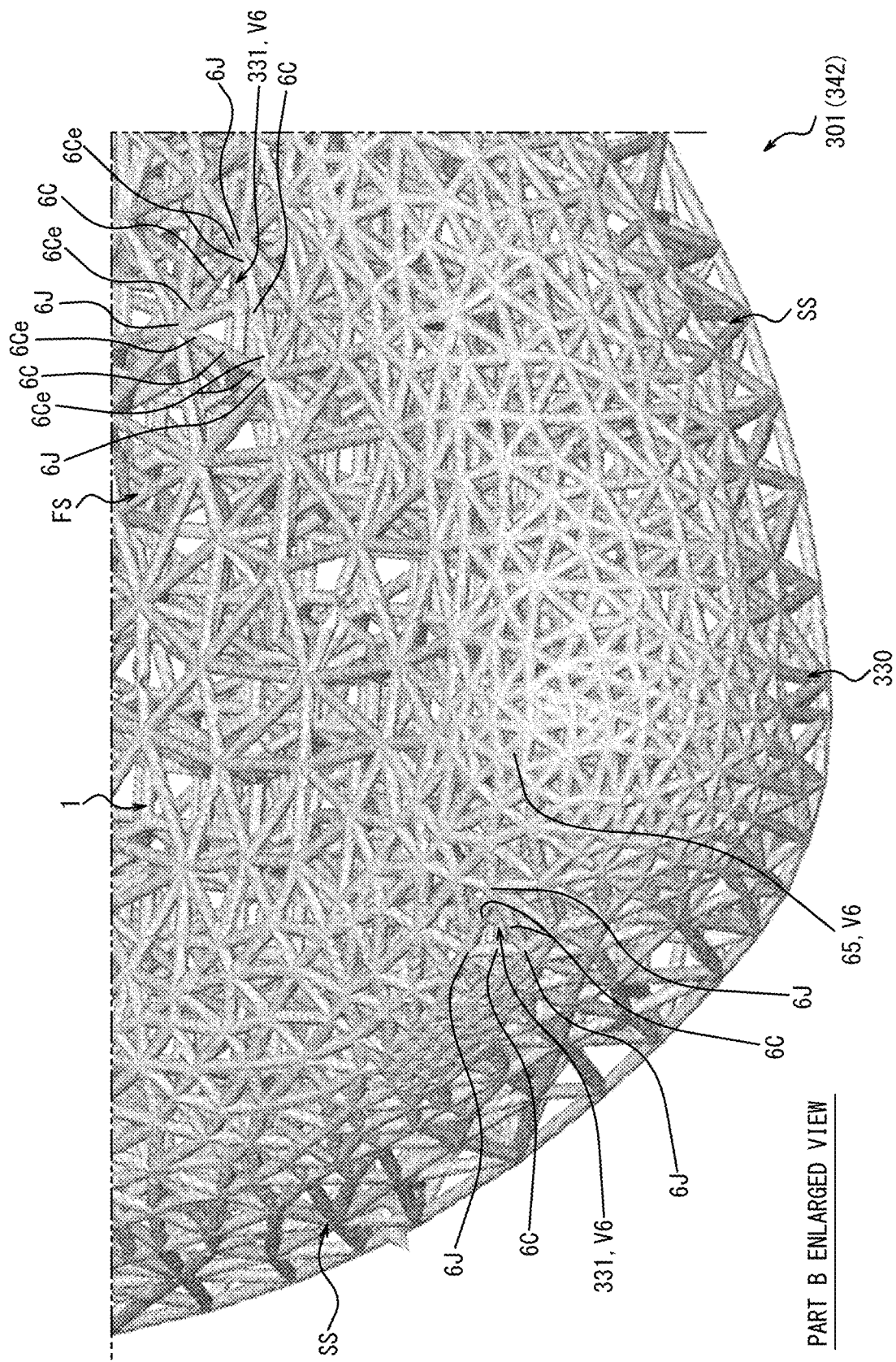
FIG. 26 is a perspective view illustrating part B of the cushion member in FIG. 25 in an enlarged manner.
Figure 27:
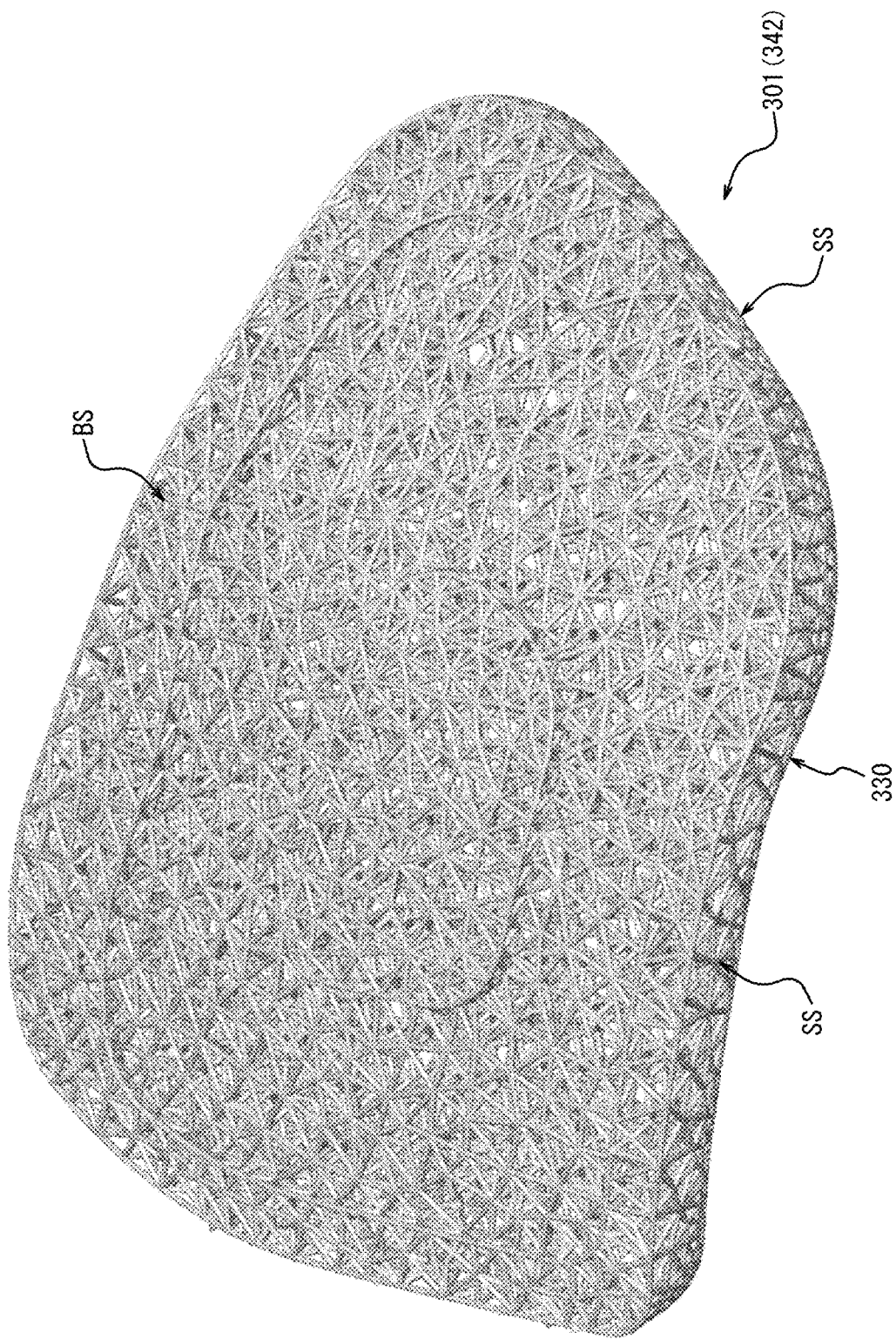
FIG. 27 is a perspective view illustrating the cushion member in FIG. 25 being viewed from a side opposite to FIG. 25.

FIGS. 25 to 27 illustrate the cushion member 301 according to the third embodiment of the present disclosure. Note that the cushion member 301 illustrated in FIGS. 25 to 27 is used for each side pad 342 of the head rest 340 in the seat pad 304 of the passenger seat 300 in the example of FIG. 24. However, the cushion member 301 according to the third embodiment can be excellently used as another cushion member 301 in the example of FIG. 24, the cushion member 301 in the example illustrated in FIG. 1, or another optional cushion member.

FIG. 25 is a perspective view illustrating the cushion member 301 according to the present embodiment being viewed from the surface FS side on the seated person side. FIG. 26 illustrates part B of the cushion member 301 in FIG. 25 in an enlarged manner. FIG. 27 is a perspective view illustrating the cushion member 301 in FIG. 25 being viewed from a side (the back surface BS side) opposite to that of FIG. 25.

The cushion member 301 of the present embodiment includes the porous structural body 1 and the top skin 330 integrated with the porous structural body 1. The cushion member 301 is entirely integrally formed.

The configuration of the porous structural body 1 may be employed an optional exemplary configuration described above.

In the examples of FIGS. 25 to 27, the top skin 330 covers the entire virtual outer outline surface of the porous structural body 1, in other words, serves as all surfaces (the surface FS on the seated person side, the side surface SS, and the back surface BS) of the cushion member 301. However, the top skin 330 may cover only an optional part of the virtual outer outline surface of the porous structural body 1. The top skin 330 may serve as at least the surface FS on the seated person side among the surfaces of the passenger seat 300.

The "virtual outer outline surface" of the porous structural body 1 is a virtual outer surface as the outer outline of the skeleton part 2 and is a virtual surface smoothly connecting parts (material parts) positioned outermost in the skeleton part 2 of the porous structural body 1.

The top skin 330 is a part positioned outermost in the cushion member 301. Thus, the top skin 330 serves as the outer surface of the cushion member 301 in a region in which the top skin 330 is provided in the cushion member 301.

The entire top skin 330 extends along the virtual outer outline surface of the porous structural body 1.

As illustrated in an enlarged manner in FIG. 26, the top skin 330 includes a plurality of column parts 6C, a plurality of column connection parts 6J, and a plurality of top skin virtual surfaces V6. Each column part 6C has a column shape and extends along the virtual outer outline surface of the porous structural body 1. Each column connection part 6J connects end parts 6Ce in extension directions of the plurality of column parts 6C extending in directions different from each other, at a place where the end parts 6Ce are adjacent to each other. Each column part 6C and each column connection part 6J of the top skin 330 are positioned outside the virtual outer outline surface of the porous structural body 1 (on a side opposite to the porous structural body 1) and contact the virtual outer outline surface of the porous structural body 1, but are not positioned inside the porous structural body 1. Each top skin virtual surface V6 is defined among the above-described plurality of column parts 6C. More specifically, the outer edge of each top skin virtual surface V6 is defined by inner periphery side edge parts of three or more (in the example of FIG. 26, three) column parts 6C connected with each other through the column connection parts 6J in an annular shape. Each top skin virtual surface V6 may be provided with a through hole 331 penetrating through the top skin 330 in the thickness direction thereof or may be provided with a top skin film 65 covering the top skin virtual surface V6. The top skin film 65 is integrated with column parts 6C and column connection parts 6J surrounding the top skin film 65 and is thinner than each column part 6C. To improve the breathability of the cushion member 301, as in the example of FIG. 26, at least some (preferably, all) of the plurality of top skin virtual surfaces V6 included in the top skin 330 are each preferably provided with a through hole 331. Since the top skin 330 has the through holes 331, ventilation to and out of the porous structural body 1 through the through holes 331 of the top skin 330 is possible. However, when the top skin 330 covers only part of the virtual outer outline surface of the porous structural body 1, ventilation to and out of the porous structural body 1 can be ensured through a part where the top skin 330 is not provided on the virtual outer outline surface of the porous structural body 1, and thus the top skin 330 may include no through holes 331, in other words, each top skin virtual surface V6 of the top skin 330 may be covered with the top skin film 65.

The cushion member 301 of each example described in the present specification includes the top skin 330 having less irregularities than those of the porous structural body 1, and thus when a surface (in the example of FIG. 24, the back surface BS) of the cushion member 301, on which the top skin 330 is provided fixed to a separate member (in the example of FIG. 24, the frame 303) as in the examples of FIGS. 24 and 25, the area of contact of the cushion member 301 to the separate member can be increased as compared to a case in which the porous structural body 1 of the cushion member 301 is directly fixed to a separate member, and accordingly, the cushion member 301 can be more reliably fixed to the separate member through a hook-and-loop fastener, adhesive, or the like. For this reason, in the cushion member 301, the top skin 330 preferably serves a part or whole of a surface of fixation to the separate member on the outer surface of the cushion member 301 as in the examples of FIGS. 24 and 25. For the same reason, when the cushion member 301 is used for a cushion member and has the surface FS on the seated person side, the side surface SS, and the back surface BS, the top skin 330 preferably serves as a part or whole of the back surface BS and/or a part or whole of the side surface SS, which can be the surface of fixation to the separate member on the outer surface of the cushion member 301, as in the examples of FIGS. 24 and 25.

In the third embodiment illustrated in FIGS. 25 to 27, each column connection part 6J of the top skin 330 may connect the end parts 6Ce of an optional number of column parts 6C extending in directions different from each other, the optional number being two or larger. In the example of FIG. 26, each column connection part 6J of the top skin 330 connects the end parts 6Ce of five to eight column parts 6C extending in directions different from each other. For the durability, the number of column parts 6C extending in directions different from each other and connected by each column connection part 6J of the top skin 330 is preferably three or larger. For the cushioning characteristic, the number of column parts 6C extending in directions different from each other and connected by each column connection part 6J of the top skin 330 is preferably 10 or smaller, more preferably six or smaller.

In the examples of FIGS. 25 to 27, each column part 6C of the top skin 330 extends substantially straight in planar view of the top skin 330 (surface view in a direction perpendicularly facing the outer surface of the top skin 330). However, in the third embodiment, each column part 6C may extend in a curve (along a curved shape) in planar view of the top skin 330.

In the examples of FIGS. 25 to 27, in planar view of the top skin 330 (surface view in the direction perpendicularly facing the outer surface of the top skin 330), each top skin virtual surface V6 is defined by three column parts 6C extending in directions different from each other and thus has a triangular shape. However, in the third embodiment, in planar view of the top skin 330, each top skin virtual surface V6 may be defined by four or more column parts 6C extending in directions different from each other, and thus have a polygonal shape (such as a tetragon or a pentagon) having four or more apexes. Note that the top skin virtual surfaces V6 may have polygonal shapes of the same kind as in the examples of FIGS. 25 to 27 or may have polygonal shapes of kinds different from each other.

In the examples of FIGS. 25 to 27, the cross-sectional shape of each column part 6C included in the top skin 330 is a circle (exact circle). With this configuration, the structure of the top skin 330 is simple, the cushion member 301 can be easily shaped by a 3D printer, and the cushion member 301 can provide improved touch because there is no part pointing toward the outside of the cushion member 301. Note that the cross-sectional shape of each column part 6C is a shape at a section orthogonal to the extension direction thereof.

However, in the third embodiment, the cross-sectional shape of each of all or some column parts 6C included in the top skin 330 may be a polygonal shape (such as a regular triangle, a triangle other than a regular triangle, a rectangle) or may be a circle (such as an ellipse) other than an exact circle. The cross-sectional shape of each bone part 2B may be uniform or ununiform in the extension direction thereof. The cross-sectional shapes of the column parts 6C may be different from each other.

[Fourth Embodiment of Cushion Member]

Subsequently, the cushion member 301 according to a fourth embodiment of the present disclosure will be described below with reference to FIG. 28.

Figure 28:
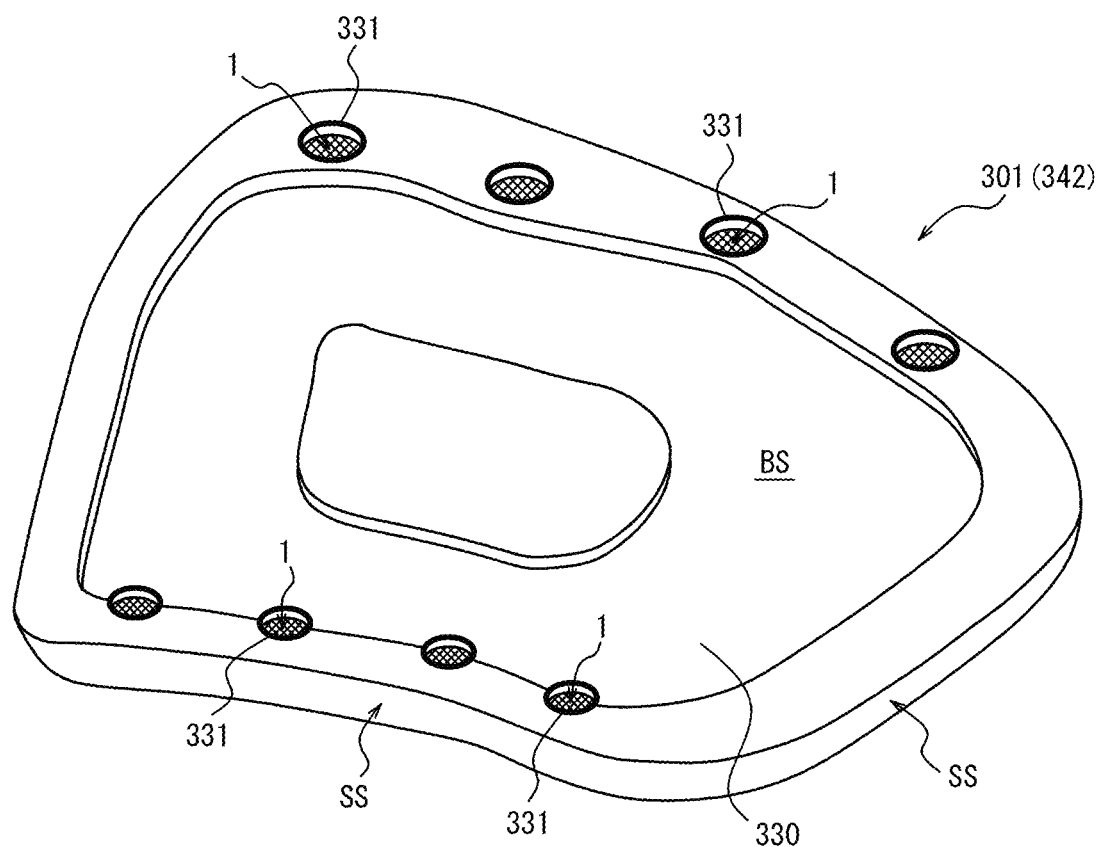
FIG. 28 is a perspective view illustrating a cushion member according to a fourth embodiment of the present disclosure, which can be included in the cushion member in FIG. 24, and is a drawing corresponding to FIG. 27.

FIG. 28 is a perspective view illustrating the cushion member 301 according to the fourth embodiment of the present disclosure being viewed from the back surface BS side, and is a drawing corresponding to FIG. 27. Note that the cushion member 301 illustrated in FIG. 28 is used for each side pad 342 of the head rest 340 in the seat pad 304 of the passenger seat 300 in the example of FIG. 24. However, the cushion member 301 in the present example can be excellently used as another cushion member 301 in the example of FIG. 24, the cushion member 301 in the example illustrated in FIG. 1, or another optional cushion member.

Similarly to the first embodiment illustrated in FIGS. 4 and 5, the top skin 330 of the cushion member 301 in the example of FIG. 28 includes one or a plurality (in the example of FIG. 28, a plurality) of through holes 331. However, in the example of FIG. 28, the top skin 330 serves as the entire outer surface of the cushion member 301, and the one or plurality of through holes 331 are disposed at part of the top skin 330, which serves as the back surface BS of the cushion member 301. Note that the configuration of the top skin 330 according to an optional example described above may be employed as the configuration of part of the top skin 330, which serves as the surface FS on the seated person side and/or the side surface SS of the cushion member 301 (that is, the passenger seat 300).

When the top skin 330 includes the through holes 331 as in the examples of FIGS. 4 and 5 and the example of FIG. 28, the breathability and vibration characteristics can be adjusted as described above, and in a case in which the cushion member 301 is shaped by the optical shaping scheme (FIG. 9), the liquid resin LR accumulated inside the cushion member 301 can be caused to flow to the outside through the through holes 331 after the shaping.

When the through holes 331 are disposed at part of the top skin 330, which serves as the back surface BS of the cushion member 301 as in the example of FIG. 28, the appearance of the cushion member 301 is not degraded by relatively largely forming the through holes 331.

The cushion member 301 can be easily positioned at a desired position with respect to the frame 303 by providing, to the frame 303 in advance, protrusions (not illustrated; serving as the above-described convex parts 3010) formed to engage with the through holes 331 (serving as the above-described concave parts 3030) of the cushion member 301 and by engaging the through holes 331 (concave parts 3030) of the cushion member 301 with the protrusions (convex parts 3010) of the frame 303 at attachment of the cushion member 301 onto the frame 303.

In each example described in the present specification, the top skin 330 of the cushion member 301 is preferably semi-transparent or transparent, more preferably semi-transparent. With this configuration, the porous structural body 1 of the cushion member 301 can be visually recognized from the outside of the cushion member 301 through the top skin 330. Accordingly, the appearance of the cushion member 301 can be improved so that, for example, a person visually recognizing the cushion member 301 can easily understand that the cushion member 301 is shaped by a 3D printer.

In this case, the porous structural body 1 of the cushion member 301 is preferably opaque to improve the appearance of the cushion member 301, but may be semi-transparent or transparent. For the easiness of manufacturing the cushion member 301, the entire cushion member 301 is preferably made of the same material, and moreover, the entire cushion member 301 (the top skin 330 and the porous structural body 1) is preferably semi-transparent or transparent, more preferably semi-transparent.

In this case, the thickness of the top skin 330 is preferably 0.5 to 2.0 mm. With this configuration, the porous structural body 1 can be visually recognized from the outside through the top skin 330 as described above and it is easily understandable that the cushion member 301 is shaped by a 3D printer, and in addition, the cushion member 301 can more effectively withstand practical use stress such as weight and scratch, which leads to durability improvement.

However, the top skin 330 of the cushion member 301 may be opaque.

Note that the configurations of the top skin 330 of a plurality of optional different examples described above may be combined with each other. The configurations of the porous structural body 1 of a plurality of optional different examples described above may be combined with each other. Although the embodiments of the present disclosure are specifically described above, the present disclosure is not limited to the above-described embodiments.

INDUSTRIAL APPLICABILITY

A cushion member of the present disclosure and a cushion member manufactured by using a cushion member manufacturing method or 3D shaping data of the present disclosure may be used for a passenger seat of an optional kind, and for example, are preferably used for a vehicle seat, more preferably used for a car seat.

REFERENCE SIGNS LIST

300 passenger seat
301 cushion member
301C seat-cushion cushion member
301B seat-back cushion member
301M body part
3011 filling body
301R concave part
3011 cushion part
3011*a* facing surface
3011*b* corner
3012 adhesive
301*a* filling part
3010 convex part
3010*c* narrow part
3010*d* thick part
303 frame
303*a* filling part
3030 concave part
3030*c* narrow part
3030*d* thick part
304 seat pad (car seat pad)
310 cushion pad
311 main pad
311*t* femoral region-placed part
311*h* under-hip portion
312 side pad
320 back pad
321 main pad
322 side pad
330 top skin
331 through hole
332 protrusion
6C column part
6Ce end part of column part
6J column connection part
65 top skin film
340 head rest
341 main pad
342 side pad
V6 top skin virtual surface
400 3D printer
410 controller
420 shaping unit
421 laser emitter
430 supporting table
440 housing body
LL ultraviolet laser beam
LR liquid resin
500 3D shaping data
FS surface on seated person side
SS side surface (another surface continuous with surface on seated person side)
BS back surface
1 porous structural body
2 skeleton part
2B bone part
2Be end part of bone part
2B1 bone constant part
2B2 bone change part
2B21 edge of bone change part on connection part side
2B22 edge of bone change part on bone constant part side
2B23 tilted surface of bone change part
2J connection part
3 film
21 first cell defining part
22 second cell defining part
211 first annular part
211L first large annular part
211S first small annular part
2111 inner periphery side edge part of first annular part
222 second annular part
2221 inner periphery side edge part of second annular part
C cell hole
C1 first cell hole
C2 second cell hole
O skeleton line
U unit part of porous structural body
V1 first virtual surface
V1L first large virtual surface
V1S first small virtual surface
V2 second virtual surface

The invention claimed is:

1. A cushion member made of flexible resin or rubber and used for a passenger seat, the cushion member comprising:
a porous structural body; and
a top skin serving as at least a surface on a seated person side among surfaces of the passenger seat and integrated with the porous structural body, wherein
the porous structural body entirely includes a skeleton part,
the skeleton part includes
a plurality of bone parts, and
a plurality of connection parts connecting end parts of the plurality of bone parts,
the skeleton part includes a first cell defining part that defines a first cell hole inside,
the first cell defining part includes a plurality of first annular parts having annular shapes,
the plurality of first annular parts are coupled with each other so that first virtual surfaces defined by inner periphery side edge parts of the respective first annular parts do not intersect with each other, the first cell hole is defined by the plurality of first annular parts and the plurality of first virtual surfaces defined by the plurality of respective first annular parts, and each first annular part is constituted by a plurality of the bone parts and a plurality of the connection parts.

2. The cushion member according to claim 1, wherein the top skin also serves as another surface continuous with the surface on the seated person side among the surfaces of the passenger seat.

3. The cushion member according to claim 2, wherein the top skin has a through hole having a diameter of 0.5 to 5 mm, or has an embossing pattern on a surface.

4. The cushion member according to claim 2, wherein the top skin has a thickness of 0.3 to 5 mm.

5. The cushion member according to claim 1, wherein the top skin has a through hole having a diameter of 0.5 to 5 mm, or has an embossing pattern on a surface.

6. The cushion member according to claim 5, wherein the top skin has a thickness of 0.3 to 5 mm.

7. The cushion member according to claim 1, wherein the top skin has a thickness of 0.3 to 5 mm.

8. The cushion member according to claim 1, wherein each first annular part is shared by a pair of the first cell defining parts adjacent to the first annular part.

9. A cushion member manufacturing method of manufacturing the cushion member according to claim 1 by using a 3D printer.

10. A passenger seat comprising the cushion member according to claim 1.

* * * * *